(12) United States Patent
Yeo et al.

(10) Patent No.: US 11,805,518 B2
(45) Date of Patent: Oct. 31, 2023

(54) METHOD AND DEVICE FOR DETERMINATION OF SCHEDULING TIMING IN COMMUNICATIONS SYSTEM

(71) Applicant: Samsung Electronics Co., Ltd., Suwon-si (KR)

(72) Inventors: Jeongho Yeo, Suwon-si (KR); Younsun Kim, Suwon-si (KR); Hyunseok Ryu, Suwon-si (KR); Youngbum Kim, Suwon-si (KR); Hosung Kim, Suwon-si (KR); Sungjin Park, Suwon-si (KR); Cheolkyu Shin, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 17/444,732

(22) Filed: Aug. 9, 2021

(65) Prior Publication Data

US 2022/0046679 A1   Feb. 10, 2022

(30) Foreign Application Priority Data

Aug. 7, 2020   (KR) .................. 10-2020-0099396

(51) Int. Cl.
*H04W 72/12* (2023.01)
*H04W 72/04* (2023.01)
(Continued)

(52) U.S. Cl.
CPC ....... *H04W 72/1273* (2013.01); *H04L 1/1819* (2013.01); *H04L 1/1896* (2013.01);
(Continued)

(58) Field of Classification Search
CPC ......... H04W 72/1273; H04W 72/1268; H04W 72/0446; H04W 72/0453; H04W 72/042;
(Continued)

(56) References Cited

U.S. PATENT DOCUMENTS 10,484,975 B2 *  11/2019  Yeo ..................... H04W 88/02
2019/0090261 A1   3/2019   Yang
(Continued)

FOREIGN PATENT DOCUMENTS

EP        3684112 A1     7/2020

OTHER PUBLICATIONS

3rd Generation Partnership Project; Technical Specification Group Radio Access Network; NR; Multiplexing and channel coding (Release 16) 3GPP TS 38.212; V16.2.0; Jun. 2020, 151 pages.
(Continued)

*Primary Examiner* — Kent Krueger

(57) ABSTRACT

The disclosure relates to a communication technique that converges a 5G communication system for supporting a higher data rate after a 4G system with IoT technology, and a system thereof. The disclosure can be applied to intelligent services (e.g., smart home, smart building, smart city, smart car or connected car, healthcare, digital education, retail business, security and safety related services, and the like) based on 5G communication technology and IoT related technology. The disclosure discloses a method and device for a terminal to perform satellite communication.

24 Claims, 37 Drawing Sheets

(51) Int. Cl.
    *H04L 27/26*     (2006.01)
    *H04L 1/18*     (2023.01)
    *H04W 72/1273*     (2023.01)
    *H04W 72/0446*     (2023.01)
    *H04W 72/0453*     (2023.01)
    *H04L 1/1812*     (2023.01)
    *H04L 1/1867*     (2023.01)
    *H04W 72/23*     (2023.01)

(52) U.S. Cl.
    CPC ... *H04L 27/26025* (2021.01); *H04W 72/0446* (2013.01); *H04W 72/0453* (2013.01); *H04W 72/23* (2023.01)

(58) Field of Classification Search
    CPC ............. H04W 72/23; H04L 27/26025; H04L 1/1819; H04L 1/1896
    See application file for complete search history.

(56) References Cited

U.S. PATENT DOCUMENTS

| | | | | |
|---|---|---|---|---|
| 2019/0342845 | A1* | 11/2019 | Laselva | H04B 7/18504 |
| 2020/0205108 | A1 | 6/2020 | Alasti et al. | |
| 2020/0295824 | A1* | 9/2020 | Charbit | H04L 1/1854 |
| 2021/0105761 | A1* | 4/2021 | Cheng | H04B 7/18504 |
| 2021/0120581 | A1* | 4/2021 | Kim | H04W 74/02 |
| 2021/0153193 | A1* | 5/2021 | Lin | H04W 72/0446 |
| 2021/0314892 | A1* | 10/2021 | Rico Alvarino | H04W 72/23 |
| 2022/0015120 | A1* | 1/2022 | Qiu | H04W 72/1268 |
| 2022/0191898 | A1* | 6/2022 | Sergeev | H04W 72/20 |
| 2022/0217790 | A1* | 7/2022 | Qiu | H04W 56/0045 |
| 2022/0322265 | A1* | 10/2022 | Dai | H04L 5/0035 |

OTHER PUBLICATIONS

3rd Generation Partnership Project; Technical Specification Group Radio Access Network; NR; Physical layer procedures for control (Release 16) 3GPP TS 38.213; V16.2.0; Jun. 2020, 176 pages.

3rd Generation Partnership Project; Technical Specification Group Radio Access Network; NR; User Equipment (UE) procedures in Idle mode and RRC Inactive state (Release 16) 3GPP TS 38.304; V16.1.0; Jul. 2020, 39 pages.

3rd Generation Partnership Project; Technical Specification Group Radio Access Network; NR; Physical channels and modulation (Release 16) 3GPP TS 38.211; V16.2.0; Jun. 2020, 131 pages.

International Search Report and Written Opinion of the International Searching Authority dated Nov. 5, 2021, in connection with International Application No. PCT/KR2021/010503, 7 pages.

CMCC, "Discussion on UL transmission timing for NTN," R1-1912535, 3GPP TSG RAN WG1 #99, Reno, USA, Nov. 18-22, 2019, 3 pages.

Mediatek Inc., "Physical layer control procedure in NR-NTN," R1-1908014, 3GPP TSG RAN WG1 Meeting #98, Prague, Czech Republic, Aug. 26-30, 2019, 5 pages.

* cited by examiner

| Orbit type | Height | Period |
|---|---|---|
| LEO | 500~1000 km | 90~120 min |
| MEO | 5000~15000 km | Approx 6 hours |
| GEO | Approx 36,000 km | Approx 24 hours |

- Link budget between UE and satellite

- Path loss : (1600)
    $FSPL(d, f_c) = 32.45 + 20 \log_{10}(f_c) + 20 \log_{10}(d)$

- Rx antenna gain for UL : 24 dBi (LEO), 45.5 dBi (GEO)

- Link budget between UE and terrestrial gNB

- Path loss (LOS) : (1610)
    $PL_2 = 28.0 + 40 \log_{10}(d_{3D}) + 20 \log_{10}(f_c) - 9 \log_{10}((d'_{BP})^2 + (h_{BS} - h_{UT})^2)$

- Path loss (NLOS) : (1620)
    $PL'_{UMa-NLOS} = 13.54 + 39.08 \log_{10}(d_{3D}) + 20 \log_{10}(f_c) - 0.6(h_{UT} - 1.5)$

- Rx antenna gain for UL : ~12 dBi

- Doppler shift within a beam footprint

UE1's Doppler shift = $f_c \frac{v}{c} \cos\alpha = f_c \frac{v}{c} \frac{\sin\beta}{\sqrt{1+r^2 - 2r\cos\beta}}$ UE2's Doppler shift = $f_c \frac{v}{c} \cos\alpha' = f_c \frac{v}{c} \frac{\sin(\beta+\Delta\beta)}{\sqrt{1+r^2 - 2r\cos(\beta+\Delta\beta)}}$ $\Delta\beta = \frac{d}{R}$ [rad]    $r = \frac{R+h}{R}$

METHOD AND DEVICE FOR DETERMINATION OF SCHEDULING TIMING IN COMMUNICATIONS SYSTEM

CROSS-REFERENCE TO RELATED APPLICATION

This application is based on and claims priority under 35 U.S.C. 119 to Korean Patent Application No. 10-2020-0099396, filed on Aug. 7, 2020, in the Korean Intellectual Property Office, the disclosures of which are herein incorporated by reference in their entireties.

BACKGROUND

1. Field

The disclosure relates to a communication system, and more particularly, to a communication system in which, when a terminal transmits and receives a signal to and from a base station through a satellite, correction of time offset may be required because of a long distance between the terminal and the satellite. Accordingly, the disclosure provides a method and device in which the base station indicates scheduling time offset information to the terminal and in which the terminal determines scheduling timing using the indicated information.

2. Description of Related Art

In order to satisfy increases in demand for wireless data traffic now that a 4G communication system is commercially available, efforts are being made to develop an enhanced 5G communication system or a pre-5G communication system. Therefore, a 5G communication system or a pre-5G communication system is referred to as a beyond 4G network communication system or a post LTE system. In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input and output (MIMO), full dimensional MIMO (FD-MIMO), array antenna, analog beamforming, and large scale antenna have been discussed for the 5G communication system. Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (CoMP), and interference cancellation have been developed. In addition, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, have been developed for the 5G system.

Innovation of Internet from a human-centered connection network in which a human generates and consumes information to an Internet of Things (IoT) network that gives and receives and processes information to and from distributed constituent elements such as things has occurred. Internet of Everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things. In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts for applying a 5G communication system to an IoT network have been undertaken. For example, 5G communication technologies such as a sensor network, machine to machine (M2M), and machine type communication (MTC) have been implemented by the technique of beamforming, MIMO, and array antenna. Application of a cloud RAN as the foregoing big data processing technology may be an example of fusion of 5G technology and IoT technology.

In the late 2010s and 2020s, as a cost of launching satellites drastically decreased, more companies were trying to provide communication services through satellites. Accordingly, a satellite network has emerged as a next-generation network system that complements the existing terrestrial network. Although the satellite network cannot provide a user experience at the level of the terrestrial network, it has the advantage of being able to provide communication services in areas where it is difficult to establish a terrestrial network or in a disaster situation, and as described above, it also secures the economic feasibility due to the recent sharp reduction in the cost of launching satellites. Further, several companies and 3GPP standards organizations are promoting direct communication between smartphones and satellites.

When the terminal attempts to connect to the base station through the satellite, a large propagation delay occurs in the arrival of radio waves because of a long distance of hundreds of km, thousands of km, or more between the terminal and the satellite and between the satellite and the base station on the ground. Such a large propagation delay is much larger than that in a situation in which the terminal and the base station communicate directly in the terrestrial network. Further, such a propagation delay changes with time because the satellite is constantly moving. The propagation delay of all terminals with the satellite or the base station changes.

SUMMARY

The disclosure relates to a communication system, and more particularly, to a method and device for configuring an offset value applied when a terminal transmits an uplink signal in order to correct a time-varying propagation delay occurring according to a long distance to the satellite and a movement of the satellite in a case in which the terminal transmits and receives a signal to and from the base station through the satellite.

The present disclosure has been made to address the above-mentioned problems and disadvantages, and to provide at least the advantages described below.

In accordance with an aspect of the present disclosure, A method performed by a terminal in a communication system is provided. The method includes receiving, from a base station, a system information block including scheduling offset information, receiving, from the base station, a first downlink signal associated with a second uplink signal, wherein the first downlink signal is associated with a k value for an uplink transmission timing, identifying a transmission timing of the second uplink signal based on the scheduling offset information and the k value, and transmitting, to the base station, the second uplink signal based on the identified transmission timing.

In accordance with another aspect of the present disclosure, a method performed by a base station in a communication system is provided. The method includes transmitting, to a terminal, a system information block including scheduling offset information, transmitting, to the terminal, a first downlink signal associated with a second uplink signal, wherein the first downlink signal is associated with a k value for an uplink transmission timing, and receiving, from the terminal, the second uplink signal based on a transmission timing, wherein the transmission timing of the second uplink signal depends on the scheduling offset information and the k value.

In accordance with another aspect of the present disclosure, a terminal in a communication system is provided. The terminal includes a transceiver, and a controller coupled with the transceiver and configured to receive, from a base station, a system information block including scheduling offset information, receive, from the base station, a first downlink signal associated with a second uplink signal, wherein the first downlink signal is associated with a k value for an uplink transmission timing, identify a transmission timing of the second uplink signal based on the scheduling offset information and the k value, and transmit, to the base station, the second uplink signal based on the identified transmission timing.

In accordance with another aspect of the present disclosure, a base station in a communication system is provided. The base station includes a transceiver, and a controller coupled with the transceiver and configured to transmit, to a terminal, a system information block including scheduling offset information, transmit, to the terminal, a first downlink signal associated with a second uplink signal, wherein the first downlink signal is associated with a k value for an uplink transmission timing, receive, from the terminal, the second uplink signal based on a transmission timing, wherein the transmission timing of the second uplink signal depends on the scheduling offset information and the k value.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

BRIEF DESCRIPTION OF THE DRAWINGS

In the drawings, the same or similar reference numerals may be used for the same or similar components.

DETAILED DESCRIPTION

Figure 1:
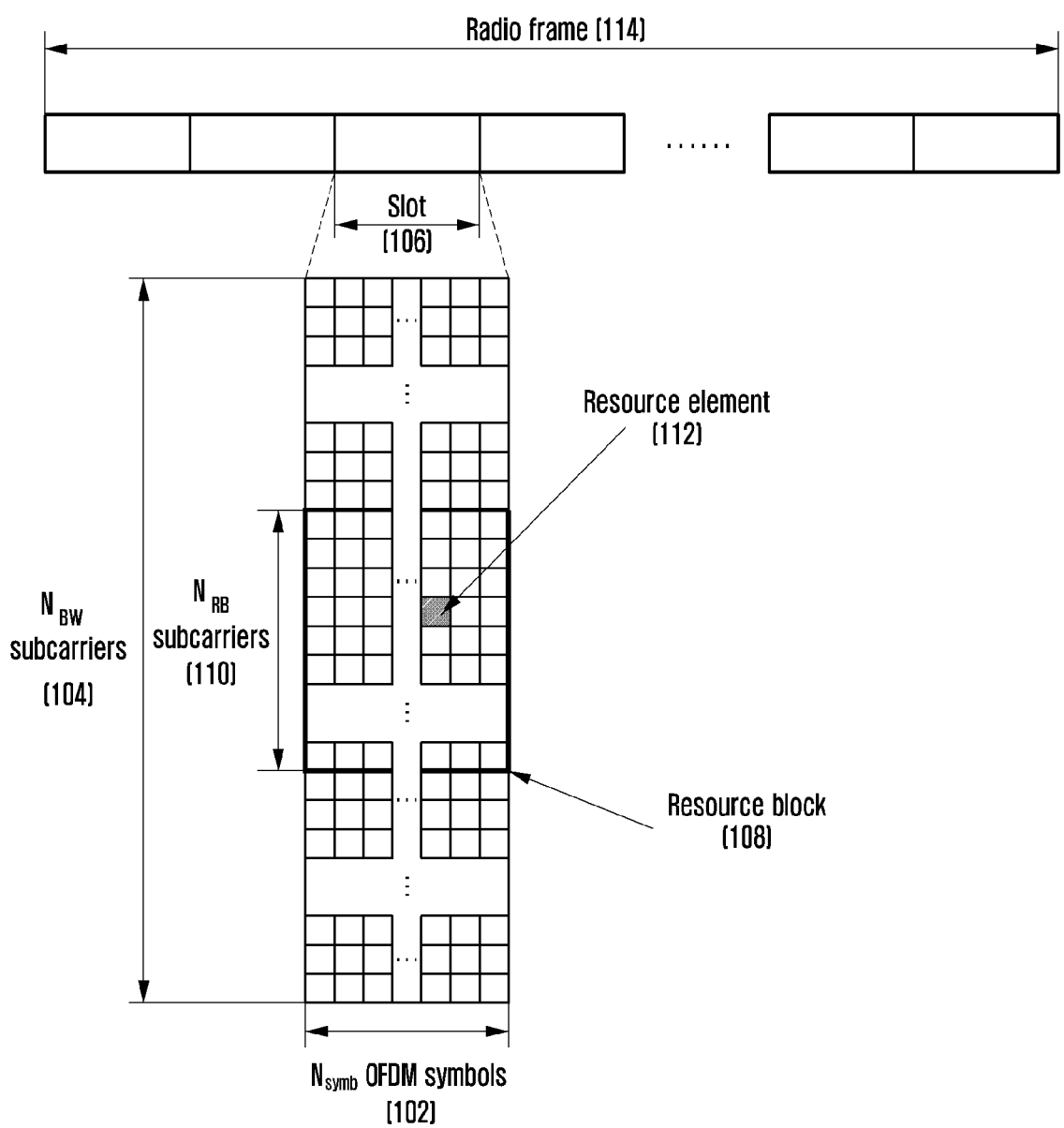
FIG. 1 illustrates a diagram of a basic structure of a time-frequency domain, which is a radio resource domain in which data or a control channel is transmitted in a downlink or uplink in an NR system.

FIGS. 1 through 36, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

New radio access technology (NR), which is new 5G communication is designed to enable various services to be freely multiplexed in time and frequency resources. Accordingly, waveform/numerology and reference signals, and the like may be dynamically or freely assigned according to the needs of the service. In order to provide an optimal service to a terminal in wireless communication, it is important to optimize data transmission through measurement of a channel quality and an amount of interference, and accordingly, accurate channel state measurement is essential. However, unlike 4G communication in which channel and interference characteristics do not change significantly according to frequency resources, in the case of 5G channels, because channel and interference characteristics change greatly according to a service, the subset support of a frequency resource group (FRG) dimension that enables to divide and measure the channel and interference characteristics is required. Types of services supported in the NR system, the of supported services may be divided into categories such as an enhanced mobile broadband (eMBB), massive machine type communications (mMTC), and ultra-reliable and low-latency communications (URLLC). It may be regarded that the eMBB is a service that aims for high speed transmission of high capacity data, the mMTC is a service that aims for minimizing terminal power and connecting multiple terminals, and the URLLC is a service that aims for high reliability and low latency. Different requirements may be applied according to a type of a service applied to the terminal.

As described above, a plurality of services may be provided to a user in a communication system, and in order to provide a plurality of services to a user, a method and device using the same for providing each service within the same time period according to characteristics are required.

Hereinafter, embodiments of the disclosure will be described in detail with reference to the accompanying drawings.

In describing the embodiments, descriptions of technical contents that are well known in the technical field to which the disclosure pertains and that are not directly related to the disclosure will be omitted. This is to more clearly convey the gist of the disclosure without obscuring the gist of the disclosure by omitting unnecessary description.

For the same reason, some components are exaggerated, omitted, or schematically illustrated in the accompanying drawings. Further, the size of each component does not fully reflect the actual size. In each drawing, the same reference numerals are given to the same or corresponding components.

Advantages and features of the disclosure, and a method for achieving them will become apparent with reference to the embodiments described below in detail in conjunction with the accompanying drawings. However, the disclosure is not limited to the embodiments disclosed below, but may be implemented in various different forms, and only the present embodiments enable the disclosure to be complete, and are provided to fully inform the scope of the disclosure to those of ordinary skill in the art to which the disclosure pertains, and the disclosure is only defined by the scope of the claims. Like reference numerals refer to like components throughout the specification.

In this case, it will be understood that each block of flowcharts and combinations of the flowcharts may be performed by computer program instructions. Because these computer program instructions may be mounted in a processor of a general purpose computer, special purpose computer, or other programmable data processing equipment, the instructions performed by a processor of a computer or other programmable data processing equipment generate a means that performs functions described in the flowchart block(s). Because these computer program instructions may be stored in a computer usable or computer readable memory that may direct a computer or other programmable data processing equipment in order to implement a function in a particular manner, the instructions stored in the computer usable or computer readable memory may produce a production article containing instruction means for performing the function described in the flowchart block(s). Because the computer program instructions may be mounted on a computer or other programmable data processing equipment, a series of operational steps are performed on the computer or other programmable data processing equipment to generate a computer-executed process; thus, instructions for performing a computer or other programmable data processing equipment may provide steps for performing functions described in the flowchart block(s).

Further, each block may represent a module, a segment, or a portion of a code including one or more executable instructions for executing specified logical function(s). Further, it should also be noted that in some alternative implementations, functions recited in the blocks may occur out of order. For example, two blocks illustrated one after another may in fact be performed substantially simultaneously, or the blocks may be sometimes performed in the reverse order according to the corresponding function.

In this case, a term '-unit' used in this embodiment means software or hardware components such as FPGA or ASIC, and '-unit' performs certain roles. However, '-unit' is not limited to software or hardware. '-unit' may be configured to reside in an addressable storage medium or may be configured to reproduce one or more processors. Therefore, as an example, '-unit' includes components such as software components, object-oriented software components, class components, and task components, and processes, functions, properties, and procedures, subroutines, segments of program code, drivers, firmware, microcode, circuitry, data, databases, data structures, tables, arrays, and variables. Functions provided in the components and '–units' may be combined into a smaller number of components and '–units' or may be further separated into additional components and '–units'. Further, components and '–units' may be implemented to reproduce one or more CPUs in a device or secure multimedia card. Further, in an embodiment, '~unit' may include one or more processors.

In order to describe a method and device proposed in the embodiment, terms "physical channel" and "signal" in an NR system may be used. However, the content of the disclosure may be applied to a wireless communication system other than the NR system.

Hereinafter, embodiments of the disclosure will be described in detail with reference to the accompanying drawings. Further, in the description of the disclosure, when it is determined that a detailed description of a related function or configuration may unnecessarily obscure the gist of the disclosure, a detailed description thereof will be omitted. Further, terms described below are terms defined in consideration of functions in the disclosure, which may vary according to intentions or customs of users and operators. Therefore, the definition should be made based on the content throughout this specification.

In the disclosure, a downlink (DL) is a wireless transmission path of a signal transmitted from a base station to a terminal, and an uplink (UL) means a wireless transmission path of a signal transmitted from a terminal to a base station.

Hereinafter, an embodiment of the disclosure will be described with an NR system as an example, but the embodiment of the disclosure may be applied to other communication systems having a similar technical background or channel type. Further, the embodiments of the disclosure may be applied to other communication systems through some modifications within a range that does not significantly depart from the scope of the disclosure as determined by a person having skilled technical knowledge.

In the disclosure, terms "physical channel" and "signal" may be used interchangeably with a data or a control signal. For example, a PDSCH is a physical channel through which data is transmitted, but in the disclosure, the PDSCH may be referred to as data.

Hereinafter, in the disclosure, higher signaling is a transmission method of a signal transmitted from a base station to a terminal using a downlink data channel of a physical layer or from a terminal to a base station using an uplink data channel of a physical layer, and may be referred to RRC signaling or MAC control element (MAC CE).

A wireless communication system has evolved from providing voice-oriented services in the early days to a broadband wireless communication system that provides high-speed and high-quality packet data services such as communication standards such as, for example, high speed packet access (HSPA), long term evolution (LTE) or evolved universal terrestrial radio access (E-UTRA), and LTE-Advanced (LTE-A) of 3GPP, high rate packet data (HRPD), ultra mobile broadband (UMB) of 3GPP2, and IEEE 802.16e. Further, a communication standard of 5G or new radio (NR) is being made to a 5G wireless communication system.

As a representative example of the broadband wireless communication system, an NR system employs an orthogonal frequency division multiplexing (OFDM) scheme in a downlink (DL) and an uplink. However, more specifically, the downlink employs a cyclic-prefix OFDM (CP-OFDM) scheme, and the uplink employs two of a discrete Fourier transform spreading OFDM (DFT-S-OFDM) scheme and the CP-OFDM. The uplink means a radio link in which a user equipment (UE) or a mobile station (MS) transmits data or control signals to a base station (BS or gNode B), and the downlink means a wireless link in which a base station transmits data or control signals to a user equipment. In a multiple access method as described above, data or control information of each user is classified by allocating and operating time-frequency resources to transmit data or control information for each user so that they do not overlap, that is, so that orthogonality is established.

The NR system employs a hybrid automatic repeat request (HARQ) method of retransmitting corresponding data in a physical layer when a decoding failure occurs in initial transmission. In the HARQ scheme, when a receiver fails to accurately decode data, the receiver transmits negative acknowledgment (NACK) notifying the transmitter of a decoding failure so that the transmitter may retransmit the data in the physical layer. The receiver combines the data retransmitted by the transmitter with the previously unsuccessful decoding data to improve a data reception performance. Further, when the receiver accurately decodes data, the receiver may transmit acknowledgement (ACK) notifying the transmitter of decoding success so that the transmitter may transmit new data.

FIG. 1 illustrates a diagram of a basic structure of a time-frequency domain, which is a radio resource domain to which data or a control channel is transmitted in a downlink or an uplink in an NR system.

In FIG. 1, a horizontal axis represents a time domain, and a vertical axis represents a frequency domain. A minimum transmission unit in the time domain is an OFDM symbol, and the $N_{symb}$ number of OFDM symbols 102 are gathered to form one slot 106. A length of a subframe is defined to 1.0 ms, and a radio frame 114 is defined to 10 ms. A minimum transmission unit in the frequency domain is a subcarrier, and a bandwidth of an entire system transmission band is configured with the total $N_{BW}$ number of subcarriers 104. One frame may be defined to 10 ms. One subframe may be defined to 1 ms; thus, one frame may be configured with total 10 subframes. One slot may be defined to 14 OFDM symbols (i.e., the number of slot symbols per slot $N_{symb}^{slot}=14$). One subframe may be configured with one or a plurality of slots, and the number of slots per one subframe may vary according to a configuration value µ for the subcarrier spacing. In an example of FIG. 2, a case of µ=0 and a case of µ=1 are illustrated as subcarrier spacing configuration values. When µ=0, one subframe may be configured with one slot, and when µ=1, one subframe may be configured with two slots. That is, the number $N_{slot}^{subframe,\mu}$ of slots per subframe may vary according to a configuration value p for subcarrier spacing, and accordingly, the number $N_{slot}^{frame,\mu}$ of slots per frame may vary. $N_{slot}^{subframe,\mu}$ and $N_{slot}^{frame,\mu}$ according to each subcarrier spacing configuration p may be defined in Table 1.

TABLE 1

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

A basic unit of a resource in a time-frequency domain is a resource element (RE) 112, and may be represented with an OFDM symbol index and a subcarrier index. A resource block 108 (RB or physical resource block; PRB) is defined to the $N_{RB}$ number of consecutive subcarriers 110 in a frequency domain. In general, a minimum transmission unit of data is the RB unit. In general, in the NR system, $N_{symb}=14$ and $N_{RB}=12$, and $N_{BW}$ is proportional to a bandwidth of a system transmission band. A data rate may increase in proportion to the number of RBs scheduled to the UE.

In the NR system, in the case of an FDD system that divides and operates a downlink and an uplink by a frequency, a downlink transmission bandwidth and an uplink transmission bandwidth may be different from each other. The channel bandwidth represents an RF bandwidth corresponding to a system transmission bandwidth. Tables 2 and 3 show a part of the correspondence between the system transmission bandwidth, subcarrier spacing, and channel bandwidth defined in the NR system in a frequency band lower than 6 GHz and a frequency band higher than 6 GHz, respectively. For example, an NR system having a 100 MHz channel bandwidth with 30 kHz subcarrier spacing has a transmission bandwidth configured with 273 RBs. In the following description, N/A may be a bandwidth-subcarrier combination not supported by the NR system.

TABLE 2

| SCS (kHz) | 5 MHz | 10 MHz | 15 MHz | 20 MHz | 25 MHz | 30 MHz | 40 MHz | 50 MHz | 60 MHz | 80 MHz | 90 MHz | 100 MHz |
|---|---|---|---|---|---|---|---|---|---|---|---|---|
| | | | | | | $N_{RB}$ | | | | | | |
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

TABLE 3

| Channel bandwidth $BW_{channel}$ [MHz] | Sub carrier spacing | 50 MHz | 100 MHz | 200 MHz | 400 MHz |
|---|---|---|---|---|---|
| Transmission bandwidth configuration $N_{RB}$ | 60 KHz | 66 | 132 | 264 | N/A |
| | 120 KHz | 32 | 66 | 132 | 264 |

In the NR system, the frequency range may be divided into FR1 and FR2 and defined, as illustrated in Table 4.

TABLE 4

| Frequency range designation | Corresponding frequency range |
|---|---|
| FR1 | 450 MHz-7125 MHz |
| FR2 | 24250 MHz-52600 MHz |

In the above description, the scope of FR1 and FR2 may be changed and applied differently. For example, a frequency range of FR1 may be changed and applied from 450 MHz to 6000 MHz.

Hereinafter, a synchronization signal (SS)/PBCH block in a 5G system will be described.

The SS/PBCH block may mean a physical layer channel block configured with a primary SS (PSS), a secondary SS (SSS), and a PBCH. Specifically, the SS/PBCH block is as follows.

PSS: a signal to be a reference for downlink time/frequency synchronization and provides some information on a cell ID.

SSS: a reference for downlink time/frequency synchronization, and provides remaining cell ID information not provided by the PSS. Additionally, it may serve as a reference signal for demodulation of the PBCH.

PBCH: provides essential system information necessary for transmitting and receiving a data channel and control channel of the UE. The essential system information may include search space related control information indicating radio resource mapping information of a control channel, scheduling control information on a separate data channel for transmitting system information, and the like.

SS/PBCH block: The SS/PBCH block is configured with a combination of a PSS, an SSS, and a PBCH. One or a plurality of SS/PBCH blocks may be transmitted within 5 ins, and each transmitted SS/PBCH block may be distinguished by an index.

Figure 2:
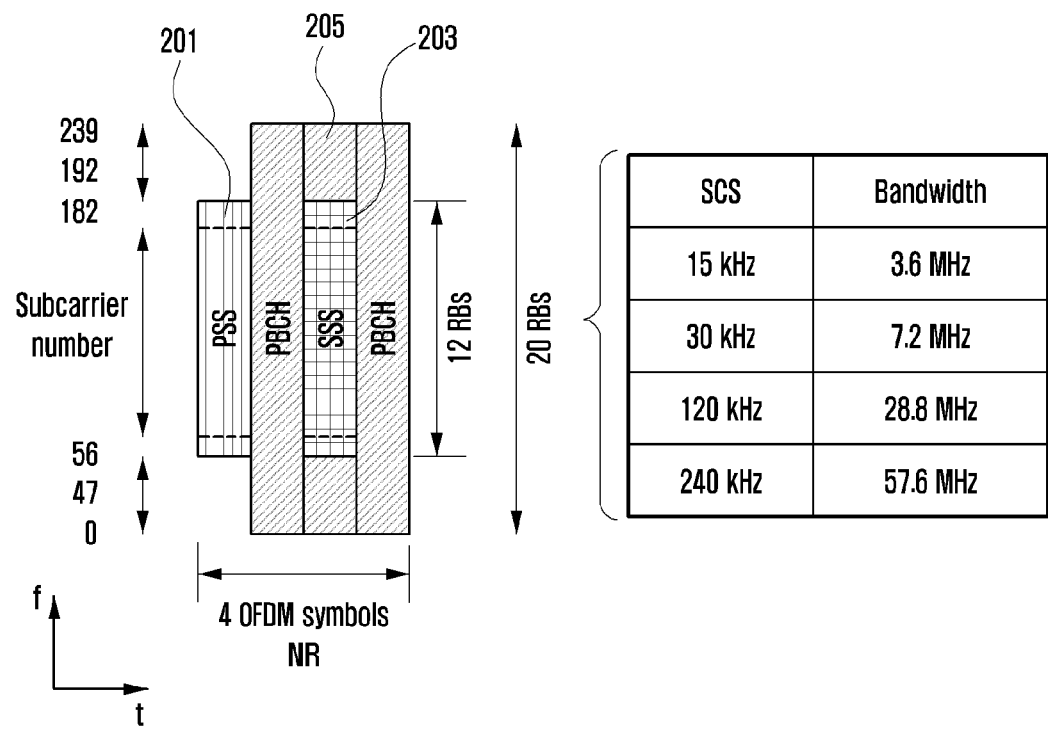
FIG. 2 illustrates a diagram of a status in which a synchronization signal (SS) and a physical broadcast channel (PBCH) of an NR system are mapped in frequency and time domains.

FIG. 2 illustrates a diagram of a state in which a synchronization signal (SS) and a physical broadcast channel (PBCH) of an NR system are mapped in frequency and time domains.

A primary synchronization signal (PSS) 201, a secondary synchronization signal (SSS) 203, and a PBCH are mapped over 4 OFDM symbols, the PSS and SSS are mapped to 12 RBs, and the PBCH is mapped to 20 RBs. How a frequency band of 20 RBs varies according to subcarrier spacing (SCS) is illustrated in the table of FIG. 2. A resource region in which the PSS, SSS, and PBCH are transmitted may be referred to as an SS/PBCH block. Further, the SS/PBCH block may be referred to as an SSB block.

Figure 3:
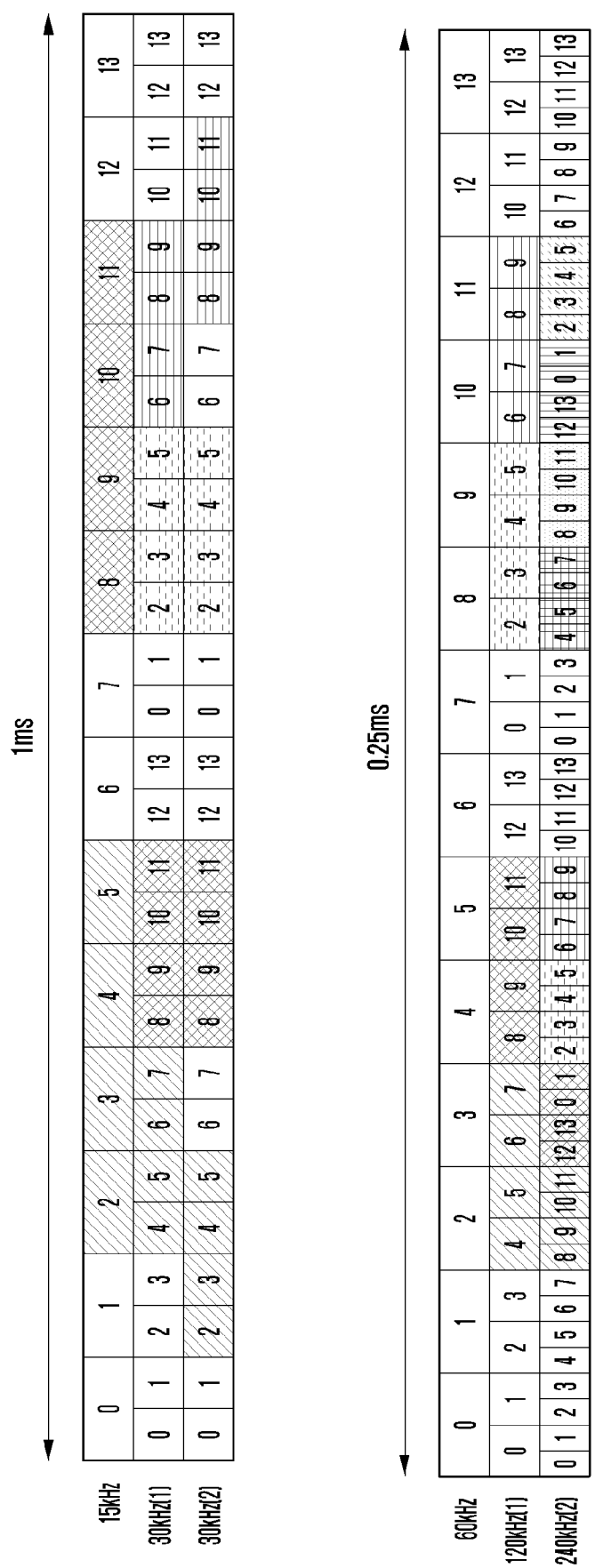
FIG. 3 illustrates a diagram of a symbol in which an SS/PBCH block may be transmitted according to subcarrier spacing.

FIG. 3 illustrates a diagram of a symbol in which an SS/PBCH block may be transmitted according to subcarrier spacing.

Referring to FIG. 3, the subcarrier spacing may be configured to 15 kHz, 30 kHz, 120 kHz, 240 kHz, and the like, and a location of a symbol, in which an SS/PBCH block (or SSB block) may be located according to each subcarrier spacing, may be determined. FIG. 3 illustrates locations of symbols at which the SSB may be transmitted according to the subcarrier spacing in symbols within 1 ms, and the SSB does not always have to be transmitted in an area illustrated in FIG. 3. A location at which the SSB block is transmitted may be configured in the UE through system information or dedicated signaling.

The UE may detect a PSS and an SSS in an initial access step and decode a PBCH. The UE may obtain a master information block (MIB) from the PBCH and receive a control region #0 (which may correspond to a control region having a control region index of 0) configured therefrom. The UE may perform monitoring on a control region #0, assuming that a selected SS/PBCH block and a demodulation reference signal (DMRS) transmitted in the control region #0 are quasi co location (QCL). The UE may receive system information as downlink control information transmitted in the control region #0. The UE may obtain configuration information related to a random access channel (RACH) required for initial access from the received system information. The UE may transmit a physical RACH (PRACH) to the base station in consideration of the selected SS/PBCH index, and the base station that has received the PRACH may obtain information on an SS/PBCH block index selected by the UE. Through such a process, the base station may know that the UE has selected a certain block from each of the SS/PBCH blocks and monitors the control region #0 related thereto.

The UE before radio resource control (RRC) connection may receive an initial bandwidth part (initial BWP) for initial access from the base station through a master information block (MIB). More specifically, the UE may receive configuration information on a search space and a control resource set (CORESET) that may transmit a physical downlink control channel (PDCCH) for receiving system information (remaining system information; RMSI or system information block 1; may correspond to SIB1) necessary for initial access through the MIB in initial access step. The control region and the search space configured by the MIB may each be regarded as an identifier (ID) 0. The base station may notify the UE of configuration information such as frequency allocation information, time allocation information, and numerology for the control region #0 through the MIB. Further, the base station may notify the UE of a monitoring period for the control region #0 and configuration information on occasion, that is, configuration information on the search space #0 through the MIB. The UE may regard a frequency range configured to the control region #0 obtained from the MIB as an initial bandwidth part for initial access. In this case, an identifier (ID) of the initial bandwidth part may be regarded as 0.

```
-- ASN1 START
-- TAG-MIB-START
MIB ::=                               SEQUENCE {
    systemFrameNumber                     BIT STRING (SIZE (6)),
```

```
    subCarrierSpacingCommon              ENUMERATED {scs15or60,
scs30or120},
    ssb-SubcarrierOffset                 INTEGER (0..15),
    dmrs-TypeA-Position                  ENUMERATED {pos2, pos3},
    pdcch-ConfigSD31                     PDCCH-ConfigSIB1,
    cellBarred                           ENUMERATED {barred,
notBarred},
    intraFreqReselection                 ENUMERATED {allowed,
notAllowed},
    spare                                BIT STRING (SIZE (1))
}
-- TAG-MIB-STOP
-- ASN1 STOP
MIB field descriptions
- cellBarred
Value barred means that the cell is barred, as defined in TS 38.304 [20].
- dmrs-TypeA-Position
Position of (first) DM-RS for downlink (see TS 38.211 [16], clause 7.4.1.1.2)
and uplink (see TS 38.211 [16], clause 6.4.1.1.3).
- intraFreqReselection
```

Controls cell selection/reselection to intra-frequency cells when the highest ranked cell is barred, or treated as barred by the UE, as specified in TS 38.304 [20].

pdcch-ConfigSIB1

Determines a common ControlResourceSet (CORESET), a common search space and necessary PDCCH parameters. If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1 (see TS 38.213 [13], clause 13).

ssb-SubcarrierOffset

Corresponds to kSSB (see TS 38.213 [13]), which is the frequency domain offset between SSB and the overall resource block grid in number of subcarriers. (See TS 38.211 [16], clause 7.4.3.1).

The value range of this field may be extended by an additional most significant bit encoded within PBCH as specified in TS 38.213 [13].

This field may indicate that this cell does not provide SIB1 and that there is hence no CORESET #0 configured in MIB (see TS 38.213 [13], clause 13). In this case, the field pdcch-ConfigSIB1 may indicate the frequency positions where the UE may (not) find a SS/PBCH with a control resource set and search space for SIB1 (see TS 38.213 [13], clause 13).

subCarrierSpacingCommon

Subcarrier spacing for SIB1, Msg.2/4 for initial access, paging and broadcast SI-messages. If the UE acquires this MIB on an FR1 carrier frequency, the value scs15or60 corresponds to 15 kHz and the value scs30or120 corresponds to 30 kHz. If the UE acquires this MIB on an FR2 carrier frequency, the value scs15or60 corresponds to 60 kHz and the value scs30or120 corresponds to 120 kHz.

systemFrameNumber

The 6 most significant bits (MSB) of the 10-bit System Frame Number (SFN). The 4 LSB of the SFN are conveyed in the PBCH transport block as part of channel coding (i.e. outside the MIB encoding), as defined in clause 7.1 in TS 38.212 [17].

In a method of configuring the bandwidth part, UEs before RRC connection may receive configuration information on the initial bandwidth part through the MIB in the initial access step. More specifically, the UE may receive a control region for a downlink control channel through which downlink control information (DCI) for scheduling an SIB may be transmitted from the MIB of a physical broadcast channel (PBCH). In this case, the bandwidth of the control region configured by the MIB may be regarded as an initial bandwidth part, and the UE may receive a physical downlink shared channel (PDSCH) through which the SIB is transmitted through the configured initial bandwidth part. The initial bandwidth part may be utilized for other system information (OSI), paging, and random access in addition to the purpose of receiving the SIB.

When one or more bandwidth parts are configured to the UE, the base station may instruct the UE to change the bandwidth part using a bandwidth part indicator field in DCI.

Hereinafter, downlink control information (DCI) in the 5G system will be described in detail.

Scheduling information on uplink data (or physical uplink shared channel, PUSCH) or downlink data (or physical downlink shared channel, PDSCH) in the 5G system is transmitted from the base station to the UE through the DCI. The UE may monitor a DCI format for fallback and a DCI format for non-fallback for the PUSCH or the PDSCH. The DCI format for fallback may be configured with a fixed field predefined between the base station and the UE, and the DCI format for non-fallback may include a configurable field. In addition to this, there are various formats of DCI, and it may indicate whether the DCI is DCI for power control or DCI for notifying a slot format indicator (SFI), and the like according to each format.

DCI may be transmitted through a PDCCH, which is a physical downlink control channel via channel coding and modulation. A cyclic redundancy check (CRC) is attached to the DCI message payload, and the CRC may be scrambled with a radio network temporary identifier (RNTI) corresponding to the identity of the UE. Different RNTIs may be used according to the purpose of the DCI message, for example, UE-specific data transmission, a power control command, or a random access response. That is, the RNTI is not transmitted explicitly, but is transmitted while being included in a CRC calculation process. Upon receiving the DCI message transmitted on the PDCCH, the UE checks the CRC using the assigned RNTI, and when the CRC check result is correct, the UE may know that the corresponding message has been transmitted to the UE. The PDCCH is mapped to a control resource set (CORESET) configured to the UE and transmitted.

For example, the DCI for scheduling a PDSCH for system information (SI) may be scrambled with an SI-RNTI. The DCI for scheduling a PDSCH for a random access response (RAR) message may be scrambled with an RA-RNTI. The DCI for scheduling a PDSCH for a paging message may be scrambled with a P-RNTI. The DCI notifying a slot format indicator (SFI) may be scrambled with an SFI-RNTI. The DCI notifying transmit power control (TPC) may be scrambled with a TPC-RNTI. The DCI for scheduling UE-specific PDSCH or PUSCH may be scrambled with a C-RNTI (Cell RNTI).

A DCI format 0_0 may be used as a fallback DCI for scheduling a PUSCH, and in this case, a CRC may be scrambled with a C-RNTI. A DCI format 0_0 in which a CRC is scrambled with a C-RNTI may include, for example, the following information.

TABLE 5

Identifier for DCI formats-[1] bit
Frequency domain resource assignment-[$\log_2(N_{RB}^{UL,BWP} (N_{RB}^{UL,BWP} + 1)/2)$] bits
Time domain resource assignment-X bits
Frequency hopping flag-1 bit.
Modulation and coding scheme-5 bits
New data indicator-1 bit
Redundancy version-2 bits
HARQ process number-4 bits
TPC command for scheduled PUSCH-[2] bits
UL/SUL indicator-0 or 1 bit A DCI format 0_1 may be used as non-fallback DCI for scheduling a PUSCH, and in this case, a CRC may be scrambled with a C-RNTI. A DCI format 0_1 in which a CRC is scrambled with a C-RNTI may include, for example, the following information.

TABLE 6

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
For resource allocation type 0, [$N_{RB}^{ULBWP}/P$] bits
For resource allocation type 1, [$\log_2(N_{RB}^{UL,BWP} (N_{RB}^{UL,BWP} + 1)/2)$] bits
Time domain resource assignment -1, 2, 3, or 4 bits
VRB-to-PRB mapping - 0 or 1 bit, only for resource allocation type 1.
0 bit if only resource allocation type 0 is configured;
1 bit otherwise.
Frequency hopping flag - 0 or 1 bit, only for resource allocation type 1.
0 bit if only resource allocation type 0 is configured;
1 bit otherwise.
Modulation and coding scheme 5 bits
New data indicator - 1 bit
Redundancy version - 2 bits
HARQ process number - 4 bits
1st downlink assignment index - 1 or 2 bits
1 bit for semi-static HARQ-ACK codebook;
2 bits for dynamic HARQ-ACK codebook with single HARQ-ACK codebook.
2nd downlink assignment index - 0 or 2 bits
2 bits for dynamic HARQ-ACK codebook with two HARQ-ACK sub-codebooks;
0 bit otherwise.
TPC command for scheduled PUSCH - 2 bits $\left\lceil \log_2\left(\sum_{k=1}^{L_{max}} \binom{N_{SRS}}{k}\right)\right\rceil$ or $\lceil \log_2(N_{SRS})\rceil$ bits TABLE 6-continued $\left\lceil \log_2\left(\sum_{k=1}^{L_{max}} \binom{N_{SRS}}{k}\right)\right\rceil$ bits for non-codebook based PUSCH transmission;
[$\log_2(N_{SRS})$] bits for codebook based PUSCH transmission.
Precoding information and number of layers -up to 6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association - 0 or 2 bits.
beta_offset indicator - 0 or 2 bits
DMRS sequence initialization - 0 or 1 bit A DCI format 1_0 may be used as fallback DCI for scheduling a PDSCH, and in this case, a CRC may be scrambled with a C-RNTI. A DCI format 1_0 in which a CRC is scrambled with a C-RNTI may include, for example, the following information.

TABLE 7

Identifier for DCI formats-[1] bit
Frequency domain resource assignment-
[$\log_2(N_{RB}^{DL,BWP} (N_{RB}^{DL,BWP} + 1)/2)$] bits
Time domain resource assignment-X bits
VRB-to-PRB mapping-1 bit.
Modulation and coding scheme-5 bits
New data indicator-1 bit
Redundancy version-2 bits
HARQ process number-4 bits
Downlink assignment index-2 bits
TPC command for scheduled PUCCH-[2] bits
PUCCH resource indicator-3 bits
PDSCH-to-HARQ feedback timing indicator-[3] bits A DCI format 1_1 may be used as non-fallback DCI for scheduling a PDSCH, and in this case, a CRC may be scrambled with a C-RNTI. A DCI format 1_1 in which a CRC is scrambled with a C-RNTI may include, for example, the following information.

TABLE 8

Carrier indicator-0 or 3 bits
Identifier for DCI formats-[1] bits
Bandwidth part indicator-0, 1 or 2 bits
Frequency domain resource assignment
For resource allocation type 0, [$N_{RB}^{DLBWP}/p$] bits
For resource allocation type 1, [$\log_2(N_{RB}^{DLBWP}(N_{RB}^{DLBWP} + 1)/2)$] bits
Time domain resource assignment-1, 2, 3, or 4 bits
VRB-to-PRB mapping-0 or 1 bit, only for resource allocation type 1.
0 bit if only resource allocation type 0 is configured;
1 bit otherwise.
PRB bundling size indicator-0 or 1 bit
Rate matching indicator-0, 1, or 2 bits TABLE 8-continued ZP CSI-RS trigger-0, 1, or 2 bits
For transport block 1:
Modulation and coding scheme-5 bits
New data indicator-1 bit
Redundancy version-2 bits
For transport block 2:
Modulation and coding scheme-5 bits
New data indicator-1 bit
Redundancy version-2 bits
HARQ process number-4 bits
Downlink assignment index-0 or 2 or 4 bits
TPC command for scheduled PUCCH-2 bits
PUCCH resource indicator-3 bits
PDSCH-TO-HARQ_feedback timing indicator-3 bits
Antenna ports-4, 5 or 6 bits
Transmission configuration indication-0 or 3 bits
SRS request-2 bits
CBG transmission information-0, 2, 4, 6, or 8 bits
CBG flushing out information-0 or 1 bit
DMRS sequence initialization-1 bit For example, a detailed description of each control information included in a DCI format 1_1, which is scheduling control information (DL grant) on downlink data is as follows.

Carrier indicator: indicates on which carrier data scheduled by DCI is transmitted—0 or 3 bits Identifier for DCI formats: indicates the DCI format, and specifically, it is an indicator for distinguishing whether the corresponding DCI is for downlink or uplink. —[1] bits Bandwidth part indicator: indicates when there is a change in the bandwidth part—0, 1 or 2 bits Frequency domain resource assignment: resource allocation information indicating frequency domain resource allocation, and a represented resource varies according to whether a resource allocation type is 0 or 1.

Time domain resource assignment: resource allocation information indicating time domain resource allocation and may indicate one configuration of higher layer signaling or a predetermined PDSCH time domain resource allocation list—1, 2, 3, or 4 bits VRB-to-PRB mapping: indicates a mapping relationship between a virtual resource block (VRB) and a physical resource block (PRB)—0 or 1 bit PRB bundling size indicator: indicates the size of physical resource block bundling assuming that the same precoding is applied—0 or 1 bit Rate matching indicator: indicates which rate match group of rate match groups configured to an upper layer applied to the PDSCH is applied—0, 1, or 2 bits ZP CSI-RS trigger: triggers a zero power channel state information reference signal—0, 1, or 2 bits Transport block (TB) related configuration information: indicates a modulation and coding scheme (MCS), a new data indicator (NDI) and a redundancy version (RV) for one or two TBs.

Modulation and coding scheme (MCS): indicates a modulation scheme and coding rate used for data transmission. That is, it may indicate a coding rate value that may notify TBS and channel coding information together with information on whether it is QPSK, 16QAM, 64QAM, or 256QAM.

New data indicator: indicates whether transmission is HARQ initial transmission or retransmission.

Redundancy version: indicates a redundancy version of HARQ.

HARQ process number: indicates a HARQ process number applied to the PDSCH—4 bits Downlink assignment index: an index for generating a dynamic HARQ-ACK codebook when reporting HARQ-ACK for a PDSCH—0 or 2 or 4 bits TPC command for scheduled PUCCH: Power control information applied to a PUCCH for reporting HARQ-ACK for a PDSCH—2 bits PUCCH resource indicator: information indicating a resource of a PUCCH for reporting HARQ-ACK for a PDSCH—3 bits PDSCH-to-HARQ_feedback timing indicator: Configuration information on a slot in which a PUCCH for reporting HARQ-ACK for a PDSCH is transmitted—3 bits Antenna ports: information indicating an antenna port of the PDSCH DMRS and a DMRS CDM group in which a PDSCH is not transmitted—4, 5 or 6 bits Transmission configuration indication: information indicating beam related information of a PDSCH—0 or 3 bits SRS request: information requesting SRS transmission—2 bits CBG transmission information: information indicating data corresponding to which code block group (CBG) is transmitted through a PDSCH when code block group-based retransmission is configured—0, 2, 4, 6, or 8 bits CBG flushing out information: information indicating whether a code block group previously received by the UE may be used for HARQ combining—0 or 1 bit DMRS sequence initialization: indicates a DMRS sequence initialization parameter—1 bit Hereinafter, a method of allocating time domain resources for a data channel in a 5G communication system will be described.

The base station may configure a table for time domain resource allocation information on a downlink data channel (PDSCH) and an uplink data channel (PUSCH) to the UE through higher layer signaling (e.g., RRC signaling). For the PDSCH, a table consisting of the maximum maxNrofDL-Allocations=16 entries may be configured, and for the PUSCH, a table consisting of the maximum maxNrofUL-Allocations=16 entries may be configured. The time domain resource allocation information may include, for example, PDCCH-to-PDSCH slot timing (corresponding to a time interval in slot units between a timing in which the PDCCH is received and a timing in which the PDSCH scheduled by the received PDCCH is transmitted, denoted by K0) or PDCCH-to-PUSCH slot timing (corresponding to a time interval in slot units between a timing in which the PDCCH is received and a timing in which the PUSCH scheduled by the received PDCCH is transmitted, denoted by K2), information on a location and length of a start symbol in which the PDSCH or the PUSCH is scheduled in the slot, a mapping type of the PDSCH or the PUSCH, and the like. For example, information as illustrated in Tables 9 and 10 may be notified from the base station to the UE.

TABLE 9

PDSCH-TimeDomainResourceAllocationList information element
PDSCH-TimeDomainResourceAllocationList ::= SEQUENCE (SIZE(1..maxNrofDL- TABLE 9-continued

```
Allocations)) OF PDSCH-TimeDomainResourceAllocation
PDSCH-TimeDomainResourceAllocation ::=   SEQUENCE {
    k0                                                      INTEGER(0..32)
    OPTIONAL,   -- Need S
    (PDCCH-to-PDSCH timing, slot unit)
    mappingType                          ENUMERATED {typeA, typeB},
    (PDSCH mapping type)
    startSymbolAndLength                 INTEGER (0..127)
    (Start symbol and length of PDSCH)
}
```

TABLE 10

```
PUSCH-TimeDomainResourceAllocation information element
PUSCH-TimeDomainResourceAllocationList ::=  SEQUENCE      (SIZE(1..maxNrofUL-
Allocations)) OF PUSCH-TimeDomainResourceAllocation
PUSCH-TimeDomainResourceAllocation ::=   SEQUENCE {
    k2                                                      INTEGER(0..32)
    OPTIONAL,   -- Need S
    (PDCCH-to-PUSCH timing, slot unit)
    mappingType                          ENUMERATED {typeA, typeB},
    (PUSCH mapping type)
    startSymbolAndLength                 INTEGER (0..127)
    (start symbol and length of PUSCH)
}
```

The base station may notify the UE of one of the entries in a table for the time domain resource allocation information through L1 signaling (e.g., DCI) (e.g., it may be indicated by a 'time domain resource allocation' field in DCI). The UE may obtain time domain resource allocation information for the PDSCH or the PUSCH based on the DCI received from the base station.

In the above description, in the case of data transmission through the PDSCH or the PUSCH, time domain resource assignment may be delivered by information on a slot in which the PDSCH/PUSCH is transmitted, a start symbol location S in the corresponding slot, and the number L of symbols to which the PDSCH/PUSCH is mapped. In the above description, S may be a relative location from the start of the slot, L may be the number of consecutive symbols, and S and L may be determined from a start and length indicator value (SLIV) defined as in Equation 1.

if $(L-1) \leq 7$ then $$SLIV=14 \cdot (L-1)+S$$

else $$SLIV=14 \cdot (14-L+1)+(14-1-S) \quad \text{[Equation 1]}$$

where $0 < L \leq 14-S$

In the NR system, the UE may receive information on an SLIV value, a PDSCH/PUSCH mapping type, and a slot to which the PDSCH/PUSCH is transmitted in one row through RRC configuration (e.g., the information may be configured in the form of a table). Thereafter, in time domain resource allocation of the DCI, by indicating an index value in the configured table, the base station may transmit information on the SLIV value, the PDSCH/PUSCH mapping type, and the slot to which the PDSCH/PUSCH is transmitted to the UE.

In the NR system, as a PDSCH mapping type, a type A and a type B were defined. In a PDSCH mapping type A, a first symbol of DMRS symbols is located in a second or third OFDM symbol of the slot. In a PDSCH mapping type B, the first symbol of DMRS symbols of the first OFDM symbol in a time domain resource allocated to PUSCH transmission is located.

Downlink data may be transmitted on a PDSCH, which is a physical channel for downlink data transmission. The PDSCH may be transmitted after the control channel transmission period, and scheduling information such as a specific mapping location and a modulation method in the frequency range is determined based on the DCI transmitted through the PDCCH.

Among the control information constituting the DCI, the base station notifies the UE of a modulation scheme applied to the PDSCH to be transmitted and a size of data to be transmitted (transport block size (TBS)) through the MCS. In an embodiment, the MCS may be configured with 5 bits or more or fewer bits. The TBS corresponds to a size before channel coding for error correction is applied to data (transport block, TB) to be transmitted by the base station.

In the disclosure, a transport block (TB) may include a medium access control (MAC) header, a MAC control element, one or more MAC service data unit (SDU), and padding bits. Alternatively, the TB may indicate a data unit or MAC protocol data unit (PDU) delivered from the MAC layer to the physical layer.

Modulation methods supported in the NR system are quadrature phase shift keying (QPSK), 16 quadrature amplitude modulation (QAM), 64QAM, and 256QAM, and each modulation order (Qm) corresponds to 2, 4, 6, and 8. That is, 2 bits per symbol in the case of QPSK modulation, 4 bits per symbol in the case of 16QAM modulation, 6 bits per symbol in the case of 64QAM modulation, and 8 bits per symbol in the case of 256QAM modulation may be transmitted.

Hereinafter, a downlink control channel in a 5G communication system will be described in more detail with reference to the drawings.

Figure 4:
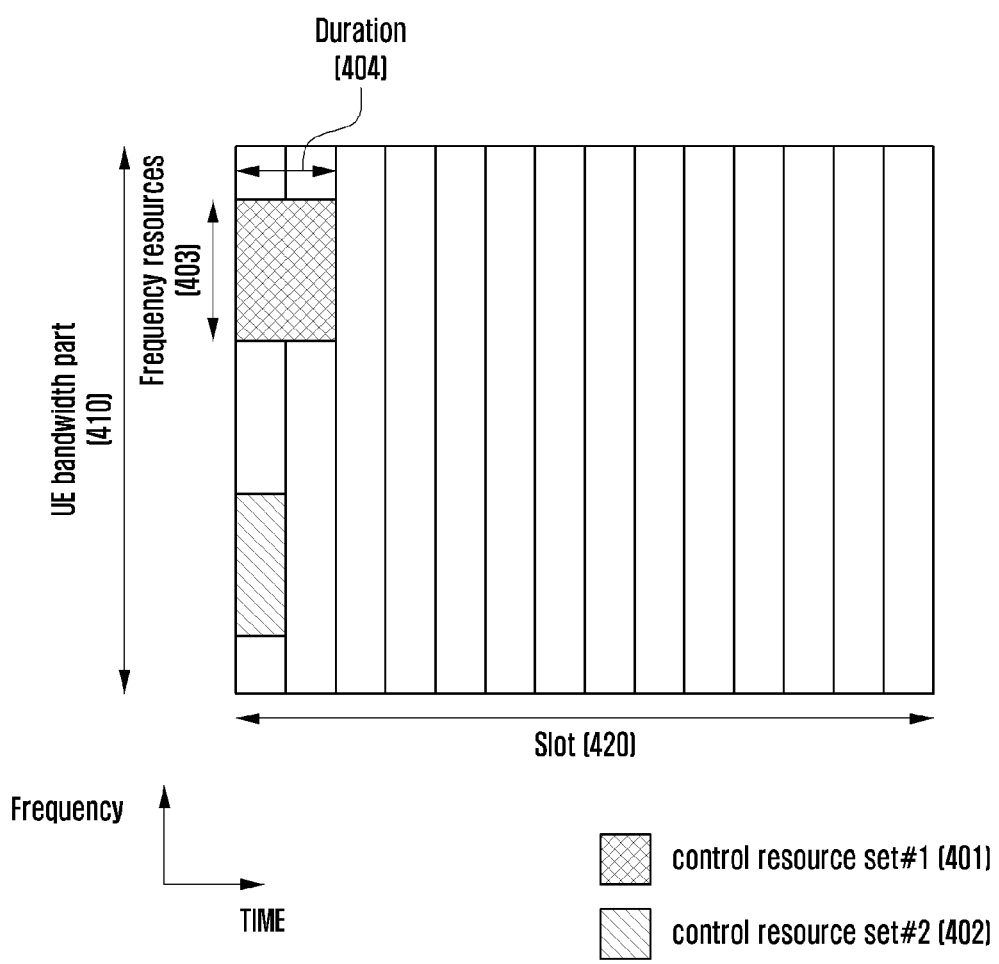
FIG. 4 illustrates a diagram of an example of a control region to which a downlink control channel is transmitted in a 5G wireless communication system.

FIG. 4 illustrates a diagram of an example of a control region to which a downlink control channel is transmitted in a 5G wireless communication system. FIG. 4 illustrates an example in which two control regions (control region #1, 401, control region #2, 402) are configured in one slot 420 on a time axis and in which a UE bandwidth part 410 is configured on a frequency axis. The control regions 401 and 402 may be configured to a specific frequency resource 403 within the entire UE bandwidth part 410 on the frequency axis. One or a plurality of OFDM symbols may be configured on a time axis, and this may be defined to a control resource set duration 404. Referring to the example illustrated in FIG. 2, the control region #1, 201 is set to a control resource set duration of 2 symbols, and the control region #2, 402 is set to a control resource set duration of 1 symbol.

The above-described control region in 5G may be configured by the base station to the UE through higher layer signaling (e.g., system information, MIB, RRC signaling). Configuring the control region to the UE means providing information such as a control region identifier, a frequency location of the control region, and a symbol length of the control region. For example, the higher layer signaling may include information of Table 11.

TABLE 11

```
ControlResourceSet ::=            SEQUENCE {
  --Corresponds to L1 parameter 'CORESET-ID'
  controlResourceSetId            ControlResourceSetId,
  (Control region identity)
  frequencyDomainResources        BIT STRING (SIZE (45)),
  (Frequency axis resource allocation information)
  duration                        INTEGER (1..maxCoReSetDuration),
  (Time axis resource allocation information)
  cce-REG-MappingType             CHOICE {
  (CCE-to-REG mapping method)
    interleaved                   SEQUENCE {
      reg-BundleSize                ENUMERATED {n2, n3, n6},
      (REG bundle size)
      precoderGranularity           ENUMERATED {sameAsREG-
bundle, allContiguousRBs},
      interleaverSize               ENUMERATED {n2, n3, n6}
      (Interleaver size)
      shiftIndex
INTEGER(0..maxNrofPhysicalResourceBlocks-1)
OPTIONAL
      (Interleaver shift)
    },
    nonInterleaved                NULL
  },
  tci-StatesPDCCH                 SEQUENCE(SIZE    (1..maxNrofTCI-
StatesPDCCH)) OF TCI-StateId            OPTIONAL,
    (QCL configuration information)
  tci-PresentInDCI                ENUMERATED {enabled}
                      OPTIONAL, -- Need S
}
```

In Table 11, tci-StatesPDCCH (simply referred to as transmission configuration indication (TCI) state) configuration information may include one or a plurality of SS/PBCH block indexes or channel state information reference signal (CSI-RS) index information in QCL relationship with DMRS transmitted in a corresponding control region.

Figure 5:
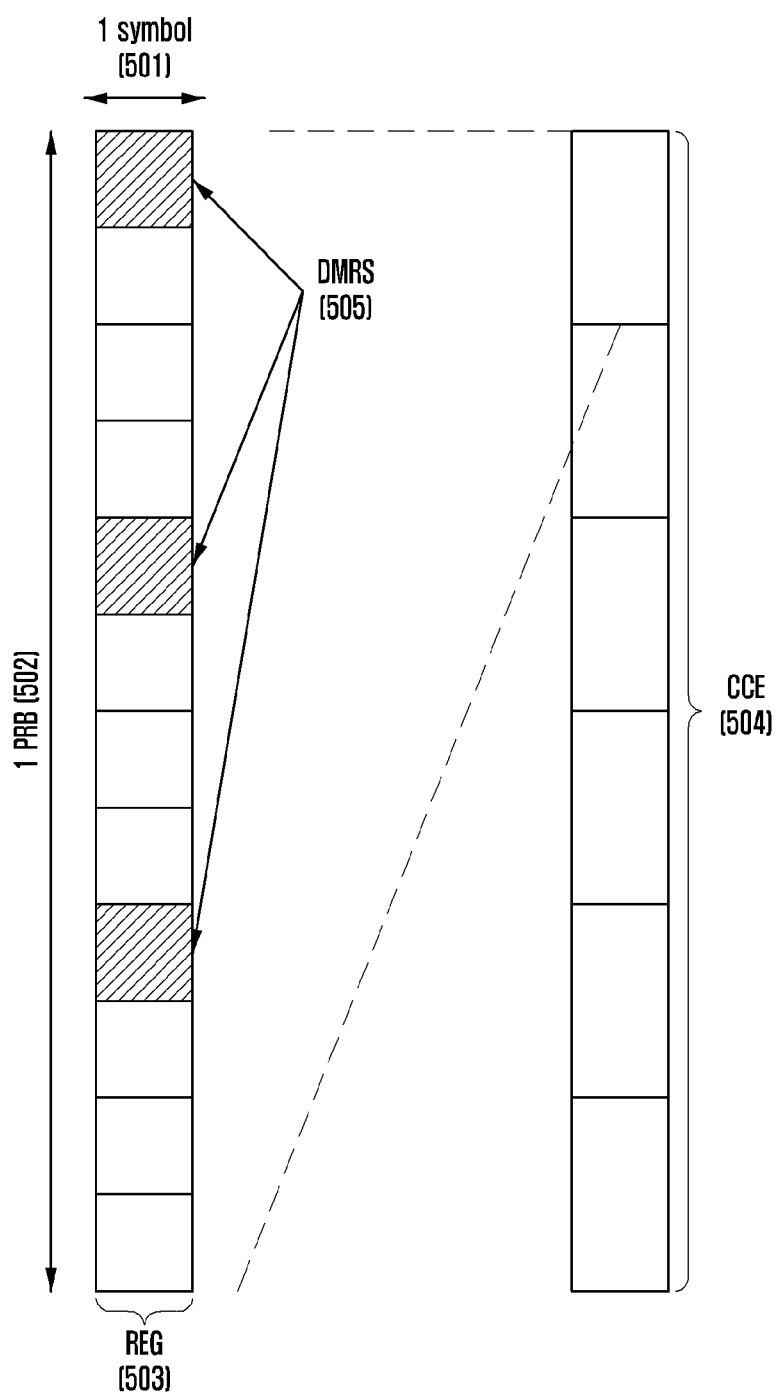
FIG. 5 illustrates a diagram of a resource structure of a downlink control channel in a wireless communication system according to various embodiments of the disclosure.

FIG. 5 illustrates a diagram of a resource structure of a downlink control channel in a wireless communication system according to various embodiments of the disclosure. Specifically, FIG. 5 illustrates an example of a basic unit of time and frequency resources constituting a downlink control channel that can be used in 5G.

Referring to FIG. 5, a basic unit of time and frequency resources constituting a downlink control channel (e.g., PDCCH) may be referred to as a resource element group (REG) 503, and the REG 503 may be defined to 1 OFDM symbol 501 on the time axis and as 1 physical resource block (PRB) 502 on the frequency axis, that is, 12 subcarriers. The base station may configure a downlink control channel allocation unit by concatenating the REG 503.

Referring to FIG. 5, when a basic unit to which a downlink control channel is allocated in 5G is referred to as a control channel element (CCE) 504, one CCE 504 may be configured with a plurality of REGs 503. When the REG 503 illustrated in FIG. 5 is described as an example, the REG 503 may be configured with 12 REs, and when 1 CCE 504 is configured with, for example, 6 REGs 503, 1 CCE 504 may be configured with 72 REs. When the downlink control resource set is configured, the corresponding region may be configured with a plurality of CCEs 504, and a specific downlink control channel may be mapped and transmitted to one or a plurality of CCEs 504 according to an aggregation level (AL) in the control resource set. The CCEs 504 in the control resource set are divided by numbers, and in this case, the numbers of the CCEs 504 may be assigned according to a logical mapping scheme.

Referring to FIG. 5, a basic unit, that is, the REG 503 of the downlink control channel may include both REs to which the DCI is mapped and a region to which a DMRS 505, which is a reference signal for decoding the REs, is mapped. As illustrated in FIG. 5, for example, three DMRSs 505 may be transmitted within 1 REG 503. The number of CCEs required for transmitting the PDCCH may be 1, 2, 4, 8, or 16 according to an aggregation level (AL), and the number of different CCEs may be used for implementing link adaptation of the downlink control channel. For example, when AL=L, one downlink control channel may be transmitted through the L number of CCEs. The UE needs to detect a signal without knowing information on the downlink control channel, and for blind decoding, a search space indicating a set of CCEs is defined. The search space is a set of downlink control channel candidates consisting of CCEs in which the UE should attempt to decode on a given aggregation level, and because there are various aggregation levels that make one bundle with 1, 2, 4, 8, or 16 CCEs, the UE may have a plurality of search spaces. A search space set may be defined as a set of search spaces in all configured aggregation levels.

The search space may be classified into a common search space and a UE-specific search space. A certain group of UEs or all UEs may search for a common search space of the PDCCH in order to receive cell-common control information such as dynamic scheduling or paging messages for system information. For example, PDSCH scheduling allocation information for transmission of the SIB including operator information of the cell may be received by searching for a common search space of the PDCCH. In the case of the common search space, because a certain group of UEs or all UEs should receive the PDCCH, the common search space may be defined as a set of pre-promised CCEs. Scheduling allocation information on UE-specific PDSCH or PUSCH may be received by searching for the UE-specific search space of the PDCCH. The UE-specific search space may be UE-specifically defined as a function of an identity of the UE and various system parameters.

In the 5G system, a parameter for a search space for the PDCCH may be configured from the base station to the UE through higher layer signaling (e.g., SIB, MIB, RRC signaling). For example, the base station may set the number of PDCCH candidates in each aggregation level L, a monitoring period for the search space, a monitoring opportunity in units of symbols in a slot for the search space, a search space type (common search space or UE-specific search space), a combination of a DCI format and an RNTI to be monitored in the corresponding search space, a control resource set index for monitoring the search space, and the like to the UE. For example, configuration information on the search space for the PDCCH may include the following information.

space. In the X-RNTI and Y-RNTI, "X" and "Y" may correspond to one of various RNTIs to be described later.

According to the configuration information, one or a plurality of search space sets may exist in the common search space or the UE-specific search space. For example, a search space set #1 and a search space set #2 may be configured as a common search space, and a search space set #3 and a search space set #4 may be set as a UE-specific search space.

In the common search space, a combination of the following DCI format and RNTI may be monitored. Various embodiments of the disclosure are not limited to the following examples.

DCI format 0_0/1_0 with CRC scrambled by C-RNTI, CS-RNTI, MCS-C-RNTI, SP-CSI-RNTI, RA-RNTI, TC-RNTI, P-RNTI, or SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, or TPC-PUCCH-RNTI DCI format 2_3 with CRC scrambled by TPC-SRS-RNTI In the UE-specific search space, a combination of the following DCI format and RNTI may be monitored. Various embodiments of the disclosure are not limited to the following examples.

DCI format 0_0/1_0 with CRC scrambled by C-RNTI, CS-RNTI, or TC-RNTI

TABLE 12

```
ControlResourceSet ::=          SEQUENCE {
   -- Corresponds to L1 parameter 'CORESET-ID'
   controlResourceSetId         ControlResourceSetId,
   (Control region identity)
   frequencyDomainResources     BIT STRING (SIZE (45)),
   (Frequency axis resource allocation information)
   duration                     INTEGER (1..maxCoReSetDuration),
   (Time axis resource allocation information)
   cce-REG-MappingType          CHOICE {
   (CCE-to-REG mapping method)
      interleaved               SEQUENCE {
         reg-BundleSize         ENUMERATED {n2, n3, n6},
         (REG bundle size)
         precoderGranularity
         ENUMERATED {sameAsREG-bundle, allContiguousRBs},
            interleaverSize
         ENUMERATED {n2, n3, n6}
         (Interleaver size)
         shiftIndex
         INTEGER(0..maxNrofPhysicalResourceBlocks-1)
                     OPTIONAL
         (Interleaver shift)
      },
      nonInterleaved                                  NULL
   },
   tci-StatesPDCCH
   SEQUENCE(SIZE (1..maxNrofTCI-StatesPDCCH)) OF TCI-StateId
         OPTIONAL,
   (QCL configuration information)
      tci-PresentInDCI                        ENUMERATED
{enabled}
               OPTIONAL,    -- Need S
}
```

According to the configuration information, the base station may configure one or a plurality of search space sets to the UE. According to an embodiment, the base station may set a search space set 1 and a search space set 2 to the UE, and set to monitor a DCI format A scrambled with an X-RNTI in the search space set 1 in the common search space, and set to monitor a DCI format B scrambled with a Y-RNTI in a search space set 2 in a UE-specific search DCI format 1_0/1_1 with CRC scrambled by C-RNTI, CS-RNTI, or TC-RNTI The specified RNTIs may follow the definitions and uses below.

C-RNTI (Cell RNTI): for UE-specific PDSCH scheduling

MCS-C-RNTI (Modulation Coding Scheme C-RNTI): for UE-specific PDSCH scheduling

TC-RNTI (Temporary Cell RNTI): for UE-specific PDSCH scheduling

CS-RNTI (Configured Scheduling RNTI): for semi-statically configured UE-specific PDSCH scheduling RA-RNTI (Random Access RNTI): for PDSCH scheduling in random access step P-RNTI (Paging RNTI): for PDSCH scheduling in which paging is transmitted SI-RNTI (System Information RNTI): for PDSCH scheduling in which system information is transmitted INT-RNTI (Interruption RNTI): for notifying whether a PDSCH is punctured TPC-PUSCH-RNTI (Transmit Power Control for PUSCH RNTI): for indicating power control command for PUSCH TPC-PUCCH-RNTI (Transmit Power Control for PUCCH RNTI): for indicating power control command for PUCCH TPC-SRS-RNTI (Transmit Power Control for SRS RNTI): for indicating power control command for SRS The above specified DCI formats may follow the definition below.

configured to the UE by the base station) and the time index in the case of the UE-specific search space.

For a TB to be transmitted in the NR system, a maximum length of one code block may be determined according to a type of applied channel coding, and the TB and a CRC added to the TB according to the maximum length of the code block may be divided into code blocks.

In the conventional LTE system, a CRC for a CB is added to the divided CB, and data bits and CRC of the CB are encoded into a channel code, coded bits are determined, and the number of rate-matched bits of each coded bit was determined, as promised in advance.

A size of TB (TBS) in the NR system may be calculated through the following steps.

Step 1: $N_{RE}'$, which is the number of REs allocated to PDSCH mapping in one PRB in the allocated resource is calculated. $N_{RE}'$ may be calculated as $N_{sc}^{RB} \cdot N_{symb}^{sh} - N_{DMRS}^{PRB} - N_{oh}^{PRB}$. where $N_{sc}^{RB}$ is 12 and $N_{symb}^{sh}$ may represent the number of OFDM symbols allocated to the PDSCH. $N_{DMRS}^{PRB}$ is the number of REs in one PRB occupied by DMRSs of the same CDM group. $N_{oh}^{PRB}$ is the number of REs occupied by an overhead in one PRB

TABLE 13

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, a search space of the aggregation level L in the control resource set p and the search space set s may be represented as follows.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \quad \text{[Equation 2]}$$

L: aggregation level
$n_{CI}$: carrier index
$N_{CCE,p}$: the number of total CCEs existing in the control resource set p
$n_{s,f}^\mu$: slot index
$M_{p,s,max}^{(L)}$: the number of PDCCH candidates of the aggregation level L
$m_{sn\_CI} = 0, \ldots, M_{p,s,max}^{(L)} - 1$: PDCCH candidates index of the aggregation level L
$i = 0, \ldots, L-1$ $$Y_{p,n_{s,f}^\mu} = \left( A_p \cdot Y_{p,n_{s,f}^\mu - 1} \right) \bmod D,$$

$Y_{p,-1} = n_{RNTI} \neq 0$, $A_0 = 39827$, $A_1 = 39829$, $A_2 = 39839$, $D = 65537$
$n_{RNTI}$: UE identifier
$Y\_(p, n_{s,f}^\mu)$ value may correspond to 0 in the case of a common search space.

The $Y\_(p, n_{s,f}^\mu)$ value may correspond to a value that changes according to an identity of the UE (C-RNTI or ID configured through higher signaling, and may be set to one of 0, 6, 12, or 18. Thereafter, the number $N_{RE}$ of total REs allocated to the PDSCH may be calculated. $N_{RE}$ is calculated as $\min(156, N_{RE}') \cdot n_{PRB}$, and $n_{PRB}$ denotes the number of PRBs allocated to the UE.

Step 2: The number $N_{info}$ of temporary information bits may be calculated as $N_{RE} * R * Q_m * v$. Here, R is a code rate, Qm is modulation order, and information on this value may be transmitted using an MCS bitfield of the DCI and a pre-promised table. Further, v is the number of allocated layers. If $N_{info} \leq 3824$, the TBS may be calculated through step 3. Otherwise, the TBS may be calculated through step 4.

Step 3: $N_{info}'$ may be calculated through equations of $$N_{info}' = \max\left(24, 2^n * \left\lfloor \frac{N_{info}}{2^n} \right\rfloor\right)$$

and $n = \max(3, \lfloor \log_2(N_{info}) \rfloor - 6)$. The TBS may be determined to a value closest to $N_{info}'$ among values not smaller than $N_{info}'$ in Table 14.

TABLE 14

| Index | TBS | Index | TBS | Index | TBS | Index | TBS |
|---|---|---|---|---|---|---|---|
| 1 | 24 | 31 | 336 | 61 | 1288 | 91 | 3624 |
| 2 | 32 | 32 | 352 | 62 | 1320 | 92 | 3752 |
| 3 | 40 | 33 | 368 | 63 | 1352 | 93 | 3824 |

TABLE 14-continued

| Index | TBS | Index | TBS | Index | TBS | Index | TBS |
|---|---|---|---|---|---|---|---|
| 4 | 48 | 34 | 384 | 64 | 1416 | | |
| 5 | 56 | 35 | 408 | 65 | 1480 | | |
| 6 | 64 | 36 | 432 | 66 | 1544 | | |
| 7 | 72 | 37 | 456 | 67 | 1608 | | |
| 8 | 80 | 38 | 480 | 68 | 1672 | | |
| 9 | 88 | 39 | 504 | 69 | 1736 | | |
| 10 | 96 | 40 | 528 | 70 | 1800 | | |
| 11 | 104 | 41 | 552 | 71 | 1864 | | |
| 12 | 112 | 42 | 576 | 72 | 1928 | | |
| 13 | 120 | 43 | 608 | 73 | 2024 | | |
| 14 | 128 | 44 | 640 | 74 | 2088 | | |
| 15 | 136 | 45 | 672 | 75 | 2152 | | |
| 16 | 144 | 46 | 704 | 76 | 2216 | | |
| 17 | 152 | 47 | 736 | 77 | 2280 | | |
| 18 | 160 | 48 | 768 | 78 | 2408 | | |
| 19 | 168 | 49 | 808 | 79 | 2472 | | |
| 20 | 176 | 50 | 848 | 80 | 2636 | | |
| 21 | 184 | 51 | 888 | 81 | 2600 | | |
| 22 | 192 | 52 | 928 | 82 | 2664 | | |
| 23 | 208 | 53 | 984 | 83 | 2728 | | |
| 24 | 224 | 54 | 1032 | 84 | 2792 | | |
| 25 | 240 | 55 | 1064 | 85 | 2856 | | |
| 26 | 256 | 56 | 1128 | 86 | 2976 | | |
| 27 | 272 | 57 | 1160 | 87 | 3104 | | |
| 28 | 288 | 58 | 1192 | 88 | 3240 | | |
| 29 | 304 | 59 | 1224 | 89 | 3368 | | |
| 30 | 320 | 60 | 1256 | 90 | 3496 | | |

Step 4: $N_{info}'$ may be calculated through equations of $$N_{info}' = \max\left(3840, 2^n \times \text{round}\left(\frac{N_{info}-24}{2^n}\right)\right)$$

and $n=\lfloor \log_2(N_{info}-24) \rfloor -5$. The TBS may be determined through a value $N_{info}'$ and the following [pseudo-code 1]. In the following description, C corresponds to the number of code blocks in which one TB includes.

[Start Pseudo-code 1]

if R ≤ 1/4

$$TBS = 8 * C * \left\lceil \frac{N_{info}'+24}{8*C} \right\rceil - 24, \quad \text{where } C = \left\lceil \frac{N_{info}'+24}{3816} \right\rceil$$

else if $N_{info}' > 8424$ $$TBS = 8 * C * \left\lceil \frac{N_{info}'+24}{8*C} \right\rceil - 24, \quad \text{where } C = \left\lceil \frac{N_{info}'+24}{8424} \right\rceil$$

else $$TBS = 8 * \left\lceil \frac{N_{info}'+24}{8} \right\rceil - 24$$

end if
end if
[End Pseudo-code 1]

When one CB is input to an LDPC encoder in the NR system, parity bits may be added and output. In this case, an amount of parity bits may vary according to an LDCP base graph. A method of sending all parity bits generated by LDPC coding to a specific input may be referred to as full buffer rate matching (FBRM), and a method of limiting the number of transmittable parity bits may be referred to as limited buffer rate matching (LBRM). When a resource is allocated for data transmission, an LDPC encoder output is made with a circular buffer, and bits of the made buffer are repeatedly transmitted as much as the allocated resource, and in this case, a length of the circular buffer may be referred to as $N_{cb}$.

When the number of all parity bits generated by LDPC coding is N, $N_{cb}=N$ in an FBRM method. In an LBRM method, $N_{cb}$ is $\min(N, N_{ref})$, $N_{ref}$ is given as $$\left\lfloor \frac{TBS_{LBRM}}{C \cdot R_{LBRM}} \right\rfloor,$$

and $R_{LBRM}$ may be determined to be ⅔. In order to obtain $TBS_{LBRM}$, the above-described method of obtaining TBS is used, and assuming the maximum layer number and maximum modulation order supported by the UE in the cell, and when the maximum modulation order Qm is configured to use an MCS table supporting 256QAM for at least one BWP in the cell, it is assumed as 8, and when the maximum modulation order Qm is not configured to use an MCS table supporting 256QAM for at least one BWP in the cell, it is assumed as 6 (64QAM), and the code rate is assumed to be the maximum code rate of 948/1024, and $N_{RE}$ is assumed to 156·$n_{PRB}$, and $n_{PRB}$ is calculated by being assumed to $n_{PRB,LBRM}$. $n_{PRB,LBRM}$ may be given as follows.

TABLE 15

| Maximum number of PRBs across all configured BWPs of a carrier | $n_{PRB,LBRM}$ |
|---|---|
| Less than 33 | 32 |
| 33 to 66 | 66 |
| 67 to 107 | 107 |
| 108 to 135 | 135 |
| 136 to 62 | 162 |
| 163 to 217 | 217 |
| Larger than 217 | 273 |

A maximum data rate supported by the UE in the NR system may be determined through Equation 3.

data rate (in $Mbps$) = $10^{-6}$ · [Equation 3]

$$\sum_{j=1}^{J}\left(v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot (1-OH^{(j)})\right)$$

In Equation 2, J is the number of carriers bundled by carrier aggregation, $R_{max}=948/1024$, $v_{layers}^{(j)}$ the number of maximum layers, $Q_m^{(j)}$ is a maximum modulation order, $f^{(j)}$ is a scaling index, and μ may mean subcarrier spacing. $f^{(j)}$ is one value of 1, 0.8, 0.75, and 0.4 and may be reported by the UE, and μ may be given as follows.

TABLE 16

| μ | Δf = $2^{\mu}$ · 15[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Further, $T_s^\mu$ is an average OFDM symbol length, $T_s^\mu$ may be calculated as $$\frac{10^{-3}}{14 \cdot 2^\mu},$$

and $N_{PRB}^{BW(j),\mu}$ is the number of maximum RBs in BW(j). $OH^{(j)}$ is an overhead value, 0.14 may give in a downlink of FR1 (band of 6 GHz or less), 0.18 may be given in an uplink, 0.08 may be given in a downlink of FR2 (band above 6 GHz), and 0.10 may be given in an uplink. Through Equation 3, a maximum data rate in a downlink in a cell having a 100 MHz frequency bandwidth at 30 kHz subcarrier spacing may be calculated as follows.

TABLE 17

| $f^{(j)}$ | $V_{Layers}^{(j)}$ | $Q_m^{(j)}$ | Rmax | $N_{PRB}^{BW(j),\mu}$ | $T_s^\mu$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

An actual data rate in which the UE may measure an actual data transmission may be a value obtained by dividing an amount of data by a data transmission time. This may be a value obtained by dividing TBS for 1 TB transmission or the sum of TBS for 2 TB transmission by a TTI length. As an example, as in the assumption obtained in Table 15, a maximum actual data rate in the downlink in a cell having a 100 MHz frequency bandwidth at 30 kHz subcarrier spacing may be determined according to the number of allocated PDSCH symbols as follows.

TABLE 18

| $N_{symb}^{sb}$ | $N_{DMRS}^{PRB}$ | $N'_{RE}$ | $N_{RE}$ | $N_{info}$ | n | $N'_{info}$ | C | TBS | TTI length (ms) | data rate (Mbps) |
|---|---|---|---|---|---|---|---|---|---|---|
| 3 | 8 | 28 | 7644 | 226453.5 | 12 | 225.280 | 27 | 225.480 | 0.107143 | 2,101.48 |
| 4 | 8 | 40 | 10920 | 323505.0 | 13 | 319.488 | 38 | 319.784 | 0.142857 | 2,238.49 |
| 5 | 8 | 52 | 14196 | 420556.5 | 13 | 417.792 | 50 | 417.976 | 0.178571 | 2,340.67 |
| 6 | 8 | 64 | 17472 | 517608.0 | 13 | 516.096 | 62 | 516.312 | 0.214286 | 2,409.46 |
| 7 | 8 | 76 | 20748 | 614659.5 | 14 | 622.592 | 74 | 622.760 | 0.250000 | 2,491.04 |
| 8 | 8 | 88 | 24024 | 711711.0 | 14 | 704.512 | 84 | 704.904 | 0.285714 | 2,467.16 |
| 9 | 8 | 100 | 27300 | 808762.5 | 14 | 802.816 | 96 | 803.304 | 0.321429 | 2,499.17 |
| 10 | 8 | 112 | 30576 | 905814.0 | 14 | 901.120 | 107 | 901.344 | 0.357143 | 2,523.76 |
| 11 | 8 | 124 | 33852 | 1002865.5 | 14 | 999.424 | 119 | 999.576 | 0.392857 | 2,544.38 |
| 12 | 8 | 136 | 37128 | 1099917.0 | 15 | 1,114.112 | 133 | 1,115.048 | 0.428571 | 2,601.78 |
| 13 | 8 | 148 | 40404 | 1196968.5 | 15 | 1,212.416 | 144 | 1,213.032 | 0.464286 | 2,612.68 |
| 14 | 8 | 160 | 43680 | 1294020.0 | 15 | 1,277.952 | 152 | 1,277.992 | 0.500000 | 2,555.98 |

A maximum data rate supported by the UE may be checked through Table 17, and an actual data rate according to the allocated TBS may be checked through Table 18. In this case, there may be a case where an actual data rate is greater than the maximum data rate according to scheduling information.

In a wireless communication system, particularly, a New Radio (NR) system, a data rate in which the UE can support may be mutually promised between the base station and the UE. This may be calculated using the maximum frequency band supported by the UE, the maximum modulation order, the maximum number of layers, and the like. However, the calculated data rate may be different from a value calculated from a transport block size (TBS) and a transmission time interval (TTI) length used for actual data transmission.

Accordingly, the UE may receive a TBS larger than a value corresponding to a data rate supported by itself, and to prevent this, there may be restrictions on the TBS that can be scheduled according to a data rate supported by the UE.

Because the UE is generally far from the base station, a signal transmitted from the UE is received by the base station after a propagation delay. The propagation delay is a value obtained by dividing a path through which radio waves are transmitted from the UE to the base station by a speed of light, and may generally be a value obtained by dividing a distance from the UE to the base station by a speed of light. In an embodiment, in the case of a UE located 100 km away from the base station, a signal transmitted from the UE is received by the base station after about 0.34 msec. Conversely, the signal transmitted from the base station is also received by the UE after about 0.34 msec. As described above, an arrival time of a signal transmitted from the UE to the base station may vary according to the distance between the UE and the base station. Therefore, when multiple UEs existing in different locations transmit signals at the same time, arrival times at the base station may all be different. In order to solve such a problem and enable signals transmitted from multiple UEs to arrive at the base station at the same time, the time for transmitting the uplink signal may be different for each UE according to the location. In 5G, NR, and LTE systems, this is referred to as timing advance.

Figure 6:
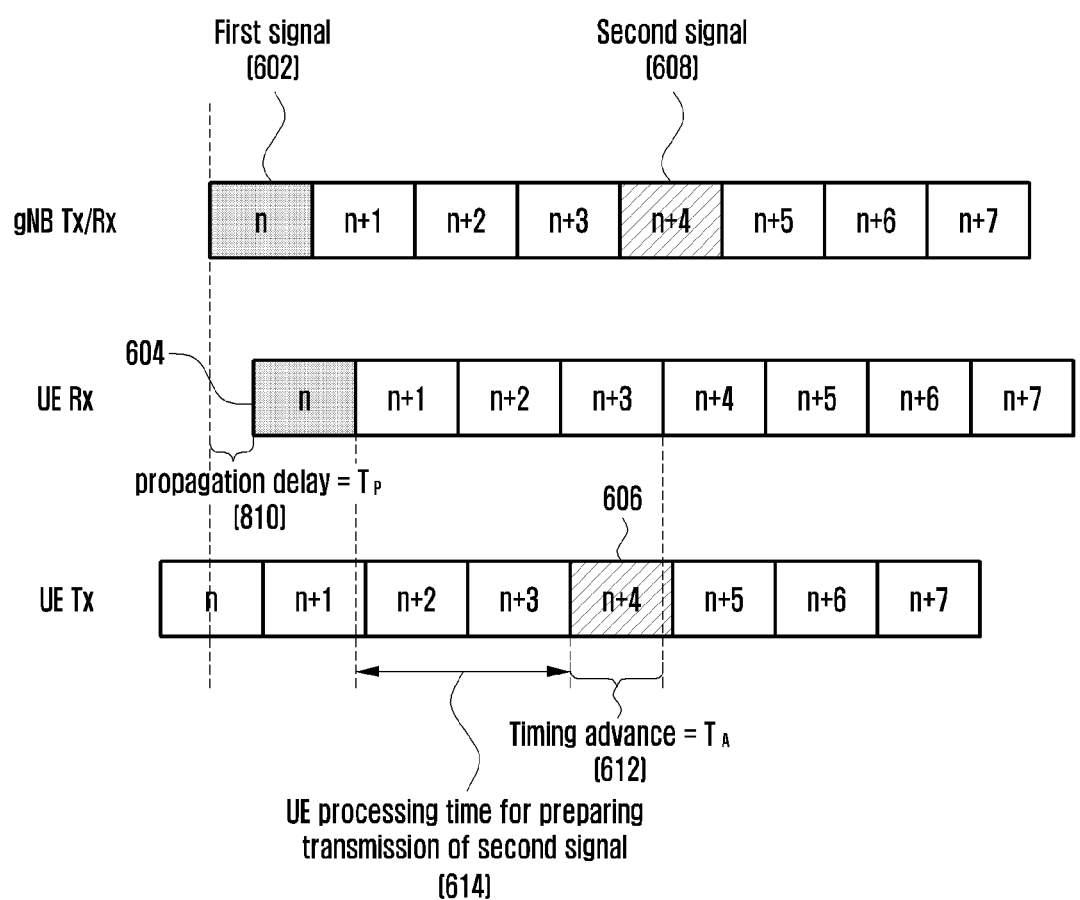
FIG. 6 illustrates a diagram of an example of a processing time of an UE according to timing advance when the UE receives a first signal and transmits a second signal thereof in a 5G system.

FIG. 6 illustrates a diagram of a processing time of a UE according to timing advance when the UE receives a first signal and transmits a second signal thereof in a 5G or NR system according to an embodiment of the disclosure.

Hereinafter, a processing time of the UE according to timing advance will be described in detail. When the base station transmits an uplink scheduling grant (UL grant) or a downlink control signal and data (DL grant and DL data) to the UE in a slot n, 602, the UE may receive an uplink scheduling grant or a downlink control signal and data in a slot n, 604. In this case, the UE may receive a signal later by a propagation delay Tp, 610 than a time in which the base station transmits a signal. In this embodiment, when the UE receives a first signal in the slot n, 604, the UE transmits a corresponding second signal in a slot n+4, 606. Even when the UE transmits a signal to the base station, in order for the signal to arrive at the base station at a specific time, at a timing 606 advanced by timing advance (TA) 612 than the slot n+4 of a signal reference received by the UE, the UE may transmit HARQ ACK/NACK for uplink data or downlink data. Therefore, in this embodiment, a time in which the UE may prepare to receive an uplink scheduling grant and transmit uplink data or receive downlink data and transmit HARQ ACK or NACK may be a time except for TA from a time corresponding to three slots 614.

In order to determine the above-described timing, the base station may calculate an absolute value of the TA of the corresponding UE. The base station may calculate an absolute value of the TA by adding or subtracting an amount of change in a TA value transmitted through higher level signaling thereafter to or from a TA value first delivered to the UE in a random access step when the UE initially accesses the base station. In the disclosure, the absolute value of the TA may be a value obtained by subtracting a start time of the nth TTI received by the UE from a start time of the nth TTI transmitted by the UE.

One of the important criteria of a cellular wireless communication system performance is packet data latency. To this end, in an LTE system, transmission and reception of signals is performed in units of subframes having a transmission time interval (hereinafter, TTI) of 1 ms. The LTE system operating as described above may support a UE (short-TTI UE) having a TTI shorter than 1 ms. However, in a 5G or NR system, a TTI may be shorter than 1 ms. A short-TTI UE is suitable for services such as voice over LTE (VoLTE) service and remote control where latency is important. Further, the short-TTI UE becomes a means for realizing a mission-critical Internet of Things (IoT) on a cellular basis.

In a 5G or NR system, when the base station transmits a PDSCH including downlink data, the DCI for scheduling the PDSCH indicates a K1 value, which is a value corresponding to timing information that transmits HARQ-ACK information of the PDSCH by the UE. When the HARQ-ACK information is not instructed to be transmitted before a symbol L1 including timing advance, the UE may transmit the HARQ-ACK information to the base station. That is, HARQ-ACK information may be transmitted from the UE to the base station at the same timing as or at a timing later than the symbol L1 including timing advance. When the HARQ-ACK information is instructed to be transmitted before the symbol L1 including timing advance, the HARQ-ACK information may not be valid HARQ-ACK information in HARQ-ACK transmission from the UE to the base station.

The symbol L1 may be the first symbol in which a cyclic prefix (CP) starts after $T_{proc,1}$ from the last timing of the PDSCH. $T_{proc,1}$ may be calculated as follows.

$$T_{proc,1} = ((N_1 + d_{1,1} + d_{1,2})(2048 + 144) \cdot \kappa 2^{-\mu}) \cdot T_C \quad \text{[Equation 4]}$$

In Equation 4, $N_1$, $d_{1,1}$, $d_{1,2}$, $\kappa$, $\mu$, and TC may be defined as follows.

When HARQ-ACK information is transmitted to a PUCCH (uplink control channel), $d_{1,1}=0$, and when the HARQ-ACK information is transmitted to a PUSCH (uplink shared channel, data channel), $d_{1,1}=1$.

When the UE receives a plurality of activated configuration carriers or carriers, the maximum timing difference between carriers may be reflected in a second signal transmission.

In the case of a PDSCH mapping type A, that is, when a first DMRS symbol location is a 3rd or 4th symbol of the slot, if a location index i of a last symbol of the PDSCH is less than 7, it is defined that $d_{1,2}=7-i$.

In the case of a PDSCH mapping type B, that is, when a first DMRS symbol location is a first symbol of the PDSCH, if a length of the PDSCH is 4 symbols, $d_{1,2}=3$, and if a length of the PDSCH is 2 symbols, $d_{1,2}=3+d$, where d is the number of symbols in which the PDSCH and the PDCCH including a control signal for scheduling the corresponding PDSCH overlap.

$N_1$ is defined as in Table 19 according to $\mu$. $\mu=0$, 1, 2, and 3 mean subcarrier spacing of 15 kHz, 30 kHz, 60 kHz, and 120 kHz, respectively.

TABLE 19

| | PDSCH decoding time) $N_1$[symbols] | |
|---|---|---|
| $\mu$ | No additional PDSCH DM-RS configured | Additional PDSCH DM-RS configured |
| 0 | 8 | 13 |
| 1 | 10 | 13 |
| 2 | 17 | 20 |
| 3 | 20 | 24 |

For a value $N_1$ provided in Table 19, a different value may be used according to UE capability.

$$T_c=1/(\Delta f_{max} \cdot N_f)\Delta f_{max}=480 \cdot 10^3 \text{ Hz}, N_f=4096, \kappa= T_s/T_c=64, T_s=1/(\Delta f_{ref} N_{f,ref}), \Delta f_{ref}= 15 \cdot 10^3 \text{ Hz}, N_{f,ref}=2048$$

Further, in the 5G or NR system, when the base station transmits control information including an uplink scheduling grant, the UE may indicate a K2 value corresponding to timing information that transmits uplink data or a PUSCH.

When the PUSCH is not instructed to be transmitted before the symbol L2 including timing advance, the UE may transmit the PUSCH to the base station. That is, the PUSCH may be transmitted from the UE to the base station at the same timing as or at a timing later than the symbol L2 including timing advance. When the PUSCH is instructed to be transmitted before the symbol L2 including timing advance, the UE may ignore uplink scheduling grant control information from the base station.

The symbol L2 may be a first symbol in which a CP of a PUSCH symbol to be transmitted after $T_{proc,2}$ from the last time of the PDCCH including scheduling grant starts. $T_{proc,2}$ may be calculated as in Equation 5.

$$T_{proc,2} = ((N_2 + d_{2,1})(2048 + 144) \cdot \kappa 2^{-\mu}) \cdot T_C \quad \text{[Equation 5]}$$

In Equation 5, $N_2$, $d_{2,1}$, $\kappa$, $\mu$, and $T_C$ may be defined as follows.

When a first symbol among PUSCH-allocated symbols includes only DMRS, $d_{2,1}=0$, otherwise $d_{2,1}=1$.

When the UE receives a plurality of activated configuration carriers or carriers, the maximum timing difference between carriers may be reflected to second signal transmission.

$N_2$ is defined as in Table 20 according to μ. μ=0, 1, 2, and 3 mean subcarrier spacing of 15 kHz, 30 kHz, 60 kHz, and 120 kHz, respectively.

TABLE 20

| μ | PUSCH preparation time $N_2$ (symbols) |
|---|---|
| 0 | 10 |
| 1 | 12 |
| 2 | 23 |
| 3 | 36 |

For the $N_2$ value provided in Table 20, a different value may be used according to UE capability.

$T_c=1/(\Delta f_{max} \cdot N_f), \Delta f_{max}=480 \cdot 10^3$ Hz, $N_f=4096, \kappa= T_s/T_c=64, T_s=1/(\Delta f_{ref} \cdot N_{f,ref}), \Delta f_{ref}= 15 \cdot 10^3$ Hz, $N_{f,ref}=2048$ The 5G or NR system may configure a frequency band part (BWP) within one carrier to designate to transmit and receive within the BWP in which a specific UE is configured. This may be aimed at reducing power consumption of the UE. The base station may configure a plurality of BWPs, and change an activated BWP in control information. A time that may be used by the UE for changing the BWP may be defined as follows.

TABLE 21

| Frequency Range | Scenario | Type 1 delay (us) | Type 2 delay (us) |
|---|---|---|---|
| 1 | 1 | 600 | 2000 |
|   | 2 | 600 | 2000 |
|   | 3 | 600 | 2000 |
|   | 4 | 400 | 950 |
| 2 | 1 | 600 | 2000 |
|   | 2 | 600 | 2000 |
|   | 3 | 600 | 2000 |
|   | 4 | 400 | 950 |

In Table 21, a frequency range 1 means a frequency band of 6 GHz or less, and a frequency range 2 means a frequency band of 6 GHz or more. In the above-described embodiment, a type 1 and a type 2 may be determined according to UE capability. Scenarios 1, 2, 3, and 4 in the above-described embodiment are given as illustrated in Table 22.

TABLE 22

|  | Center frequency change | Center frequency constant |
|---|---|---|
| Frequency bandwidth change | Scenario 3 | Scenario 2 |
| Frequency bandwidth constant | Scenario 1 | Scenario 4 when subcarrier spacing is changed |

Hereinafter, a bandwidth part (BWP) configuration in the 5G communication system will be described in detail with reference to the drawings.

Figure 7:
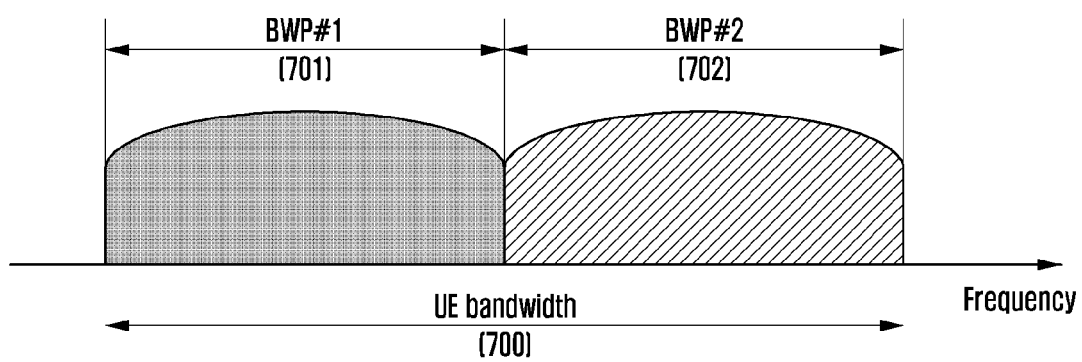
FIG. 7 illustrates a diagram of a structure of a bandwidth part in a wireless communication system according to various embodiments of the disclosure.

FIG. 7 illustrates a structure of a bandwidth part in a wireless communication system according to various embodiments of the disclosure. Specifically, FIG. 7 illustrates a diagram of an example of a configuration of a bandwidth part in a 5G communication system.

FIG. 7 illustrates an example in which a UE bandwidth 700 is configured to two bandwidth parts, that is, a bandwidth part #1 (BWP #1) 701 and a bandwidth part #2 (BWP #2) 702. The base station may configure one or a plurality of bandwidth parts to the UE, and may configure information for each bandwidth part as follows.

TABLE 23

| BWP ::= | SEQUENCE { |
|---|---|
| bwp-Id (Bandwidth part identifier) | BWP-Id, |
| locationAndBandwidth (Bandwidth part location) | INTEGER (1 . . 65536), |
| subcarrierSpacing (Subcarrier spacing) | ENUMERATED {n0, n1, n2, n3, n4, n5}, |
| cyclicPrefix (Cyclic prefix) | ENUMERATED { extended } |
| } | |

In the above description, "locationAndBandwidth" indicates a location and bandwidth in a frequency range of a bandwidth part thereof, "cyclicPrefix" indicates whether an extended cyclic prefix (CP) is used for a bandwidth part thereof, and "subcarrierSpacing" indicates subcarrier spacing to be used in a bandwidth part thereof.

Various embodiments of the disclosure are not limited to the above example, and in addition to the configuration information, various parameters related to a bandwidth part may be configured to the UE. The information may be transmitted by the base station to the UE through higher layer signaling, for example, radio resource control (RRC) signaling. At least one bandwidth part of the configured one or a plurality of bandwidth parts may be activated. Whether to activate the configured bandwidth part may be semi-statically transmitted from the base station to the UE through RRC signaling or may be dynamically transmitted through downlink control information (DCI).

A configuration of the bandwidth part supported in the 5G system may be used for various purposes.

According to an embodiment, when a bandwidth supported by the UE is smaller than a system bandwidth, this may be supported through a configuration of the bandwidth part. For example, the base station configures a frequency location of the bandwidth part to the UE so that the UE may transmit and receive data at a specific frequency location within the system bandwidth.

According to an embodiment, the base station may configure a plurality of bandwidth parts to the UE for the purpose of supporting different numerology. For example, in order to support both data transmission and reception using subcarrier spacing of 15 kHz and subcarrier spacing of 30 kHz to a certain UE, two bandwidth parts may be configured at subcarrier spacing of 15 kHz and 30 kHz, respectively. Different bandwidth parts may be subjected to frequency division multiplexing, and in order to transmit and receive data at specific subcarrier spacing, a bandwidth part configured at the corresponding subcarrier spacing may be activated.

According to an embodiment, for the purpose of reducing power consumption of the UE, the base station may configure bandwidth parts having different sizes of bandwidth to the UE. For example, when the UE supports a very large bandwidth, for example, a bandwidth of 100 MHz and always transmits and receives data using the corresponding bandwidth, very large power consumption may occur. In particular, monitoring an unnecessary downlink control channel with a large bandwidth of 100 MHz in a situation in which there is no traffic may be very inefficient in terms of power consumption. For the purpose of reducing power consumption of the UE, the base station may configure a bandwidth part of a relatively small bandwidth, for example, a bandwidth part of 20 MHz to the UE. In a situation in which there is no traffic, the UE may perform a monitoring operation in a bandwidth part of 20 MHz, and when data occurs, the UE may transmit and receive data in a bandwidth part of 100 MHz according to the instruction of the base station.

When one or more bandwidth parts are configured to the UE, the base station may indicate to the terminal to change the bandwidth part using a bandwidth part indicator field in the DCI. For example, in FIG. 7, when a currently activated bandwidth part of the UE is a bandwidth part #1, 701, the base station may indicate a bandwidth part #2, 702 with a bandwidth part indicator in the DCI to the UE, and the UE may change the bandwidth part to the bandwidth part #2, 702 indicated by the bandwidth part indicator in the received DCI.

As described above, because a DCI-based bandwidth part change may be indicated by the DCI for scheduling a physical downlink shared channel (PDSCH) or a physical uplink shared channel (PUSCH), when the UE receives a request for a bandwidth part change, the UE should be able to receive or transmit the PDSCH or PUSCH scheduled by the corresponding DCI without difficulty in the changed bandwidth part. To this end, the standard stipulates a requirement for a propagation delay ($T_{BWP}$) required when changing the bandwidth part, and may be defined, for example, as follows.

TABLE 24

| NR Slot length | | BWP switch delay $T_{BWP}$ (slots) | |
|---|---|---|---|
| μ | (ms) | Type 1$^{Note\ 1}$ | Type 2$^{Note\ 1}$ |
| 0 | 1 | [1] | [3] |
| 1 | 0.5 | [2] | [5] |
| 2 | 0.25 | [3] | [9] |
| 3 | 0.125 | [6] | [17] |

Note 1:
Depends on UE capability.
Note 2:
If the BWP switch involves changing of SCS, the BWP switch delay is determined by the larger one between the SCS before BWP switch and the SCS after BWP switch.

The requirement for the bandwidth part change propagation delay supports a type 1 or type 2 according to a capability of the UE. The UE may report a supportable bandwidth part propagation delay type to the base station.

According to the above-described bandwidth part change propagation delay requirement, when the UE receives the DCI including a bandwidth part change indicator in a slot n, the UE may complete a change to a new bandwidth part indicated by the bandwidth part change indicator at a timing not later than a slot n+$T_{BWP}$, and transmit and receive a data channel scheduled by the corresponding DCI in a new changed bandwidth part. When the base station intends to schedule the data channel with a new bandwidth part, the base station may determine time domain resource allocation for the data channel in consideration of the bandwidth part change propagation delay ($T_{BWP}$) of the UE. That is, when the base station schedules a data channel with a new bandwidth part, in a method of determining time domain resource allocation for the data channel, the base station may schedule the corresponding data channel after the bandwidth part change propagation delay. Accordingly, the UE may not expect that the DCI indicating the bandwidth part change indicates a slot offset (K0 or K2) value smaller than the bandwidth part change propagation delay ($T_{BWP}$).

When the UE receives DCI (e.g., DCI format 1_1 or 0_1) indicating a bandwidth part change, the UE may perform no transmission or reception during the corresponding time period from a third symbol of a slot that receives a PDCCH including the DCI to a start point of the slot indicated by a slot offset (K0 or K2) value indicated in a time domain resource allocation indicator field in the DCI. For example, when the UE receives DCI indicating a bandwidth part change in a slot n, and the slot offset value indicated by the DCI is K, the UE may perform no transmission or reception from a third symbol of a slot n to a symbol before a slot n+K (i.e., a last symbol of a slot n+K−1).

Hereinafter, a method of allocating frequency domain resources for a data channel in a 5G communication system will be described.

In 5G, as a method of indicating frequency domain resource allocation information for a downlink data channel (Physical Downlink Shared Channel; PDSCH) and an uplink data channel (Physical Uplink Shared Channel; PUSCH), two types, for example, a resource allocation type 0 and a resource allocation type 1 are supported.

Resource Allocation Type 0

RB allocation information may be notified from the base station to the UE in the form of a bitmap for a resource block group (RBG). In this case, the RBG may be configured with a set of consecutive virtual RBs (VRBs), and a size P of the RBG may be determined based on a value configured to a higher layer parameter (rbg-Size) and a size value of a bandwidth part defined as in the following description.

TABLE 25

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

The number $N_{RBG}$ of total RBGs of a bandwidth part i having a size of $N_{BWP,i}^{size}$ may be defined by the following equation.

$$N_{RBG}=\lceil(N_{BWP,i}^{size}+(N_{BWP,i}^{start} \bmod P))/P\rceil$$

where a size of the first RBG $RBG_0^{size}=P-N_{BWP,i}^{start} \bmod P$, a size of the last RBG is $RBG_{last}^{size}=(N_{BWP,i}^{start}+N_{BWP,i}^{size}) \bmod P$ if $(N_{BWP,i}^{start}+N_{BWP,i}^{size}) \bmod P>0$ and a size of all of the remaining RBGs is P.

Each bit of a bitmap of the $N_{RBG}$ bit size may correspond to each RBG. RBGs may be indexed in the order of increasing a frequency, starting from the lowest frequency location of the bandwidth part. For the $N_{RBG}$ number of RBGs within the bandwidth, RBG #0 to RBG #($N_{RBG}$−1) may be mapped from MSB to LSB of the RBG bitmap. When a specific bit value in the bitmap is 1, the UE may determine that the RBG corresponding to the bit value is allocated, and when the specific bit value in the bitmap is 0, the UE may determine that the RBG corresponding to the bit value is not allocated.

Resource Allocation Type 1

RB allocation information is information on a start location and length of the continuously allocated VRBs and may be notified from the base station to the terminal. In this case, interleaving or non-interleaving may be additionally applied to consecutively allocated VRBs. A resource allocation field of the resource allocation type 1 may be configured with a resource indication value (RIV), and the RIV may be configured with a starting point ($RB_{start}$) of a VRB and a length ($L_{RBs}$) of a continuously allocated RB. More specifically, the RIV in the bandwidth part of the $N_{BWP}^{size}$ may be defined as follows.

if $(L_{RBs}-1) \leq \lfloor N_{BWP}^{size}/2 \rfloor$ then $\quad$ RIV=$N_{BWP}^{size}(L_{RBs}-1)+RB_{start}$ else RIV=$N_{BWP}^{size}(N_{BWP}^{size}-L_{RBs}+1)(N_{BWP}^{size}-1-RB_{start})$ where $L_{RBs} \geq 1$ and shall not exceed $N_{BWP}^{size}-RB_{start}$ The base station may configure a resource allocation type to the UE through higher layer signaling (e.g., a higher layer parameter resourceAllocation may be configured to one of resourceAllocationType0, resourceAllocationType1, or dynamicSwitch). If the UE receives both resource allocation types 0 and 1 (or if an upper layer parameter resourceAllocation is configured to dynamicSwitch in the same way), the UE may indicate whether a bit corresponding to a most significant bit (MSB) of a field indicating resource allocation in the DCI format indicating scheduling is a resource allocation type 0 or a resource allocation type 1, and resource allocation information may be indicated through the remaining bits except for a bit corresponding to the MSB based on the indicated resource allocation type, and the UE may interpret resource allocation field information of the DCI field based on this. If the UE receives one of the resource allocation type 0 or the resource allocation type 1 (or if the upper layer parameter resourceAllocation is configured to one of resourceAllocationType0 or resourceAllocationType1 in the same way), resource allocation information may be indicated based on the resource allocation type in which a field indicating resource allocation in the DCI format indicating scheduling is configured, and the UE may interpret resource allocation field information of the DCI field based on this.

Figure 8:
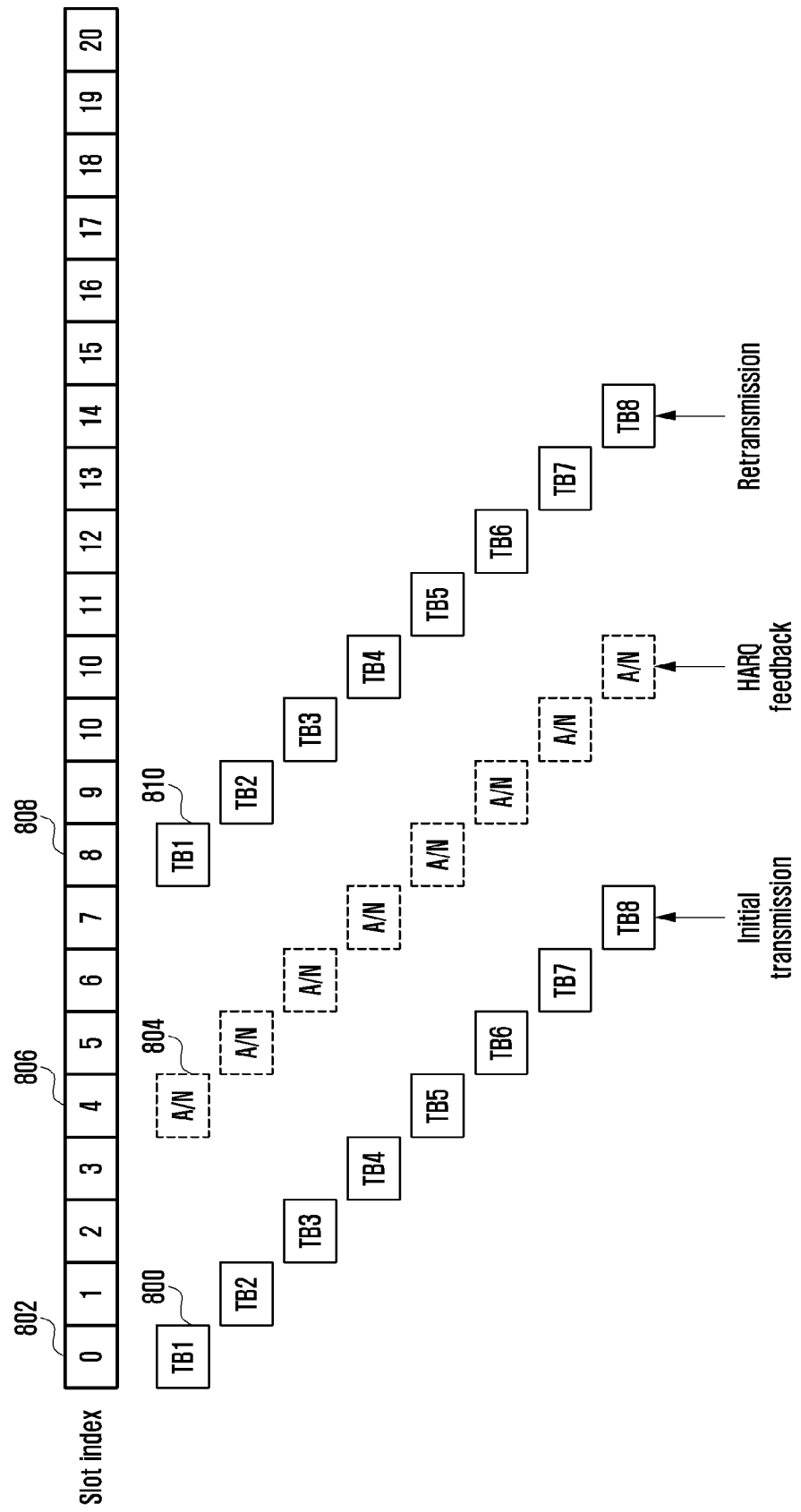
FIG. 8 illustrates a diagram of an example of scheduling and transmitting data (e.g., TB) according to a slot, receiving HARQ-ACK feedback for the corresponding data, and performing retransmission according to the feedback.

FIG. 8 illustrates a diagram of an example of scheduling and transmitting data (e.g., TBs) according to slots, receiving HARQ-ACK feedback for the corresponding data, and performing retransmission according to the feedback. In FIG. 8, a TB1 800 is initially transmitted in a slot 0, 802, and ACK/NACK feedback 804 thereof is transmitted in a slot 4, 806. When initial transmission of the TB1 fails and a NACK is received, retransmission 810 for the TB1 may be performed in a slot 8, 808. In the above description, a timing at which ACK/NACK feedback is transmitted and a timing at which the retransmission is performed may be predetermined or may be determined according to a value indicated by control information and/or higher layer signaling.

FIG. 8 illustrates an example in which TB1 to TB8 are sequentially scheduled and transmitted according to a slot from a slot 0. For example, HARQ process IDs 0 to 7 may be assigned to TB1 to TB8, respectively and transmitted. When the number of HARQ process IDs usable by the base station and the UE is only 4, it may not be possible to continuously transmit 8 different TBs.

Figure 9:
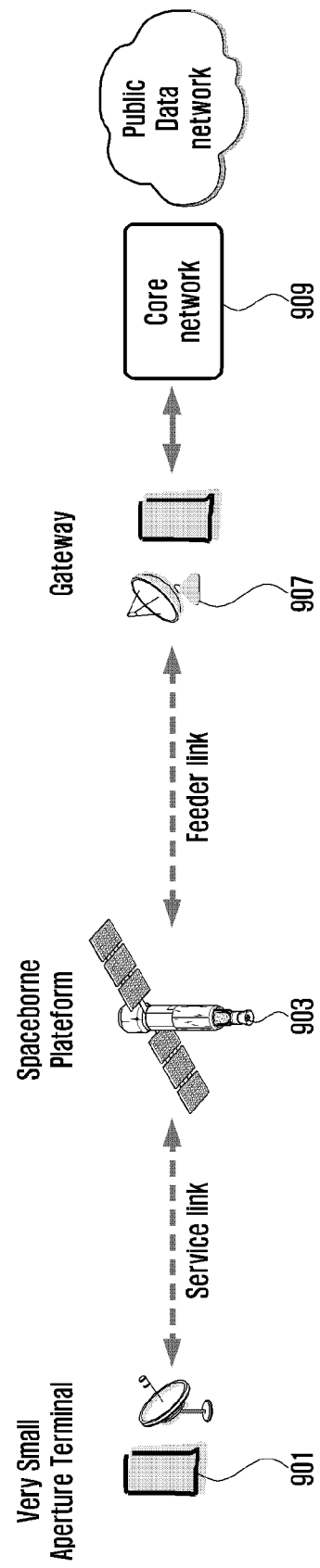
FIG. 9 illustrates a diagram of an example of a communication system using a satellite.

FIG. 9 illustrates a diagram of an example of a communication system using a satellite. For example, when a UE 901 transmits a signal to a satellite 903, the satellite 903 transmits the signal to a base station 905, and the base station 905 processes the received signal to transmit a signal including a request for a subsequent operation thereof to the UE 901, which may again be transmitted through the satellite 903. In the above description, because a distance between the UE 901 and the satellite 903 is long and a distance between the satellite 903 and the base station 905 is also long, a time required for data transmission and reception from the UE 901 to the base station 905 will be longer.

Figure 10:
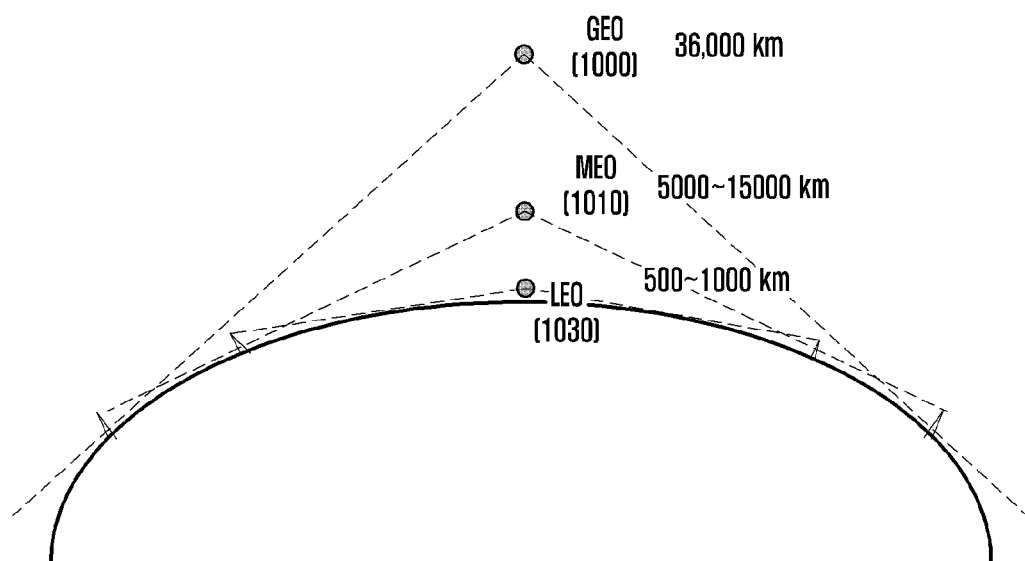
FIG. 10 illustrates a diagram of an Earth orbital period of a communication satellite according to an altitude or height of the satellite.

FIG. 10 illustrates a diagram of an Earth orbital period of a communication satellite according to an altitude or height of the satellite. Satellites for communication may be classified into a low Earth orbit (LEO), a middle Earth orbit (MEO), and a geostationary Earth orbit (GEO) according to the orbit of the satellite. In general, a GEO 1000 refers to a satellite of an altitude of approximately 36000 km, an MEO 1010 refers to a satellite of an altitude of 5000 to 15000 km, and an LEO refers to a satellite of an altitude of 500 to 1000 km. An orbital period of the Earth varies according to each altitude, and an orbital period of the GEO 1000 is about 24 hours, an orbital period of the MEO 1010 is about 6 hours, and an orbital period of an LEO 1030 is about 90 to 120 minutes. Low orbit (~2,000 km) satellites have an advantage compared to a geostationary orbit (36,000 km) at a propagation delay time (which may be understood as the time it takes for a signal transmitted from a transmitter to reach the receiver) and a loss at a relatively low altitude.

Figure 11:
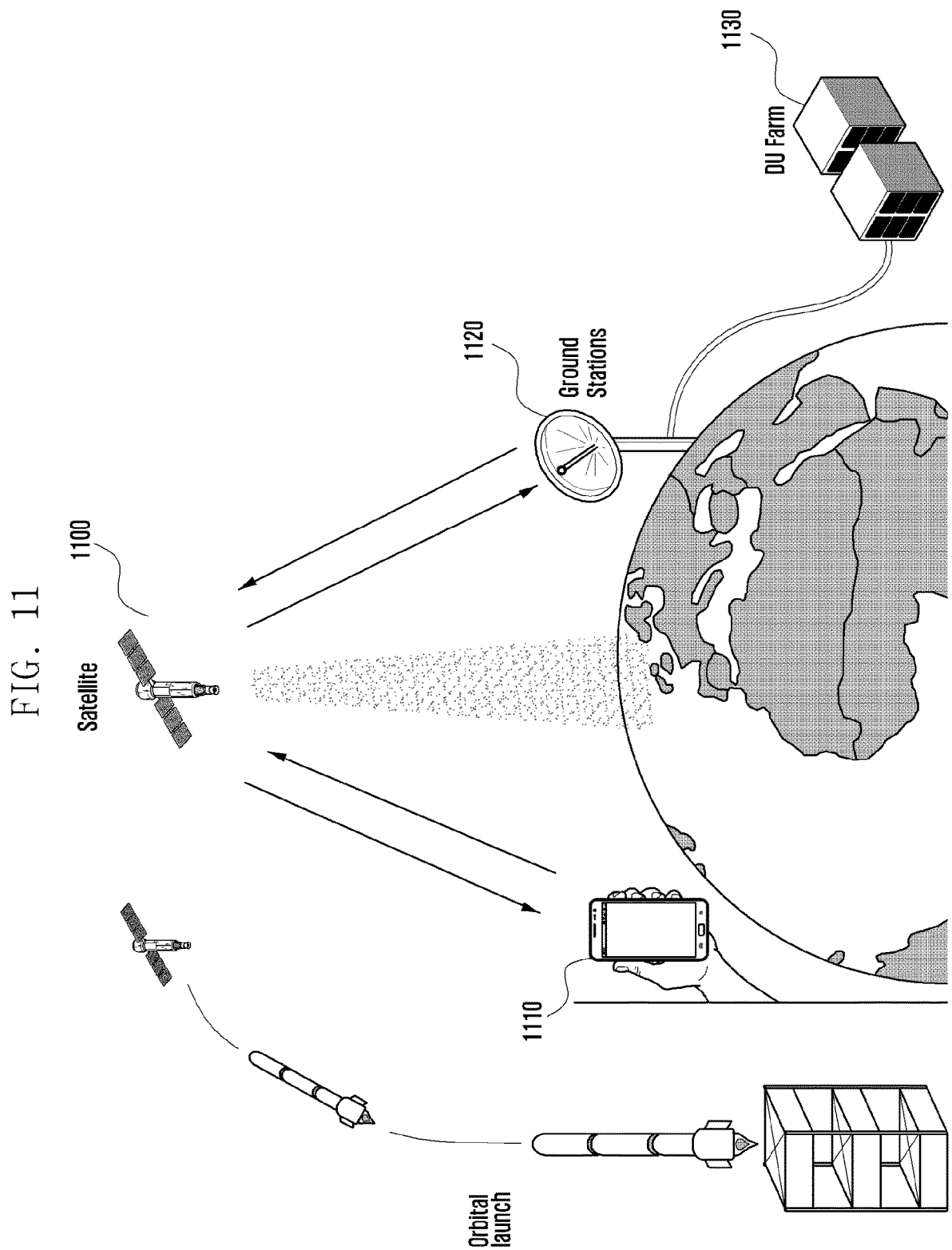
FIG. 11 illustrates a conceptual diagram of satellite-UE direct communication.

FIG. 11 illustrates a conceptual diagram of satellite-UE direct communication. A satellite 1100 located at a high altitude of 100 km or more by a rocket transmits and receives a signal to and from a UE 1110 on the ground, and transmits and receives a signal to and from a ground station 1120 connected to a base station (DU farms) 1130 on the ground.

Figure 12:
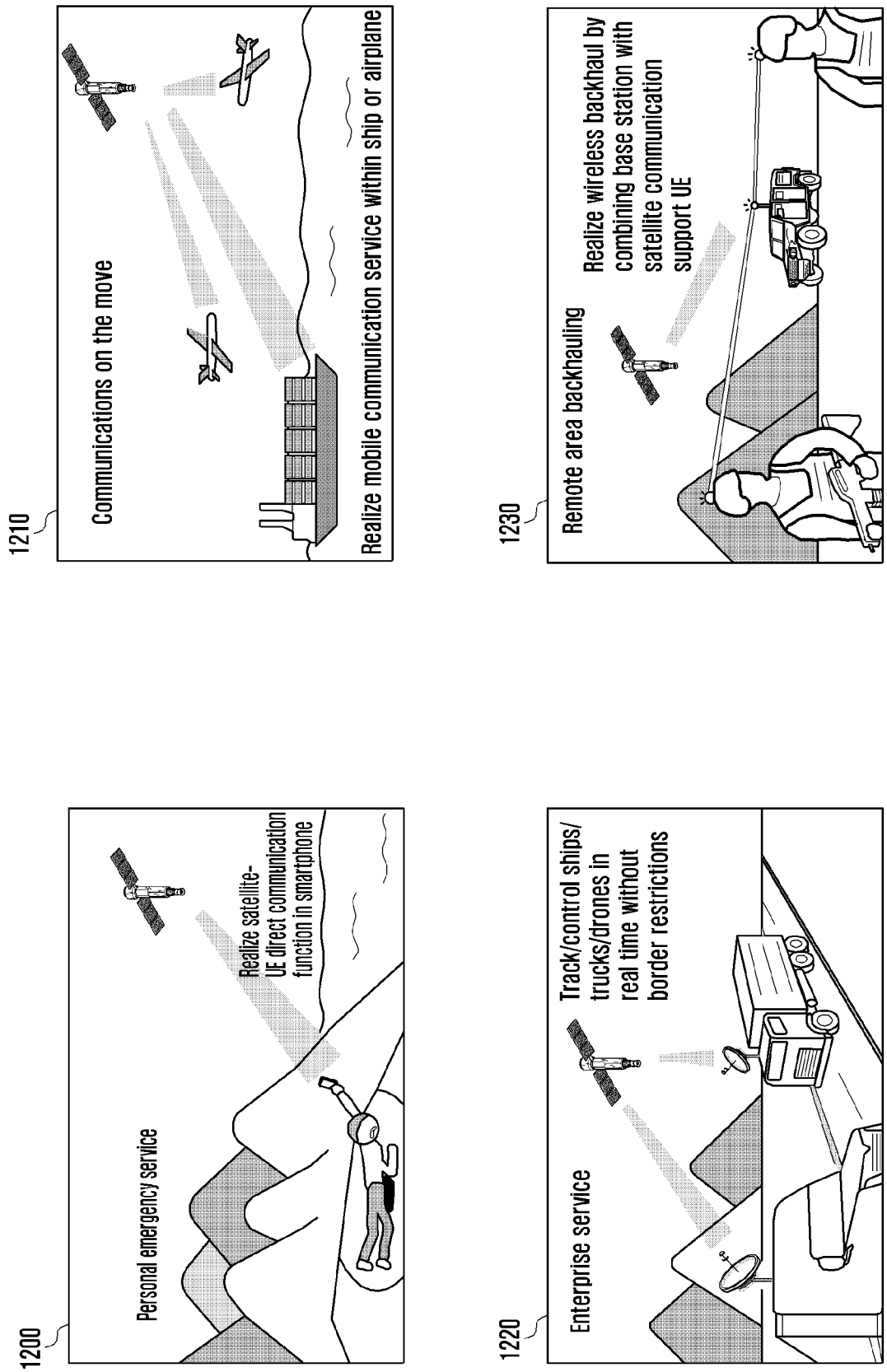
FIG. 12 illustrates a diagram of a utilization scenario of satellite-UE direct communication.

FIG. 12 illustrates a diagram of a utilization scenario of satellite-UE direct communication. Satellite-UE direct communication may support communication services for specialized purposes in a form of supplementing the coverage limit of terrestrial networks. For example, by implementing a satellite-UE direct communication function in a user's UE, it is possible to transmit and receive the user's emergency rescue and/or disaster signal in a place not covered by terrestrial network communication (1200), and a mobile communication service may be provided to a user in an area where terrestrial network communication is impossible, as in a ship or/and an air (1210), and it is possible to track and control a location of a ship, a freight car, or/and a drone in real time without border restrictions (1220), and by enabling the base station to function as a backhaul by supporting a satellite communication function to the base station, it is possible to utilize satellite communication so that the base station performs a backhaul function when the base station is physically far away (1230).

Figure 13:
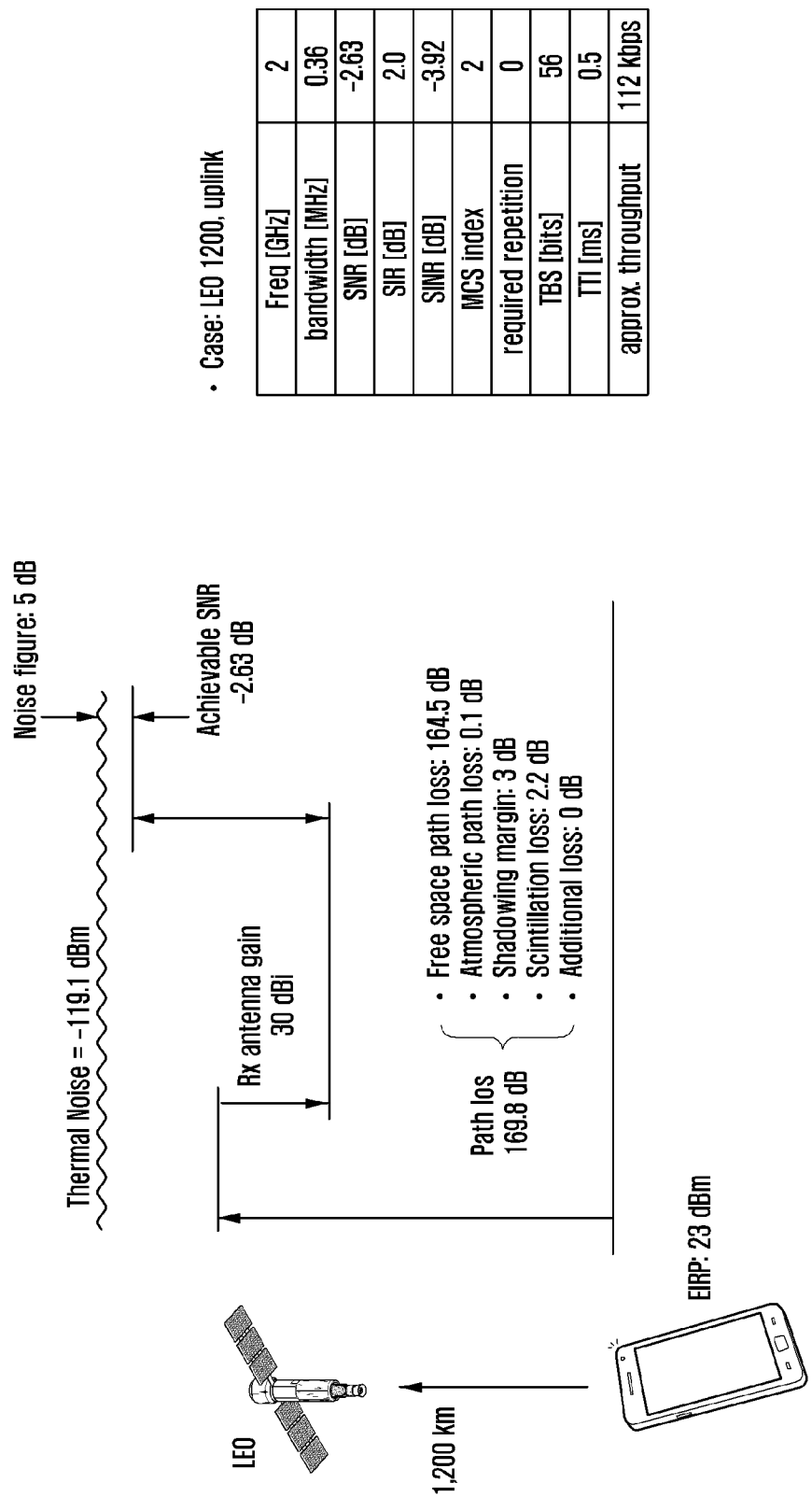
FIG. 13 illustrates a diagram of an example of calculating an expected data throughput in an uplink when an LEO satellite at an altitude of 1200 km and a UE on the ground perform direct communication.

FIG. 13 illustrates a diagram of an example of calculating an expected data throughput in an uplink when an LEO satellite at an altitude of 1200 km and a UE on the ground perform direct communication. In the uplink, when effective isotropic radiated power (EIRP) of the UE on the ground is 23 dBm, a path loss of a radio channel to the satellite is 169.8 dB, and a satellite reception antenna gain is 30 dBi, an achievable signal-to-noise ratio (SNR) is estimated to −2.63 dB. In this case, the path loss may include a path loss in free space, a loss in the atmosphere, and the like. Assuming that a signal-to-interference ratio (SIR) is 2 dB, a signal-to-interference and noise ratio (SINR) is calculated as −3.92 dB, and in this case, when 30 kHz subcarrier spacing and a frequency resource of 1 PRB are used, a transmission rate of 112 kbps may be achieved.

Figure 14:
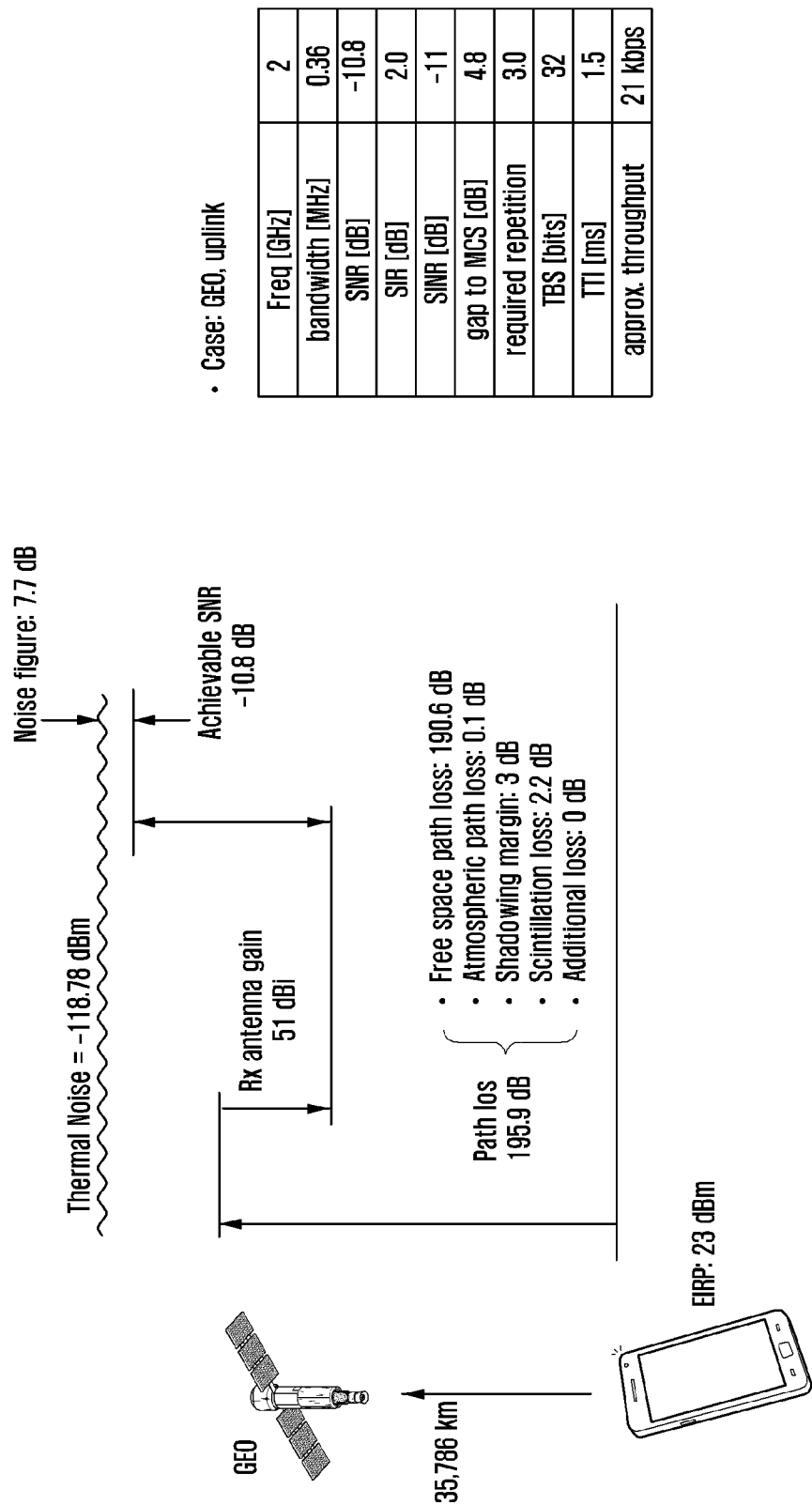
FIG. 14 illustrates a diagram of an example of calculating an expected data throughput in an uplink when a GEO satellite at an altitude of 35,786 km and a UE on the ground perform direct communication.

FIG. 14 illustrates a diagram of an example of calculating an expected data throughput in an uplink when a GEO satellite at an altitude of 35,786 km and a UE on the ground perform direct communication. When transmission EIRP of the UE on the ground in the uplink is 23 dBm, a path loss of a radio channel to the satellite is 195.9 dB, and a satellite reception antenna gain is 51 dBi, an achievable SNR is estimated to −10.8 dB. In this case, the path loss may include a path loss in a free space, a loss in the atmosphere, and the like. Assuming that the SIR is 2 dB, the SINR is calculated as −11 dB, and in this case, when a 30 kHz subcarrier spacing and a frequency resource of 1 PRB are used, a transmission rate of 21 kbps may be achieved, which may be a result of performing three repeated transmissions.

Figure 15:
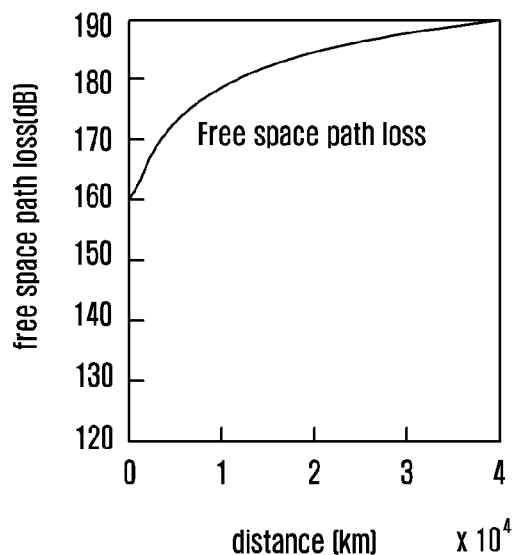
FIG. 15 illustrates a diagram of a path loss value according to a path loss model between a UE and a satellite, and a path loss according to a path loss model between a UE and a terrestrial gNB.
Figure 15:
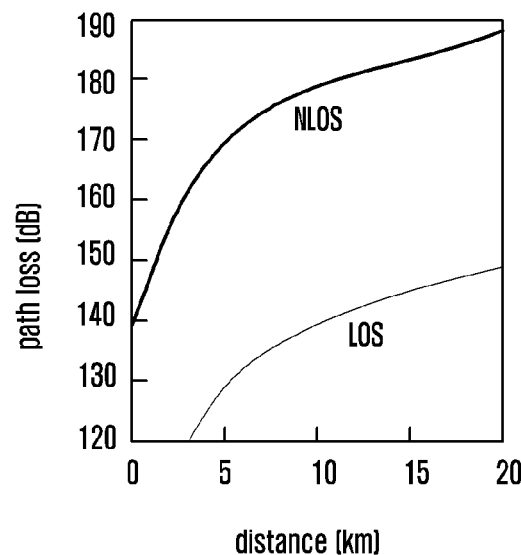

FIG. 15 illustrates a diagram of a path loss value according to a path loss model between a UE and a satellite, and a path loss according to a path loss model between a UE and a terrestrial gNB. In FIG. 15, d corresponds to a distance and fc is a frequency of a signal. In free space where communication between the UE and the satellite is performed, a path loss (FSPL) 1600 is inversely proportional to the square of the distance, but path losses ($PL_2$, $P_{L'Uma-NLOS}$) 1610 and 1620 on the ground in the presence of air in which communication is performed between the UE and the terrestrial gNB are inversely proportional to almost the fourth power of the distance. $d_{3D}$ means a straight line distance between the UE and the base station, $h_{BS}$ is a height of the base station, and $h_{UT}$ is a height of the UE. $d'_{BP}$ is calculated as d'BP=4× $h_{BS}$×$h_{UT}$×$f_c$/c. $f_c$ is a center frequency in units of Hz, and c is a velocity of light in units of m/s.

In satellite communications (or Non-Terrestrial Network), Doppler shift, that is, frequency shift (offset) of a transmission signal, occurs as a satellite continuously moves rapidly.

Figure 16:
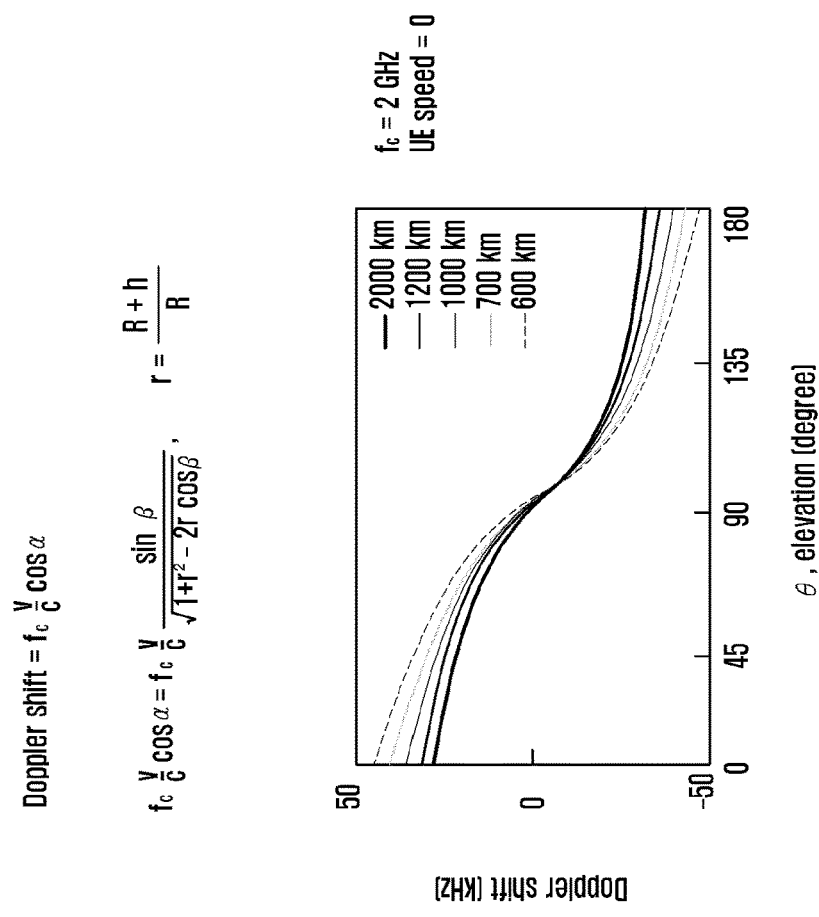
FIG. 16 illustrates a diagram of equations and results for calculating an amount of Doppler shift experienced by a signal transmitted from a satellite when a signal transmitted from the satellite is received to a user on the ground according to an altitude and location of the satellite and a location of the UE user on the ground.
Figure 16:
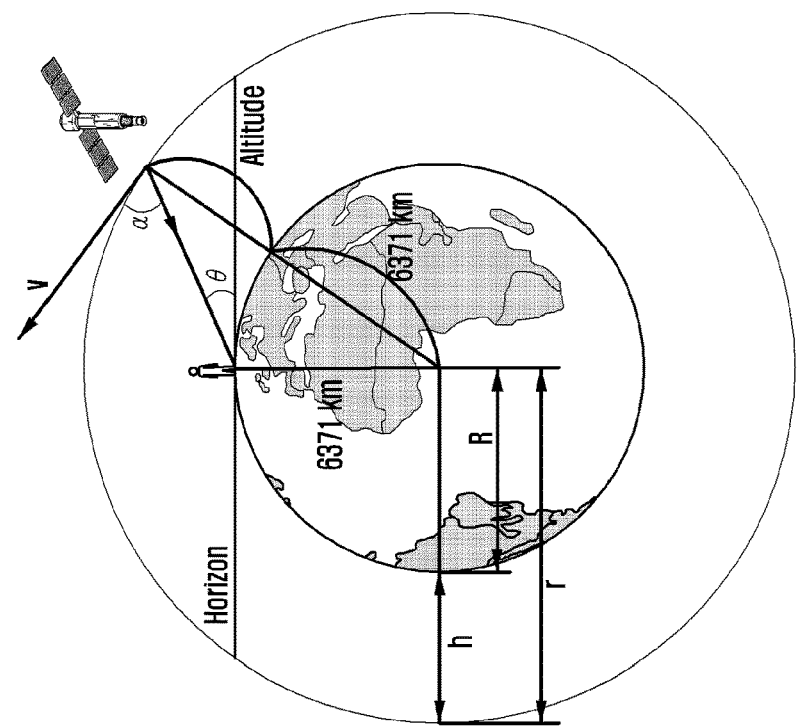
Figure 17:
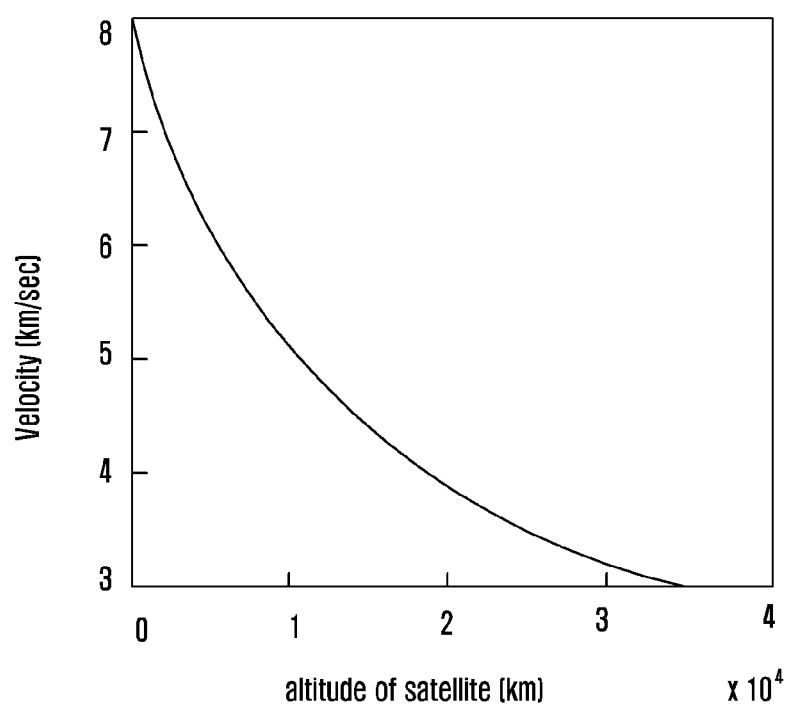
FIG. 17 illustrates a graph of a velocity of a satellite calculated at the altitude of the satellite.

FIG. 16 illustrates a diagram of equations and results for calculating an amount of Doppler shift experienced by a signal transmitted from a satellite when a signal transmitted from a satellite is received by a user on the ground according to an altitude and location of the satellite and a location of the UE user on the ground. A radius of the earth is R, h is an altitude of the satellite, v is a velocity at which the satellite orbits the earth, and fc is a frequency of the signal. The velocity of the satellite may be calculated from the altitude of the satellite, which is a velocity at which a gravity, which becomes a force in which the earth pulls the satellite, and a centripetal force generated as the satellite orbits become the same, which may be calculated as illustrated in FIG. 17. FIG. 17 is a diagram illustrating a velocity of the satellite calculated at an altitude of the satellite. As can be seen in FIG. 16, because an angle α is determined by an elevation angle θ, a value of the Doppler shift is determined according to the elevation angle θ.

Figure 18:
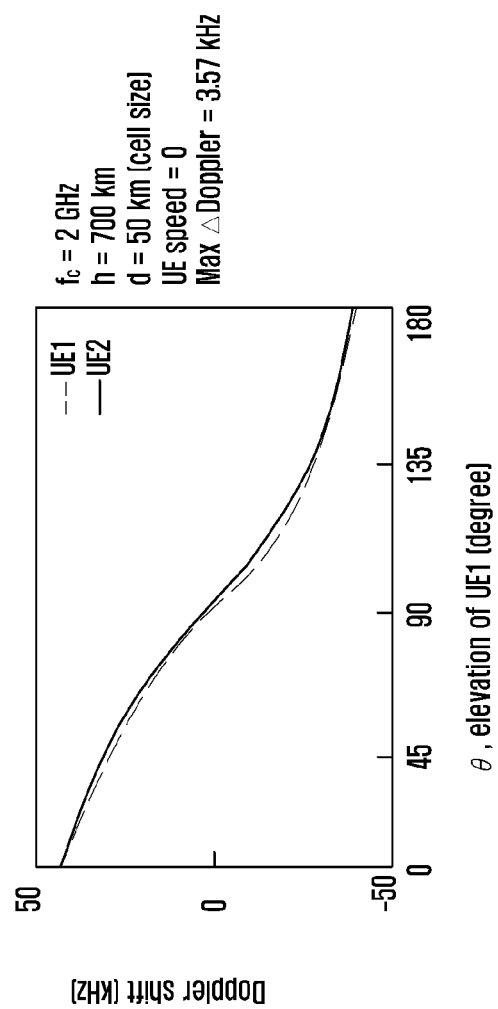
FIG. 18 illustrates a diagram of Doppler shifts experienced by different UEs in one beam transmitted by a satellite to the ground.
Figure 18:
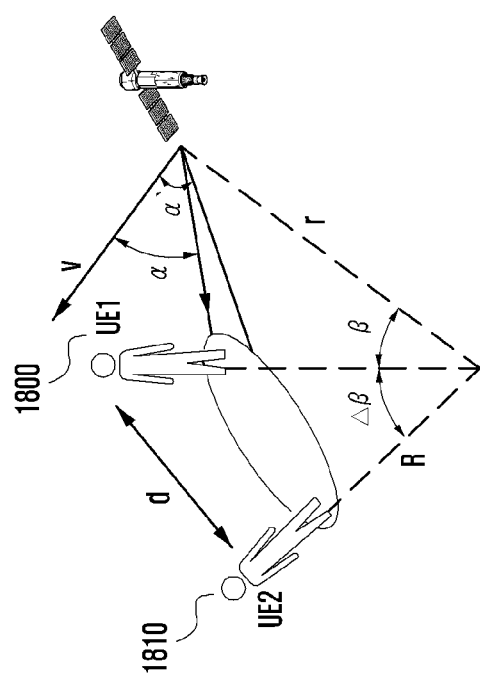

FIG. 18 illustrates a graph of Doppler shifts experienced by different UEs in one beam transmitted by a satellite to the ground. In FIG. 18, Doppler shift experienced by a UE 1, 1800 and a UE 2, 1810 according to an elevation angle θ was calculated, respectively. The result is obtained by assuming that a center frequency is 2 GHz, a satellite altitude is 700 km, a diameter of one beam is 50 km on the ground, and a velocity of the UE is 0. Further, the Doppler shift calculated in the disclosure ignores the effect of an Earth rotation velocity, which may be considered to have a small effect because it is slower than a velocity of the satellite.

Figure 19:
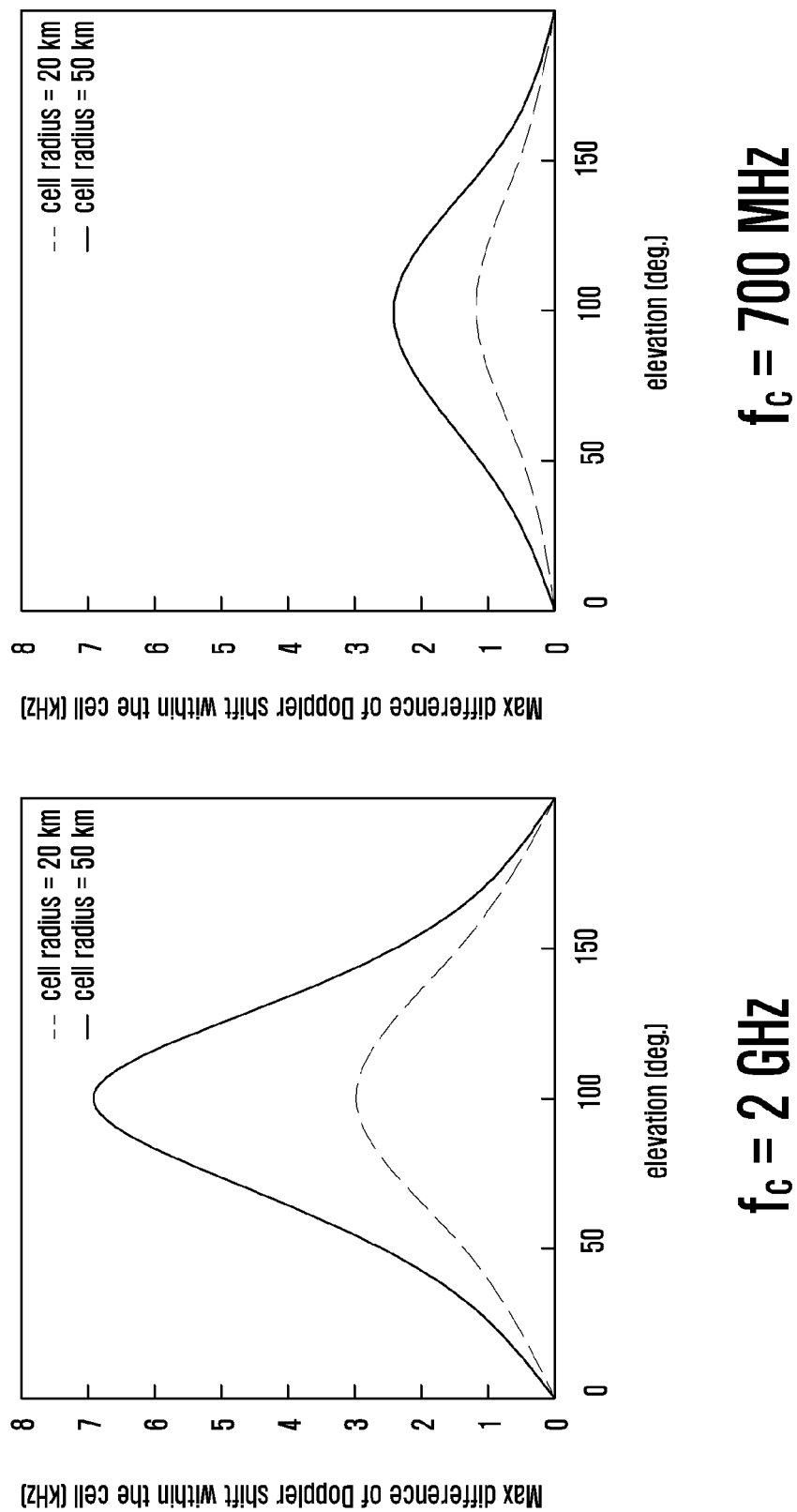
FIG. 19 illustrates a graph of a difference in Doppler shift occurring within one beam according to a location of a satellite determined by an elevation angle.

FIG. 19 illustrates a diagram of a difference in Doppler shift occurring within one beam according to a location of a satellite determined from an elevation angle. When the satellite is located directly above the beam, that is, when an elevation angle is 90 degrees, it can be seen that the difference in Doppler shift within the beam (or cell) is greatest. This may be because when the satellite is above the center, Doppler shift values at one end and the other end of the beam have positive and negative values, respectively.

In satellite communication, because the satellite is far from the user on the ground, a large propagation delay occurs compared to terrestrial network communication.

Figure 20:
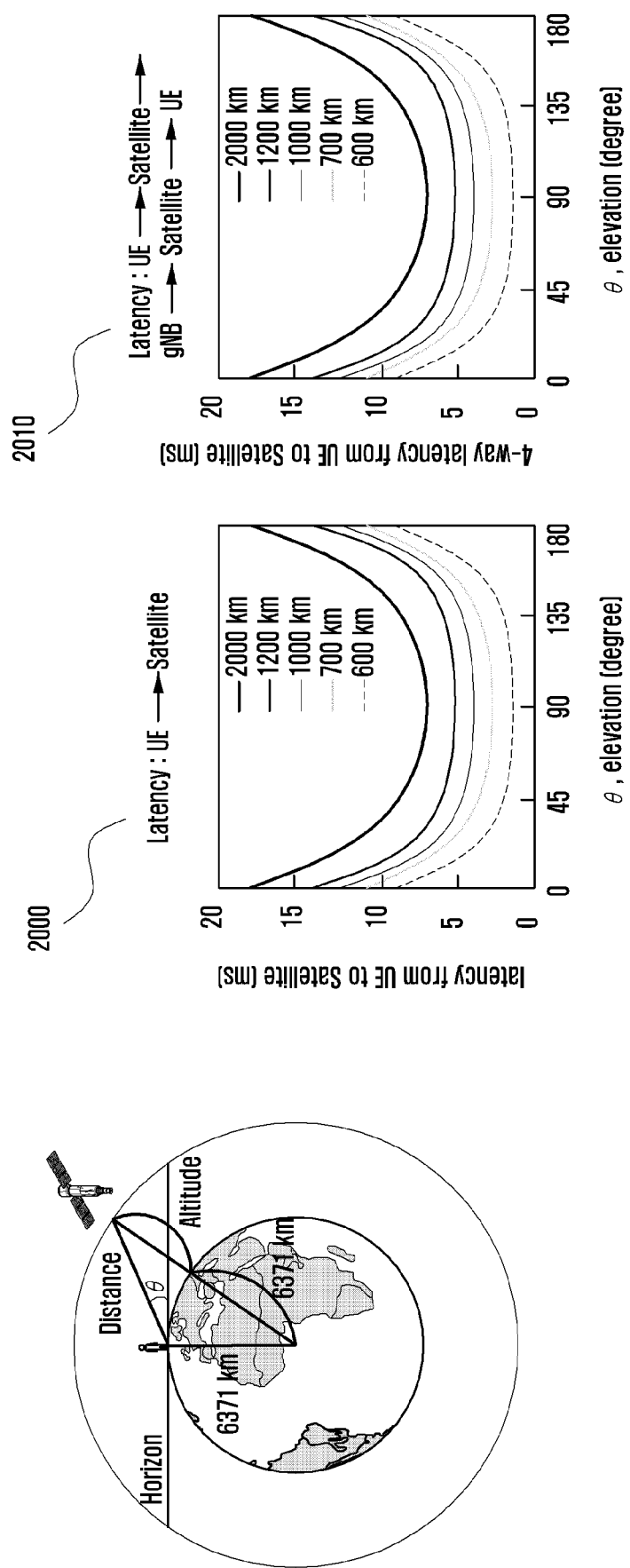
FIG. 20 illustrates a diagram of a propagation delay taken from a UE to a satellite and a round trip propagation delay between a UE-satellite-base station according to the location of the satellite determined according to the elevation angle.
Figure 21:
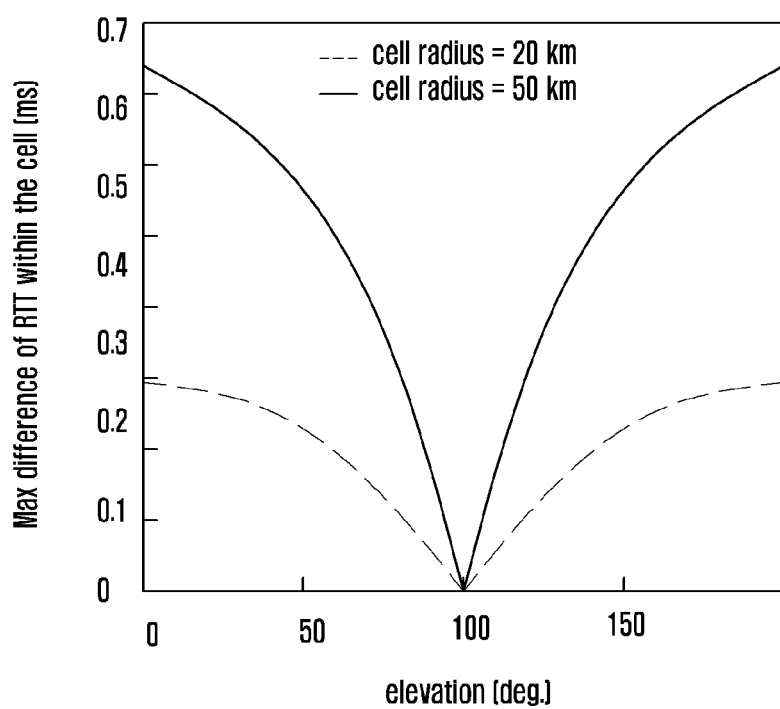
FIG. 21 illustrates a graph of a maximum difference value of a round trip propagation delay that varies according to a user's location within one beam.

FIG. 20 illustrates a graph of a propagation delay from a UE to a satellite and a round trip propagation delay between a UE-satellite-base station according to a location of the satellite determined according to an elevation angle. 2000 is a propagation delay from the UE to the satellite, and 2010 is a round trip propagation delay between the UE-satellite-base station. In this case, it was assumed that the propagation delay between the satellite and the base station is equal to the propagation delay between the UE and the satellite. FIG. 21 is a diagram illustrating a maximum difference value of a round trip propagation delay that varies according to a user's location within one beam. For example, when a beam radius (or cell radius) is 20 km, the difference in a round trip propagation delay to the satellite in which UEs in different locations in the beam experience differently according to the location of the satellite may be about 0.28 ms or less.

In satellite communication, when a UE transmits and receives a signal to and from a base station, the signal may be transmitted through a satellite. That is, in a downlink, the satellite may receive a signal transmitted by the base station to the satellite, and then transmit the signal to the UE, and in an uplink, the satellite may receive the signal transmitted by the UE and then transmit the signal to the base station. In the above description, the satellite may receive the signal and then transmit the signal after performing only frequency shift as it is, or may perform signal processing such as decoding and re-encoding and transmit the signal based on the received signal.

In the case of LTE or NR, the UE may access the base station through the following procedure.

Step 1: The UE receives a synchronization signal (or a synchronization signal block (SSB), which may include a broadcast signal) from the base station. The synchronization signal may include a primary synchronization signal (PSS), a secondary synchronization signal (SSS), and a physical broadcast channel (PBCH). The synchronization signal may include information such as slot boundaries, frame numbers, and downlink and uplink configurations of signals transmitted by the base station. Further, through the synchronization signal, the UE may obtain subcarrier offset, scheduling information for system information transmission, and the like.

Step 2: The UE receives a system information block (SIB) from the base station. The SIB may include information for performing initial access and random access. The information for performing the random access may include resource information for transmitting a random access preamble.

Step 3: The UE transmits a random access preamble (or message 1, msg1) to the random access resource configured in step 2. The preamble may be a signal determined based on the information configured in step 2 using a predetermined sequence. The base station receives the preamble transmitted by the UE. The base station attempts to receive the preamble configured in the resource configured by itself without knowing which UE has transmitted the preamble, and if reception is successful, the base station may know that at least one UE has transmitted the preamble.

Step 4: When the preamble is received in step 3, the base station transmits a random access response (RAR, or message 2, msg2) in response thereto. The UE that has transmitted the random access preamble in step 3 may attempt to receive the RAR transmitted by the base station in this step. The RAR is transmitted on a PDSCH, and a PDCCH for scheduling the PDSCH is transmitted together or in advance. A CRC scrambled with an RA-RNTI value is added to the DCI for scheduling the RAR, and the DCI (and CRC) is channel-coded and then mapped to the PDCCH and transmitted. The RA-RNTI may be determined based on time and frequency resources in which the preamble is transmitted in step 3.

The maximum time limit until the UE that has transmitted the random access preamble in step 3 receives the RAR in this step may be configured in the SIB transmitted in step 2. This may be configured limitedly, for example, up to 10 ms or 40 ms. That is, when the UE that has transmitted the preamble in step 3 does not receive the RAR within a time determined based on, for example, the configured maximum time of 10 ms, the UE may transmit the preamble again. The RAR may include scheduling information for allocating a resource of a signal to be transmitted by the UE in step 5, which is the next step.

Figure 22:
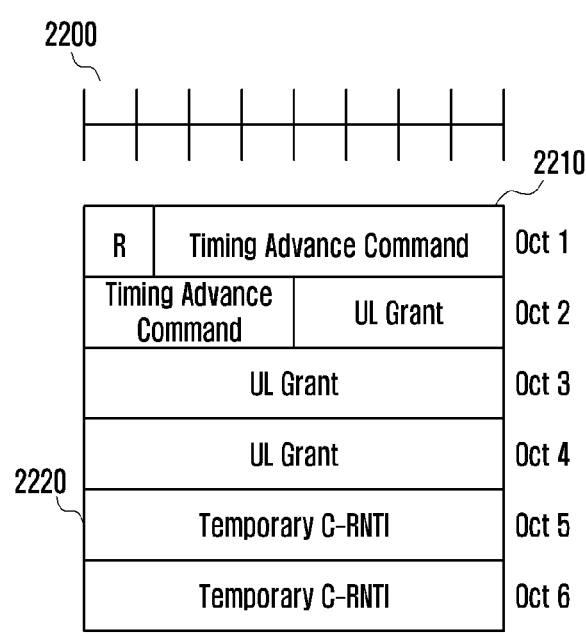
FIG. 22 illustrates a diagram of an example of an information structure of an RAR.

FIG. 22 illustrates a graph an example of an information structure of an RAR. The RAR 2200 may be, for example, a MAC PDU, and include information 2210 on timing advance (TA) to be applied by the UE and a temporary C-RNTI value 2220 to be used from the next step.

Step 5: The UE that has received the RAR in step 4 transmits a message 3 (msg3) to the base station according to scheduling information included in the RAR. The UE may include and transmit an ID value thereof in the msg3. The base station may attempt to receive the msg3 according to the scheduling information transmitted by itself in step 4.

Step 6: The base station receives the msg3, checks ID information of the UE, generates a message 4 (msg4) including the ID information of the UE, and transmits the msg4 to the UE. The UE that has transmitted the msg3 in step 5 may attempt to receive the msg4 to be transmitted in step 6. The UE that has received the msg4 compares the ID value included in the msg4 with the ID value transmitted by itself in step 5 after decoding to check whether the msg3 transmitted by itself has been received by the base station. After the UE transmits the msg3 in step 5, there may be a time constraint until receiving msg4 in this step, and the maximum time may be configured from the SIB in step 2.

When an initial access procedure using the above step is applied to satellite communication, a propagation delay time required for satellite communication may become a problem. For example, in step 3, the UE transmits a random access preamble (or PRACH preamble), and in step 4, a period (random access window) for receiving the RAR, that is, the maximum time it takes to receive the RAR may be configured through ra-ResponseWindow, and in the conventional LTE or 5G NR system, such a maximum time may be configured up to about 10 ms.

Figure 23:
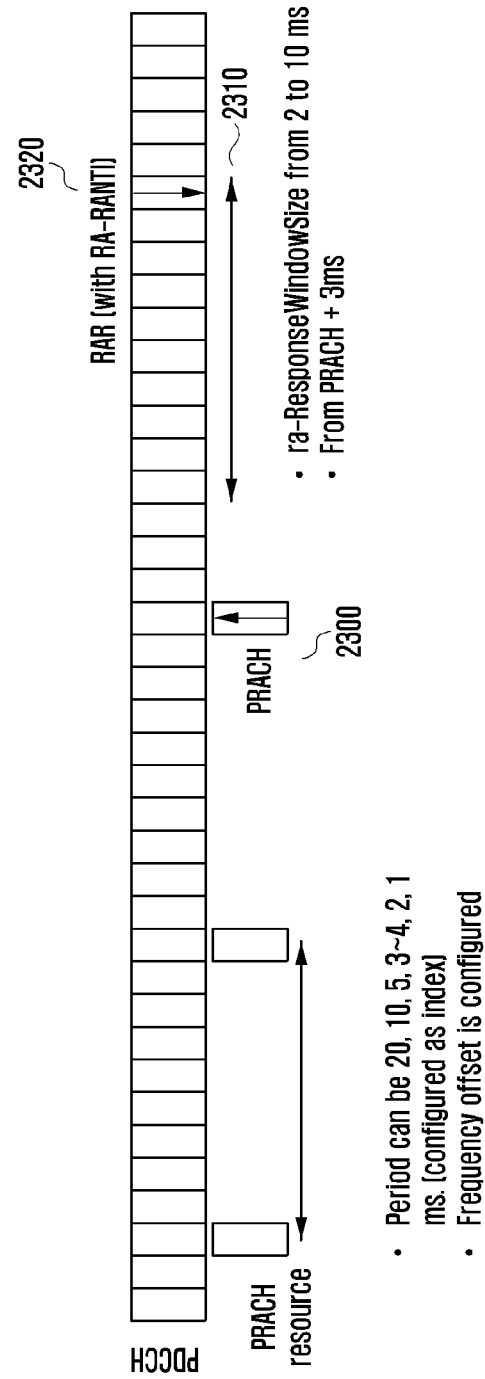
FIG. 23 illustrates a diagram of an example of a relationship between a PRACH preamble configuration resource and an RAR reception time of an LTE system.
Figure 24:
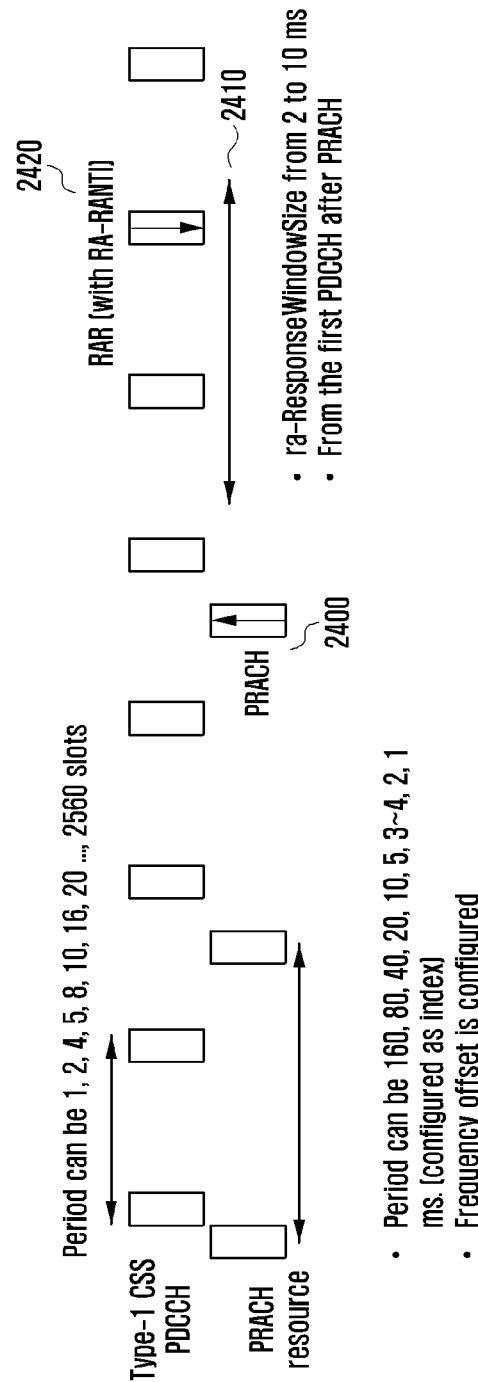
FIG. 24 illustrates a diagram of an example of a relationship between a PRACH preamble configuration resource and an RAR reception time of a 5G NR system.

FIG. 23 illustrates a diagram of an example of the relationship between a PRACH preamble configuration resource of an LTE system and an RAR reception time, and FIG. 24 illustrates a diagram of an example of the relationship between a PRACH preamble configuration resource and an RAR reception timing of the 5G NR system. Referring to FIG. 23, in the case of LTE, a random access window 2310 is started from timing 3 ms after a random access preamble (PRACH) is transmitted 2300, and when the UE receives 2320 the RAR within the random access window, the UE may determine that transmission of the PRACH preamble is successful. Referring to FIG. 24, in the case of NR, a random access window 2410 is started from a control information area for RAR scheduling that appears first after the PRACH preamble is transmitted 2400. When the UE receives 2420 the RAR within the random access window, it may be determined that transmission of the PRACH preamble is successful.

As an example, TA for uplink transmission timing in a 5G NR system may be determined as follows. First, it is determined that $T_c=1/(\Delta f_{max} \cdot N_f)$, where $\Delta f_{max}=480 \cdot 10^3$ Hz and $N_f=4096$. Further, it may be defined as $\kappa=T_s/T_c=64$, $T_s=1/(\Delta f_{ref} \cdot N_{f,ref})$, $\Delta f_{ref}=15 \cdot 10^3$ Hz, and $N_{f,ref}=2048$, respectively.

Figure 25:
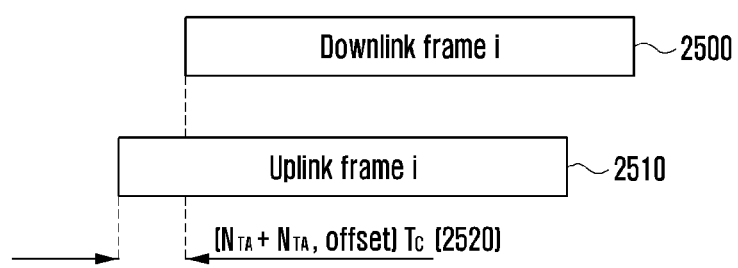
FIG. 25 illustrates a diagram of an example of a downlink frame and uplink frame timing in a UE.

FIG. 25 illustrates a diagram of an example of downlink frame and uplink frame timing in a UE. The UE may advance an uplink frame 2510 by $T_{TA}=(N_{TA}+N_{TA,offset})T_c$ 2520 based on a downlink frame timing 2500 to perform uplink transmission. In the above description, a value of $N_{TA}$ may be transmitted through the RAR or determined based on MAC CE, and $N_{TA,offset}$ may be a value configured to the UE or determined based on a predetermined value.

The RAR of the 5G NR system may indicate a value $T_A$, and in this case, $T_A$ may indicate one of 0, 1, 2, ..., 3846. In this case, when the subcarrier spacing (SCS) of the RAR is $2^\mu \cdot 15$ kHz, $N_{TA}$ is determined as $N_{TA}=T_A \cdot 16 \cdot 64/2^\mu$. After the UE completes a random access process, the UE may receive an indication from the base station to change the TA value, which may be indicated through MAC CE or the like. $T_A$ information indicated through the MAC CE may indicate one of 0, 1, 2, ..., 63, which is added to or subtracted from the existing TA value and used for calculating a new TA value. As a result, the TA value may be newly calculated as $N_{TA\_new}=N_{TA\_old}+(T_A-31) \cdot 16 \cdot 64/2^\mu$. The TA value indicated in this way may be applied to uplink transmission by the UE after a predetermined time.

Figure 26:
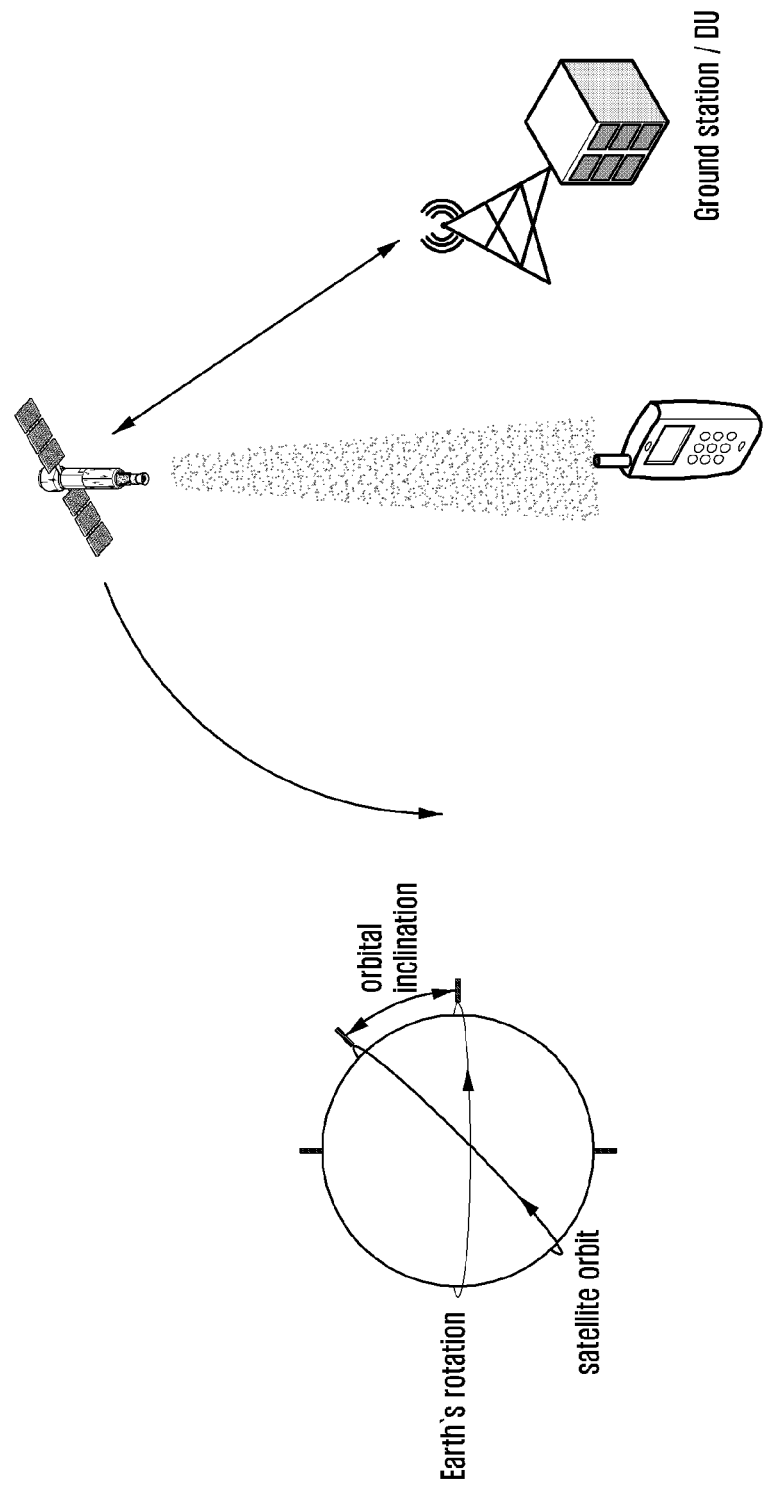
FIG. 26 illustrates a diagram of an example of a continuous movement of a satellite in a UE located on the ground or on the earth as the satellite revolves around the earth along a satellite orbit.

FIG. 26 illustrates a diagram of an example of a continuous movement of a satellite relative to a UE located on the ground or on the earth as the satellite revolves around the earth along a satellite orbit. Because a distance between the UE and the satellite varies according to an elevation angle at which the UE views the satellite, a propagation delay between the UE and the satellite and the base station varies.

Figure 27:
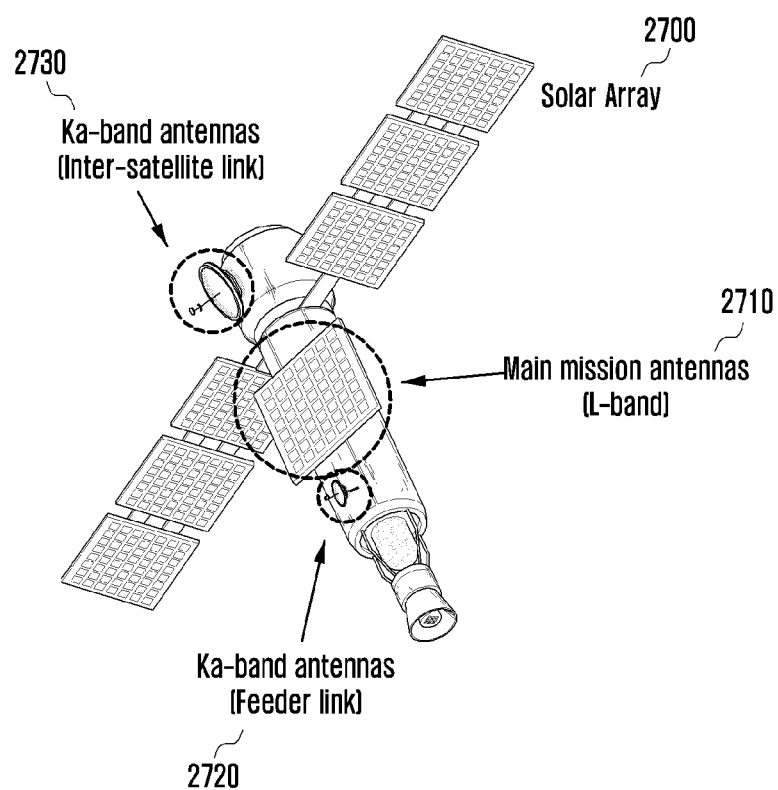
FIG. 27 illustrates a diagram of an example of a structure of an artificial satellite.

FIG. 27 illustrates a diagram of an example of a structure of an artificial satellite. The satellite may include a solar panel or solar array 2700 for photovoltaic or solar power generation, a main mission antenna 2710 for communication with a UE, a feeder link antenna 2720 for communication with a ground station, an inter-satellite link 2730 for inter-satellite communication, and a processor for controlling transmission and reception and performing signal processing. In the case in which inter-satellite communication is not supported according to the satellite, an antenna for transmitting and receiving signals between satellites may not be disposed. FIG. 27B illustrates that an L band of 1 to 2 GHz is used for communication with the UE, but K band (18 to 26.5 GHz), Ka band (26.5 to 40 GHz), and Ku band (12 to 18 GHz)), which are high-frequency bands may be used.

In UE-satellite direct communication, because a distance between the UE-satellite and the satellite-base station is long and the satellite moves continuously, when a signal transmitted by the base station or the UE is received by the UE or the base station, time offset occurs due to a propagation delay, and the like. Therefore, the disclosure provides a method and device for the base station to indicate time offset information so that the time offset may be corrected, and for the UE to correct the time offset accordingly. The following embodiment has been described on the assumption that the UE communicates with the satellite and the ground station, but the case where the satellite base station and the UE communicate is not excluded. In the disclosure, the time offset may be used interchangeably with timing advance.

Hereinafter, a slot is a time unit that means 14 OFDM or DFT-s-OFDM symbols in an NR system, and it may be understood that a slot described below is a subframe when the disclosure is applied based on an LTE system.

First Embodiment

The first embodiment provides a method and device for a base station or a satellite to indicate a scheduling offset K_offset value to a UE.

Figure 28:
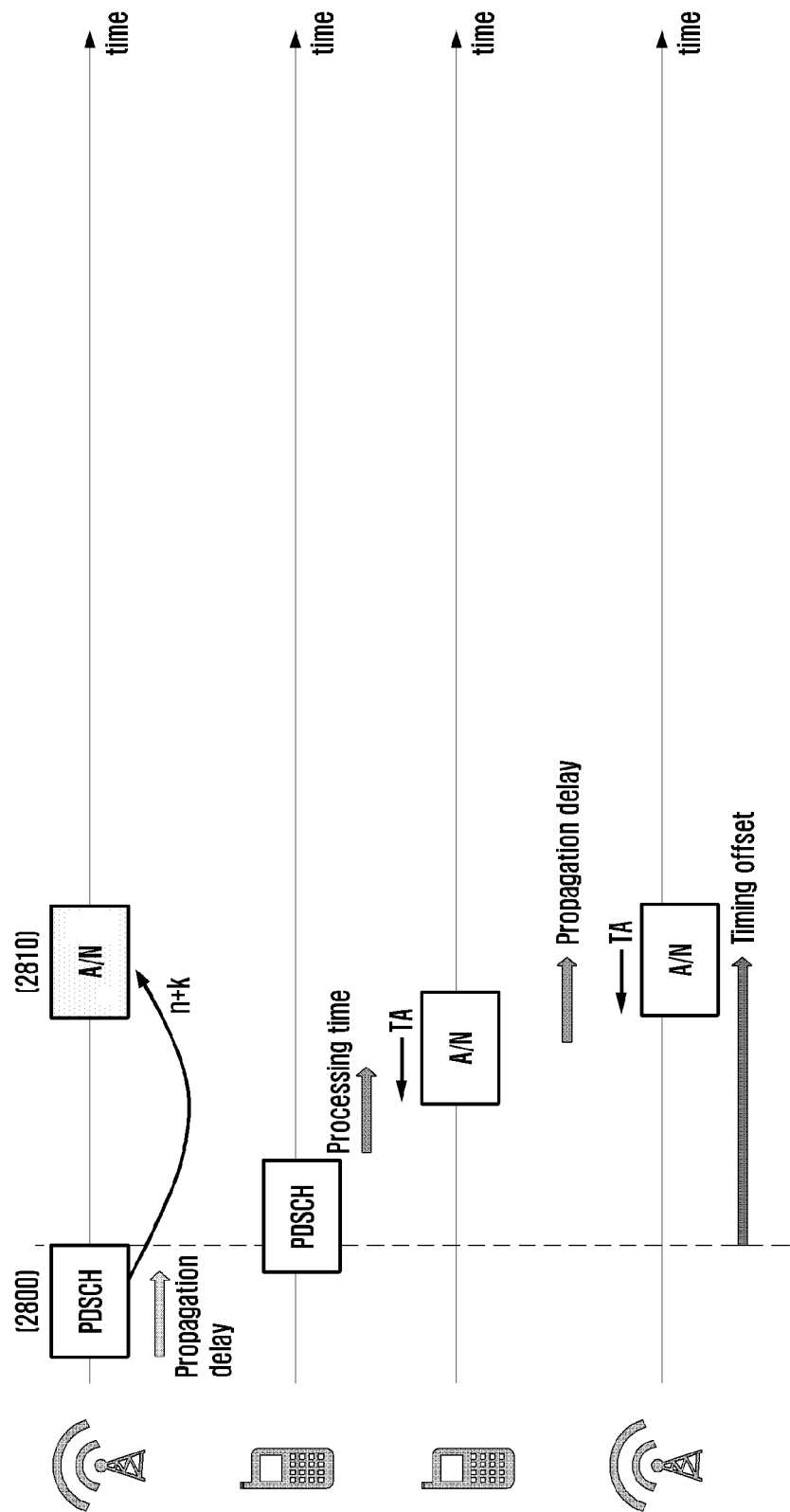
FIG. 28 illustrates a diagram of an example of a time relationship in which a UE receives downlink data from a base station for terrestrial communication and transmits HARQ-ACK thereof.

FIG. 28 illustrates a diagram of an example of a time relationship in which a UE receives downlink data from a base station for terrestrial communication and transmits HARQ-ACK thereof. The base station may indicate timing in which HARQ-ACK feedback is transmitted through a combination of higher signaling and DCI. For example, when the base station indicates a value of k so that downlink data on a PDSCH is transmitted in a slot n and feedback (HARQ-ACK) for the downlink data is transmitted in a slot n+k, by configuring a set of a plurality of values (which may be a candidate for the k value) through higher signaling, and by indicating one thereof through DCI, the base station may notify the UE of k. The k value may be configured and indicated among, for example, values between 0 and 31.

A set of 1 to 8 values may be configured through higher signaling, and a value of a PDSCH-to-HARQ_feedback timing indicator field of the DCI may indicate one of the values configured through higher signaling. In this case, a size of the PDSCH-to-HARQ_feedback timing indicator may be $\lceil \log_2(I) \rceil$ when the number of values configured through higher signaling is I. When one value is configured through higher signaling, a size of the PDSCH-to-HARQ_feedback timing indicator may be omitted from 0 bits, that is, the DCI, and one value configured through higher signaling is applied as the k value.

Similarly, the base station may transmit the DCI for scheduling uplink data in a slot n, and indicate a value of k such that the uplink data is transmitted in a slot n+k on a PUSCH. In this case, by configuring a set of a plurality of values (which may be a candidate for the k value) through higher signaling and indicating one thereof through DCI, the base station may notify the UE of k. The k value may be configured and indicated among, for example, values between 0 and 32.

A set of 1 to 16 values may be configured through higher signaling, and a value of the time domain resource assignment field of the DCI may indicate one of the values configured through higher signaling. In this case, a size of time domain resource assignment may be $\lceil \log_2(I) \rceil$ when the number of values configured through higher signaling is I. When one value is configured through higher signaling, the size of time domain resource assignment may be omitted from 0 bits, that is, the DCI, and one value configured through higher signaling is applied as a k value.

Figure 29:
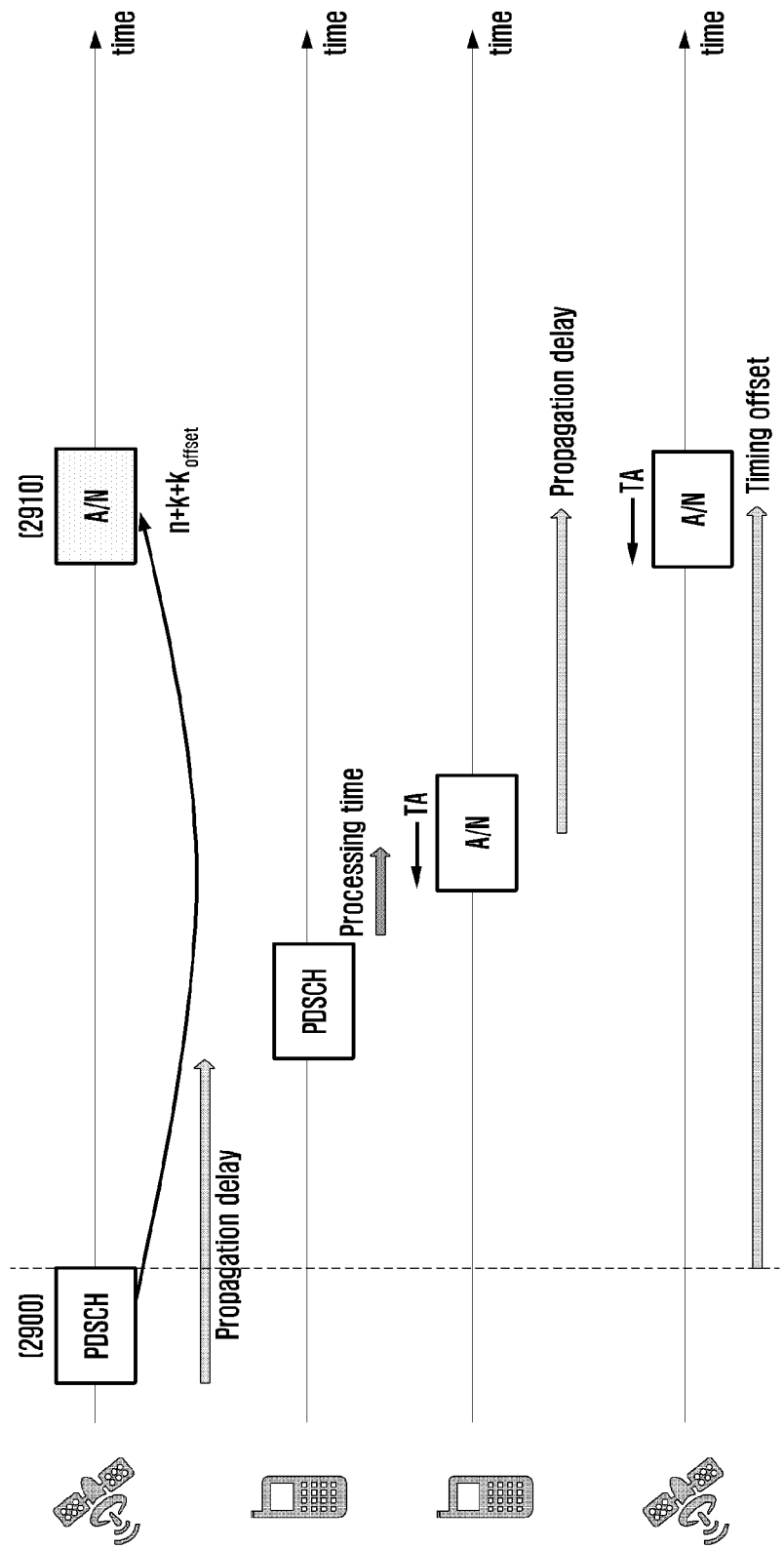
FIG. 29 illustrates a diagram of an example of a time relationship in which a UE receives downlink data and transmits a HARQ-ACK thereof in satellite communication.

FIG. 29 illustrates a diagram of an example of a time relationship in which a UE receives downlink data and transmits a HARQ-ACK thereof in satellite communication. The UE receives downlink data 2900 and transmits a HARQ-ACK 2910 thereto and unlike the example of terrestrial communication of FIG. 28, because a propagation delay is long in the case of satellite communication, values from 0 to 31 may not be sufficient to indicate HARQ-ACK feedback timing or uplink data PUSCH transmission timing. Therefore, in order to indicate a larger value, a Koffset value may be introduced so that feedback may be transmitted in an n+k+Koffset slot. Therefore, in satellite communication, how to notify the Koffset value may be important.

The following methods may be used as a method for the base station to notify UEs of Koffset required for satellite communication.

Method 1: a Koffset value may be fixed according to an altitude and type of a satellite. For example, when the satellite is at an altitude of 300 km, Koffset may be determined as a value corresponding to 10 ms. Alternatively, as an example, the value may be determined according to whether the satellite is LEO or GEO, and in general, it may be determined to have a larger value in the case of a GEO satellite. That is, the higher an altitude of the satellite, the larger a value of Koffset may be determined. Such a value may be determined as a fixed value in the standard, or may be a value configured from an upper layer.

Method 2: The base station may include and transmit a Koffset value in the SIB to the UE. The Koffset value in this method may be a value that does not change with time, and the base station may transmit a largest value of the Koffset values to be applied in consideration of a location of the satellite onto the SIB so as to apply the same one value to the UEs regardless of the location of the satellite.

Method 3: The base station may include a Koffset value in the SIB to the UE to transmit the SIB. The Koffset value in this method may be a value that changes with time, and change whenever the base station transmits the SIB. Alternatively, the Koffset value to be applied in the SIB is not directly indicated, but the Koffset value used by the UE for uplink PUCCH and PUSCH transmission may be obtained based on time information transmitted in the SIB. For example, when one value of Koffset is indicated in the SIB, the UE may calculate the Koffset value actually applied based on the Koffset value and time information. In the above description, the time information is GNSS-based time information based on a timing that transmits the SIB, and may be transmitted by the base station or the satellite. Alternatively, the time information may be GNSS-based time information based on a specific time before or after transmitting the SIB.

Method 4: A Koffset value may be transmitted in the SIB, and in this case, the Koffset value may be differently indicated for each subcarrier spacing. In this case, the SIB may include an SCS that can be supported and a Koffset value to be applied when each SCS is applied.

Method 5: The Koffset value may be configured by including the Koffset value in BWP configuration in which the base station configures to the UE. That is, the Koffset value to be applied to a specific BWP may be included in the corresponding BWP configuration and transmitted to the UE, and when the Koffset value is not included in the BWP configuration, it may be checked that the Koffset is 0.

Method 6: A Koffset value may be included in the initial BWP configuration. BWP configurations other than the initial BWP may include a difference value from the Koffset value transmitted in the initial BWP configuration. For example, the Koffset value may be directly included in the initial BWP configuration and be transmitted from the base station to the UE, or the initial BWP configuration may include a configuration for a type of a satellite, and the Koffset value may be determined according to the configuration for the satellite type. In this case, the UE may check the Koffset value according to the configuration for the satellite type and configure the Koffset value to the Koffset value of the initial BWP, and in the case of other BWPs, a Koffset value to be applied to each BWP may be obtained by checking a difference value (ΔKoffset) included in each BWP configuration. In the above description, configuration information on the type of satellite included in the initial BWP configuration may include altitude, time, and location information of the satellite. Similarly, upon initial access, a Koffset value for a specific cell (e.g., PCell) may be set, and a difference value from a configured Koffset value may be included in configuration information on cells other than the specific cell. As described above, the Koffset value may be configured by configuring the difference value after configuring a specific value.

Method 7: When the SIB transmits a location of the satellite and a reference point location on the ground, the UE may calculate a Koffset value based on the location and the reference point location of the satellite.

Method 8: A range that may configure the Koffset value may vary according to the type or altitude of the satellite. That is, in the case of an LEO satellite in an altitude of 600 km, a value corresponding to 10 ms to 20 ms may be configured as the Koffset, and in the case of a GEO satellite with a higher geostationary orbit, the Koffset value may be configured as a value from 100 ms to 200 ms. Alternatively, the unit (unit or granularity) of a value capable of configuring the Koffset value may also vary according to the type or altitude of the satellite. For example, when the altitude of the satellite changes, the unit for interpreting the value configured as the Koffset value may change, and the unit may increase as the altitude of the satellite increases. Information such as the kind, altitude, and type of the satellite may also be transmitted through SIB or the like.

The base station may determine the largest value of values to be applied in consideration of the location of the satellite as Koffset and transmit it to the SIB so as to apply the same one value to the UEs regardless of the location of the satellite.

The above embodiment has disclosed an example in which the Koffset is configured through the SIB, but Koffset may be configured through a method similar to the above-described method through higher signaling (e.g., MIB, UE-specific higher layer signaling) as well as SIB.

In various embodiments of the disclosure, when the Koffset value is not configured, the UE may assume or determine the Koffset value to 0.

The methods provided above may be applied in combination with one or a plurality of methods described above.

Although the methods provided above describe the Koffset value in units of time, an actual Koffset value may be applied by converting to the number of slots. In the above case, the number of slots may change according to subcarrier spacing (SCS). As an example, when a time corresponding to the Koffset value is indicated as 10 ms, if the corresponding BWP uses 15 kHz, Koffset=10, and if the corresponding BWP uses 30 kHz, Koffset=20. Alternatively, the Koffset value may be configured based on the case where 15 kHz SCS is applied, and the UE may convert the Koffset value to correspond to the SCS by multiplying $2^\mu$ to the configuration value, where $\mu$ may be a value indicating the SCS, and 0, 1, 2, 3 may mean SCS 15 kHz, 30 kHz, 60 kHz, and 120 kHz, respectively. Alternatively, the Koffset value may be indicated by the number of slots or radio frames. When the Koffset value is indicated by the number of slots, the UE may interpret Koffset according to 15 kHz SCS to be the reference SCS or the SCS of the corresponding BWP.

Figure 30A:
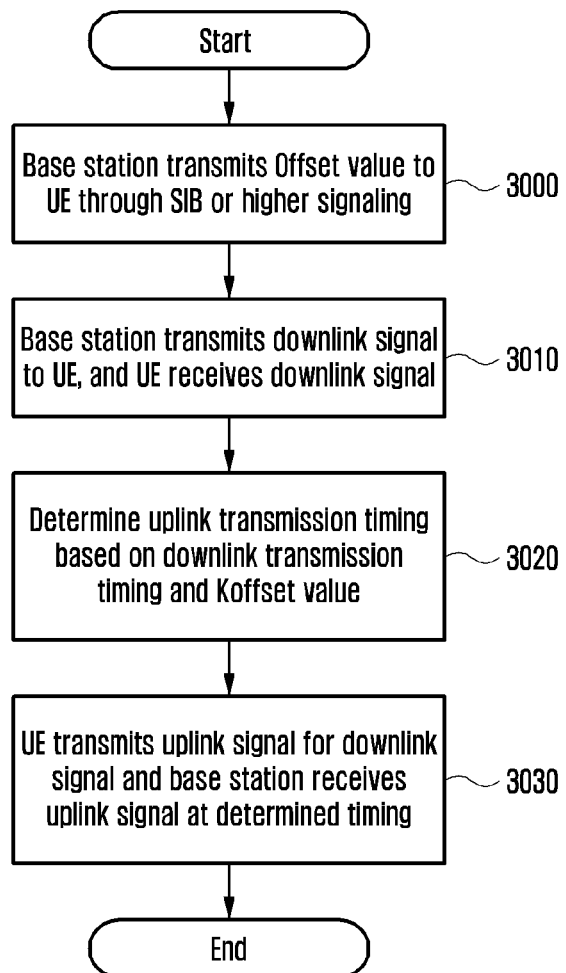
FIG. 30A illustrates a flowchart of an example in which a UE determines an uplink transmission timing from a downlink signal transmission timing by receiving a Koffset value or determining a Koffset value from configuration information.

FIG. 30A illustrates a flowchart of an example in which a UE determines an uplink transmission timing from a downlink signal transmission timing by receiving a Koffset value or determining a Koffset value from configuration information. In the above description, the downlink signal may be control information such as a PDCCH or may be control information for scheduling an uplink data PUSCH. In this case, an uplink signal corresponding to the downlink signal becomes the PUSCH. Alternatively, the downlink signal may be a PDSCH, and the uplink signal thereof may be HARQ-ACK feedback of the PDSCH, and may be a PUCCH or a PUSCH including the same. Alternatively, the UE may receive the RAR in a random access process and then transmit an msg 3 signal corresponding to the RAR. In this case, the RAR may be transmitted to the PDSCH and the msg 3 may be transmitted to the PUSCH; thus, the uplink signal for the PDSCH may be the PUSCH. Alternatively, when the base station transmits a PDCCH triggering an SRS signal, an uplink signal for this may be an SRS.

Although the disclosure has described an example in which the Koffset value is determined based on the SCS, the Koffset is transmitted as a single value regardless of the SCS, and may be converted and applied to $K_{offset} \cdot 2^\mu$ in a process of calculating a slot to which the timing is applied.

Referring to FIG. 30A, in step 3000, the base station transmits a Koffset value or information for obtaining a Koffset value to the UE through SIB or higher signaling. In step 3010, the base station transmits the above-described downlink signal to the UE, and the UE receives the above-described downlink signal. Before step 3010, the base station may check an uplink transmission timing to be applied to the UE, and generate and transmit the above-described downlink signal according to the checked uplink transmission timing. In step 3020, the UE may determine an uplink transmission timing based on the reception timing of the downlink signal and the configured or obtained Koffset value. In step 3030, the UE may transmit the above-described uplink signal at the determined uplink transmission timing, and the base station receives the above-described uplink signal at the determined uplink transmission timing.

Second Embodiment

The second embodiment provides a method and device for using scheduling offset for uplink power control.

Power of a PUCCH in BWP b, carrier f, and a cell c may be calculated as in Equation 6.

[Equation 6]
$$P_{PUCCH,b,f,c}(i, q_u, q_d, l) = \min \begin{cases} P_{CMAX,f,c}(i), \\ P_{O\_PUCCH,b,f,c}(q_u) + 10\log_{10}(2^\mu \cdot M_{RB,b,f,c}^{PUCCH}(i)) + PL_{b,f,c}(q_d) + \Delta_{F\_PUCCH}(F) + \Delta_{TF,b,f,c}(i) + g_b. \end{cases} [dBm]$$

In the method of determining power of the PUCCH, $g_{bfc}(i,l)$ may be determined by DCI transmitting an uplink power control command. Transmit power control (TPC) command information is included in the DCI, and the TPC command information may be included in the DCI for scheduling the downlink PDSCH or may be transmitted to the UE through a specific bitfield of a separate DCI for power control. The transmitted DCI may include information on a timing in which the power control command is applied. As an example, power of a PUCCH or PUSCH transmitted to a slot n may be determined based on DCIs of a slot n−k, and the k is indicated in a timing information bit field (in this case, a size of the bit field may be a function of the number of k values configured through higher signaling, and may be equal to, for example, $\lceil \log_2(I) \rceil$) indicating a value k of DCI after a set of one or more k values is configured through higher signaling, or when only one k value is configured through higher signaling, the k may be determined to a configuration value without an indication from the DCI (i.e., corresponding timing information is not included or a size of a bit field of the timing information is 0 bits). However, unlike the existing terrestrial network communication, because it may be necessary to indicate a large value of k due to a long TA in satellite communication, Koffset, which is a value configured and indicated in the first embodiment, may also be used for determining the power control timing.

That is, power of the PUCCH or PUSCH transmitted in the slot n may be determined based on the sums of TPC command information included in the DCI of the slot n−k−Koffset. In the above description, the Koffset value may be transmitted to the UE or determined by the UE in various methods, for example, through the configuration and indication method provided in the first embodiment.

Figure 30B:
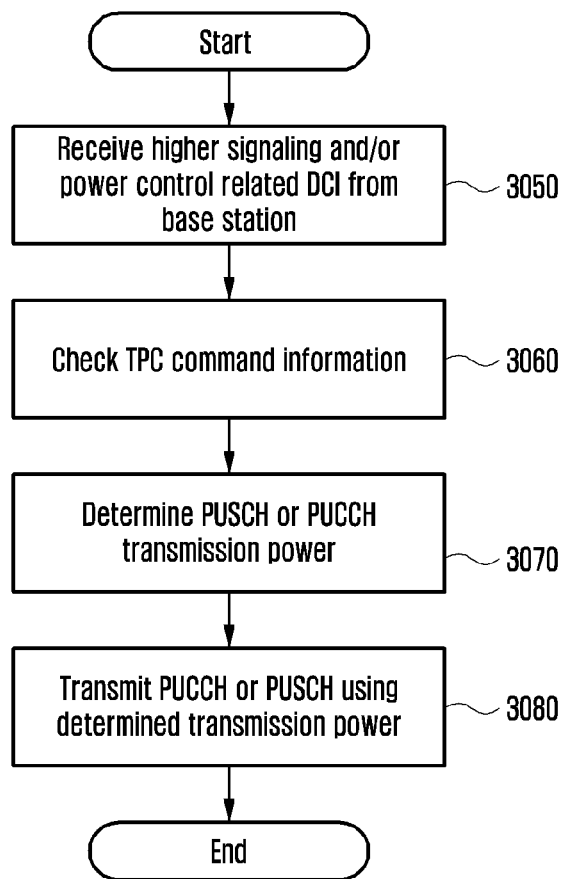
FIG. 30B illustrates a flowchart of an example of a method of a UE performing uplink power control.

FIG. 30B illustrates a flowchart of an example of a method of a UE performing uplink power control. In step 3050, the UE receives a set of one or more k values from the base station through higher signaling, and receives TPC command information and/or timing information through DCI (downlink data scheduling DCI or DCI for separate power control). In step 3060, the UE checks the TPC command information to be applied to the PUCCH or PUSCH of the slot n, and in this case, the UE checks the TPC command information included in the DCI received in a slot n−k−Koffset. In step 3070, the UE determines the PUCCH or PUSCH transmission power of the slot n based on the sum of the TPC command information, and in step 3080, the UE transmits the PUCCH or PUSCH in the slot n using the determined transmission power.

Third Embodiment

The third embodiment provides a method and device for operating a UE using carrier aggregation (CA) and dual connectivity (DC) in satellite communication.

The UE may be connected by CA to the base station through a plurality of satellites. For example, the UE is connected to the base station through GEO in a carrier 1, the carrier 1 may become a PCell, and in a carrier 2, the UE is connected to the base station through LEO, and the carrier 2 may become an SCell. In this case, activation and deactivation commands for the SCell connection may be transmitted through the PCell. In this case, the UE may transmit and receive data to the base station using the PCell carrier and the SCell carrier, that is, two carriers. In the above case, cross-carrier scheduling for transmitting control information for transmitting downlink data to the SCell to the PCell may be possible, or self-carrier scheduling for transmitting control information for transmitting downlink data to the SCell to the corresponding SCell may be possible.

Figure 31:
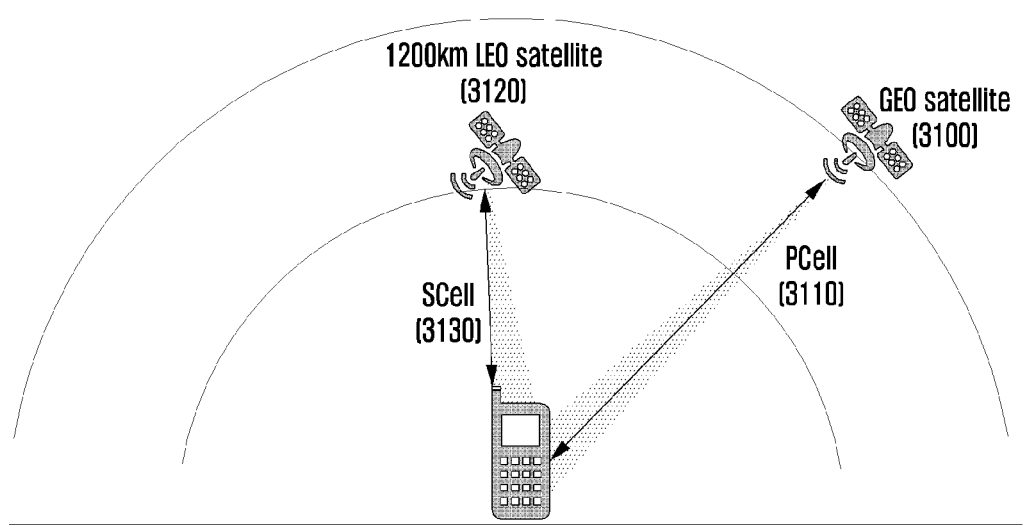
FIG. 31 illustrates a diagram of an example in which CA is configured by additionally connecting an LEO satellite while one UE accesses a GEO satellite.

FIG. 31 illustrates a diagram of an example in which CA is configured by additionally connecting an LEO satellite in a state in which one UE accesses a GEO satellite. FIG. 31 illustrates an example in which a carrier 3110 for connection with GEO 3100 becomes a PCell and a carrier 3130 for connection with LEO 3120 becomes an SCell, but on the contrary, a carrier for connection with LEO may become a PCell, and a carrier for connection with GEO may be an SCell.

The UE may process secondary cell (Scell) activation and deactivation for CA as follows.

With reference to slots for PUCCH transmissions, when a UE receives in a PDSCH an activation command [11, TS 38.321] for a secondary cell ending in slot n, the UE applies the corresponding actions in [11, TS 38.321] no later than the minimum requirement defined in [10, TS 38.133] and no earlier than slot n+k, except for the following:

the actions related to CSI reporting on a serving cell that is active in slot n+k the actions related to the sCellDeactivationTimer associated with the secondary cell [11, TS 38.321] that the UE applies in slot n+k the actions related to CSI reporting on a serving cell which is not active in slot n+k that the UE applies in the earliest slot after n+k in which the serving cell is active.

The value of k is $k_1 + 3 \cdot N_{slot}^{subframe,\mu} + 1 + K_{offset}$ where $k_1$ is a number of slots for a PUCCH transmission with HARQ-ACK information for the PDSCH reception and is indicated by the PDSCH-to-HARQ_feedback timing indicator field in the DCI format scheduling the PDSCH reception as described in Clause 9.2.3 and $N_{slot}^{subframe,\mu}$ is a number of slots per subframe for the SCS configuration μ of the PUCCH transmission.

With reference to slots for PUCCH transmissions, if a UE receives a deactivation command [11, TS 38.321] for a secondary cell ending in slot n, the UE applies the corresponding actions in [11, TS 38.321] no later than the minimum requirement defined in [10, TS 38.133], except for the actions related to CSI reporting on an activated serving cell which the UE applies in slot n+k.

If the sCellDeactivationTimer associated with the secondary cell expires in slot n, the UE applies the corresponding actions in [11, TS 38.321] no later than the minimum requirement defined in [10, TS 38.133], except for the actions related to CSI reporting on an activated serving cell which the UE applies in the first slot that is after slot $n + 3 \cdot N_{slot}^{subframe,\mu} + K^{offset}$ where μ is the SCS configuration for PDSCH reception on the secondary cell.

. . .

The MAC entity shall for each configured SCell:
1> if an SCell Activation/Deactivation MAC CE is received activating the SCell:
2> activate the SCell according to the timing defined in TS 38.213 [6]; i.e. apply normal SCell operation including:
3> SRS transmissions on the SCell;
3> CSI reporting for the SCell;
3> PDCCH monitoring on the SCell;
3> PDCCH monitoring for the SCell;
3> PUCCH transmissions on the SCell, if configured.
2> if the SCell was deactivated prior to receiving this SCell Activation/Deactivation MAC CE:

3> activate the DL BWP and UL BWP indicated by firstActiveDownlinkBWP-Id and firstActiveUplinkBWP-Id respectively;

2> start or restart the sCellDeactivationTimer associated with the SCell according to the timing defined in TS 38.213 [6];

2> (re-)initialize any suspended configured uplink grants of configured grant Type 1 associated with this SCell according to the stored configuration, if any, and to start in the symbol according to rules in clause 5.8.2;

2> trigger PHR according to clause 5.4.6.

1> else if an SCell Activation/Deactivation MAC CE is received deactivating the SCell; or 1> if the sCellDeactivationTimer associated with the activated SCell expires:

2> deactivate the SCell according to the timing defined in TS 38.213 [6];

2> stop the sCellDeactivationTimer associated with the SCell;

2> stop the bwp-InactivityTimer associated with the SCell;

2> deactivate any active BWP associated with the SCell;

2> clear any configured downlink assignment and any configured uplink grant Type 2 associated with the SCell respectively;

2> clear any PUSCH resource for semi-persistent CSI reporting associated with the SCell;

2> suspend any configured uplink grant Type 1 associated with the SCell;

2> flush all HARQ buffers associated with the SCell.

1> if PDCCH on the activated SCell indicates an uplink grant or downlink assignment; or 1> if PDCCH on the Serving Cell scheduling the activated SCell indicates an uplink grant or a downlink assignment for the activated SCell; or 1> if a MAC PDU is transmitted in a configured uplink grant or received in a configured downlink assignment:

2> restart the sCellDeactivationTimer associated with the SCell.

1> if the SCell is deactivated:

2> not transmit SRS on the SCell;

2> not report CSI for the SCell;

2> not transmit on UL-SCH on the SCell;

2> not transmit on RACH on the SCell;

2> not monitor the PDCCH on the SCell;

2> not monitor the PDCCH for the SCell;

2> not transmit PUCCH on the SCell.

In the above description, Koffset may be Koffset provided in the first embodiment of the disclosure, and/or may be a value configured to the UE or determined in the corresponding carrier. That is, a timing of performing activation and deactivation of the SCell in the CA configuration may be determined based on the Koffset value.

When the base station and the UE receive an activation command or deactivation command for activating or deactivating one or more specific SCells in a slot n, it may be determined that the activation and deactivation are applied in a slot n+k ($k=k_1+3 \cdot N_{slot}^{subframe,\mu}+1+K_{offset}$), and in a case in which activation is indicated, general operations (SRS transmission, CSI measurement and/or reporting, PDCCH monitoring, PUCCH transmission, and the like) may be performed in the SCell indicated to be activated from the slot n+k. Further, when deactivation is indicated, it is determined that SRS transmission, CSI measurement and/or reporting on the SCell, uplink data transmission, RACH transmission, PDCCH monitoring, and PUCCH transmission are not performed on the SCell from the slot n+k. The same is true when a deactivation timer (sCellDeactivationTimer) expires in the slot n.

Meanwhile, CA is configured to the UE, the base station transmits control information for scheduling data transmission in the PCell to the UE, and cross-carrier scheduling in which actual data transmission is performed in the SCell may be configured. In this case, the DCI transmitted and received in the PCell may schedule a PDSCH or PUSCH in the SCell, and because a propagation delay between the satellite and the UE in the PCell and a propagation delay between the satellite and the UE in the SCell may be different, the base station may configure separate Koffset in case of cross-carrier scheduling.

That is, a Koffset value for determining the HARQ-ACK feedback timing when the DCI transmitted from the PCell schedules the PDSCH of the PCell, and a Koffset value for determining a HARQ-ACK feedback timing when the DCI transmitted from the PCell schedules the PDSCH of the SCell may be configured differently, and such a Koffset value may be transmitted through separate higher signaling configuration. For example, in the case of cross-carrier scheduling, it is possible to configure an identifier of a cell scheduled through the DCI (a cell in which scheduled data is transmitted and received) and/or a Koffset value to be applied to the corresponding cell through higher signaling.

As another example, the Koffset value may be determined based on an RNTI value. As an example, RNTI 1 is configured and used for scheduling data transmitted and received by the LEO satellite and the UE, and it is assumed that Koffset during transmission and reception in the corresponding satellite is configured to K1, and RNTI 2 is configured and used for scheduling data transmitted and received by the GEO satellite and the UE, and it is assumed that Koffset is configured to K2 during transmission and reception in the corresponding satellite. In this case, when RNTI 1 is scheduled, the UE may determine K1 as Koffset to determine HARQ-ACK feedback or PUSCH transmission timing, and when RNTI 2 is scheduled, the UE may determine K2 as Koffset to determine HARQ-ACK feedback or PUSCH transmission timing. The base station may scramble part or all of DCI using RNTI 1 when transmitting the DCI for scheduling data transmitted and received to and from the LEO satellite, and scramble all or part of DCI using RNTI 2 when transmitting the DCI for scheduling data transmitted and received to and from the GEO satellite. Further, the base station may consider that the transmission timing of uplink transmission (HARQ-ACK feedback or PUSCH) related to RNTI 1 is to be based on K1, and that the transmission timing of uplink transmission (HARQ-ACK feedback or PUSCH) related to RNTI 2 is to be based on K2. In the above description, scheduling with a specific RNTI may mean that part or all of the CRC of the scheduling DCI is scrambled with the RNTI value. This example is not limited to the type of satellite and may be applied to various examples. For example, the disclosure may be applied to scheduling data of different cells or data of different frequency bands.

Fourth Embodiment

The fourth embodiment provides a method and device for a UE to apply TA. This may be applied in a situation where a propagation delay is large, for example, may be applied in satellite communication.

The UE may receive a TA adjustment indicator with a downlink signal (e.g., higher signaling such as MAC CE or control information such as DCI included in a PDSCH), and the indicated change in TA may be calculated based on a receiving timing of the downlink signal and a maximum value of the TA that may be applied by the UE.

For a timing advance command received on uplink slot n and for a transmission other than a PUSCH scheduled by a RAR UL grant as described in Clause 8.2A or 8.3, or a PUCCH with HARQ-ACK information in response to a successRAR as described in Clause 8.2A, the corresponding adjustment of the uplink transmission timing applies from the beginning of uplink slot n+k+1 where k= $\lceil N_{slot}^{subframe,\mu} \cdot (N_{T,1}+N_{T,2}+N_{TA,max}+0.5)/T_{sf} \rceil$, $N_{T,1}$ is a time duration in msec of $N_1$ symbols corresponding to a PDSCH processing time for UE processing capability 1 when additional PDSCH DM-RS is configured, $N_{T,2}$ is a time duration in msec of $N_2$ symbols corresponding to a PUSCH preparation time for UE processing capability 1 [6, TS 38.214], $N_{TA,max}$ is the maximum timing advance value in msec that can be provided by a TA command field of 12 bits, $N_{slot}^{subframe,\mu}$ is the number of slots per subframe, and $T_{sf}$ is the subframe duration of 1 msec. $N_1$ and $N_2$ are determined with respect to the minimum SCS among the SCSs of all configured UL BWPs for all uplink carriers in the TAG and of all configured DL BWPs for the corresponding downlink carriers. For $\mu=0$, the UE assumes $N_{1,0}=4$ [6, TS 38.214]. Slot n and $N_{slot}^{subframe,\mu}$ are determined with respect to the minimum SCS among the SCSs of all configured UL BWPs for all uplink carriers in the TAG. $N_{TA,max}$ is determined with respect to the minimum SCS among the SCSs of all configured UL BWPs for all uplink carriers in the TAG and for all configured initial UL BWPs provided by initialUplinkBWP. The uplink slot n is the last slot among uplink slot(s) overlapping with the slot(s) of PDSCH reception assuming $T_{TA}=0$, where the PDSCH provides the timing advance command and $T_{TA}$ is defined in [4, TS 38.211].

In the above description, $N_{TA,max}$ may mean a maximum TA value that can be transmitted in 12 bits.

In case of random access response, a timing advance command [11, TS 38.321], $T_A$, for a TAG indicates $N_{TA}$ values by index values of $T_A=0, 1, 2, \ldots, 3846$, where an amount of the time alignment for the TAG with SCS of $2^\mu \cdot 15$ kHz is $N_{TA}=T_A \cdot 16 \cdot 64/2^\mu$. $N_{TA}$ is defined in [4, TS 38.211] and is relative to the SCS of the first uplink transmission from the UE after the reception of the random access response.

As described above, a TA value in the RAR is transmitted, and $N_{TA,max}$ may eventually become $N_{TA,max}= 3846 \cdot 16 \cdot 64 \cdot T_c/2^\mu$, and in the above description, as $T_c$ is defined as $T_c=1/(480 \cdot 10^3 \cdot 2048)$. $N_{TA,max}$ may eventually become 2 ms.

In the case of the method, k is determined as k=$\lceil N_{slot}^{subframe,\mu} \cdot (N_{T,1}+N_{T,2}+N_{TA,max}+0.5)/T_{sf} \rceil$, which may be determined based on $N_{TA,max}$, which is a maximum value of TA applicable to the UE. However, in the case of satellite communication, because the TA value to be applied by the UE may become large, the TA may be applied in the following manner instead of the above method.

Method 1: A timing at which TA is applied (applied from an uplink slot n+k+1) may be calculated by calculating a k value by the following method.

For a timing advance command received on uplink slot n and for a transmission other than a PUSCH scheduled by a RAR UL grant as described in Clause 8.2A or 8.3, or a PUCCH with HARQ-ACK information in response to a successRAR as described in Clause 8.2A, the corresponding adjustment of the uplink transmission timing applies from the beginning of uplink slot n+k+1 where k= $\lceil N_{slot}^{subframe,\mu} \cdot (N_{T,1}+N_{T,2}+N_{TA,max}+0.5+K_{offset,ms})/T_{sf} \rceil$, $N_{T,1}$ is a time duration in msec of $N_1$ symbols corresponding to a PDSCH processing time for UE processing capability 1 when additional PDSCH DM-RS is configured, N msec of $N_2$ symbols corresponding to a PUSCH preparation time for UE processing capability 1 [6, TS 38.214], $N_{TA,max}$ is the maximum timing advance value in msec that can be provided by a TA command field of 12 bits, $N_{slot}^{subframe,\mu}$ is the number of slots per subframe, and $T_{sf}$ is the subframe duration of 1 msec. $N_1$ and $N_2$ are determined with respect to the minimum SCS among the SCSs of all configured UL BWPs for all uplink carriers in the TAG and of all configured DL BWPs for the corresponding downlink carriers. For $\mu=0$, the UE assumes $N_{1,0}=14$ [6, TS 38.214]. Slot n and $N_{slot}^{subframe,\mu}$ are determined with respect to the minimum SCS among the SCSs of all configured UL BWPs for all uplink carriers in the TAG. $N_{TA,max}$ is determined with respect to the minimum SCS among the SCSs of all configured UL BWPs for all uplink carriers in the TAG and for all configured initial UL BWPs provided by initialUplinkBWP. The uplink slot n is the last slot among uplink slot(s) overlapping with the slot(s) of PDSCH reception assuming $T_{TA}=0$, where the PDSCH provides the timing advance command and $T_{TA}$ is defined in [4, TS 38.211].

In the above description, Koffset,ms may be a Koffset value provided by the disclosure, such as in the first embodiment, or may be a value obtained by converting the corresponding Koffset value in units of ms.

Method 2: For an environment with a large propagation delay such as satellite communication, a larger value $N_{TA,max}$ than a value $N_{TA,max}$ in terrestrial communication may be applied. That is, in satellite network communication, a value larger than 2 ms may be defined as Method 3: In the method 1, k may be calculated as k=$\lceil N_{slot}^{subframe,\mu} \cdot (N_{T,1}+N_{T,2}+N_{TA,max}+0.5+K_{offset} \cdot 2^\mu/T_{sf}) \rceil$. In the above description, $K_{offset}$ may be a Koffset value provided by the disclosure, such as in the first embodiment, and be applied by calculating $K_{offset} \cdot 2^\mu$ using SCS used for uplink transmission. Alternatively, it can be calculated as k=$\lceil N_{slot}^{subframe,\mu} \cdot (N_{T,1}+N_{T,2}+N_{TA,max}+0.5)/T_{sf} \rceil + K_{offset}$.

At least one of the above-described methods may be performed in combination.

Figure 32:
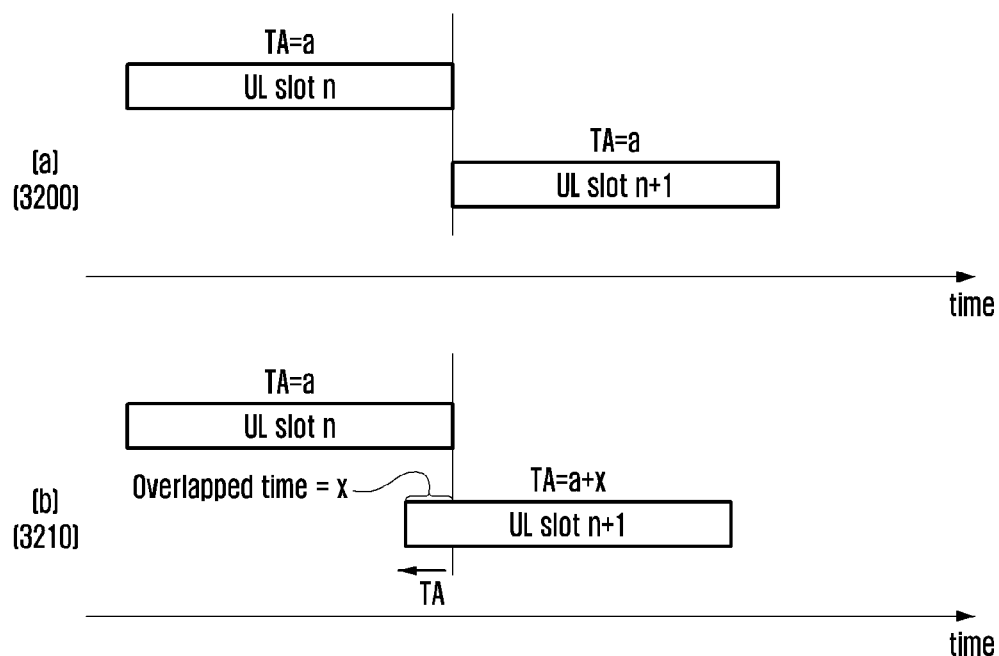
FIG. 32 illustrates a diagram of an example in which two slots overlap or do not overlap by a TA command.
Figure 33:
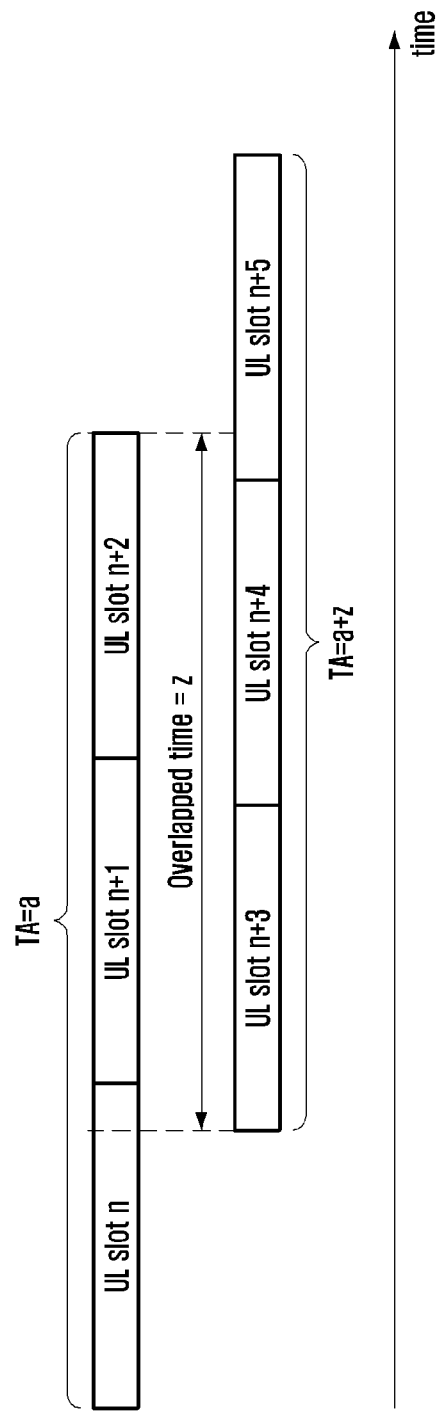
FIG. 33 illustrates a diagram of an example of a case in which two or more slots overlap.

According to another embodiment of the disclosure, if two adjacent slots overlap due to a TA command, the latter slot is reduced in duration relative to the former slot. FIG. 32 illustrates a diagram of an example in which two slots overlap or do not overlap by a TA command. When a is applied as a TA in both an UL slot n and an UL slot n+1, FIG. 32A, 3200 illustrates that the two slots do not overlap. FIG. 32B, 3210 is a diagram illustrating an example in which a slot n and a slot n+1 overlap by x on a time axis when a as TA is applied in the slot n and a+x as TA is applied in the slot n+1. That is, in this case, it may mean that a front part of the slot n+1 is not transmitted by x. However, when the TA value suddenly changes in satellite communication, it may be possible that two or more slots overlap. An example of this is illustrated in FIG. 33. FIG. 33 illustrates a diagram of an example of a case in which two or more slots overlap. Therefore, if two or more adjacent slots overlap due to a TA command, the latter slot(s) is(are) reduced or not transmitted in duration relative to the former slot.

In the above description, for convenience of description, although the first to fourth embodiments of the disclosure have been divided and described, each embodiment includes operations related to each other; thus, it is also possible to configure at least two or more embodiments in combination. Further, methods of each embodiment are not mutually exclusive, and it is also possible that one or more methods are combined and performed.

A transmitting and receiving method of a base station, a satellite, and a UE or a transmitting end and a receiving end for performing the above embodiments of the disclosure are described, and in order to perform the method, the receiver, the processer, and the transmitter of the base station, the satellite, and the UE, respectively should operate according to the embodiment.

Figure 34:
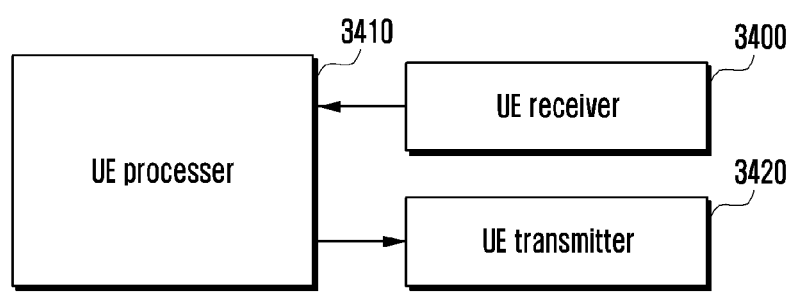
FIG. 34 illustrates a block diagram of an internal structure of a UE according to an embodiment of the disclosure.

Specifically, FIG. 34 illustrates a block diagram of an internal structure of a UE according to an embodiment of the disclosure. As illustrated in FIG. 34, the UE of the disclosure may include a UE receiver 3400, a UE transmitter 3420, and a UE processor 3410. The UE receiver 3400 and the UE transmitter 3420 may be collectively referred to as a transceiver in the embodiment of the disclosure. The transceiver may transmit and receive a signal to and from the base station. The signal may include control information and data. To this end, the transceiver may include an RF transmitter for up-converting and amplifying a frequency of a transmitted signal, and an RF receiver for low-noise amplifying a received signal and down-converting a frequency thereof. Further, the transceiver may receive a signal through a wireless channel, output the signal to the UE processor 3410, and transmit a signal output from the UE processor 3410 through a wireless channel. The UE processor 3410 may control a series of processes so that the UE may operate according to the above-described embodiment of the disclosure. For example, the UE receiver 3400 may receive a signal from a satellite base station or a base station on the ground, and the UE processer 3410 may transmit and receive a signal to and from the base station according to the method described in the disclosure. Thereafter, the UE transmitter 3420 may transmit a signal using a determined timing.

Figure 35:
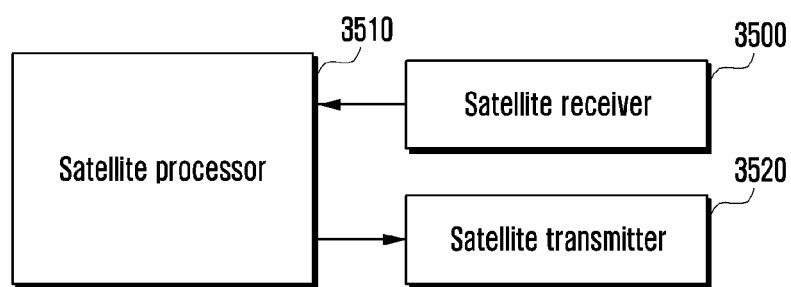
FIG. 35 illustrates a block diagram of an internal structure of a satellite according to an embodiment of the disclosure.

FIG. 35 illustrates a block diagram of an internal structure of a satellite according to an embodiment of the disclosure. As illustrated in FIG. 35, the satellite of the disclosure may include a satellite receiver 3500, a satellite transmitter 3520, and a satellite processor 3510. In the above description, the receiver, the transmitter, and the processer may be formed in plurality. That is, the satellite of the disclosure may include a receiver and transmitter for transmitting and receiving signals from the UE, and a receiver and transmitter for transmitting and receiving signals from the base station, respectively (and a receiver and transmitter for transmitting and receiving signals with other satellites). The satellite receiver 3500 and the satellite transmitter 3520 may be collectively referred to as a satellite transceiver in an embodiment of the disclosure. The transceiver may transmit and receive a signal to and from the UE and the base station. The signal may include control information and data. To this end, the transceiver may include an RF transmitter for up-converting and amplifying a frequency of a transmitted signal, and an RF receiver for low-noise amplifying a received signal and down-converting a frequency thereof. Further, the transceiver may receive a signal through a wireless channel and output the signal to the satellite processer 3510, and transmit the signal output from the satellite processor 3510 through the wireless channel. The satellite processor 3510 may include a compensator (pre-compensator) for correcting frequency offset or Doppler shift, and include a device capable of tracking a location from a GPS or the like. Further, the satellite processer 3510 may include a frequency shift function capable of shifting a center frequency of the received signal. The satellite processor 3510 may control a series of processes so that the satellite, the base station, and the UE may operate according to the above-described embodiment of the disclosure.

Figure 36:
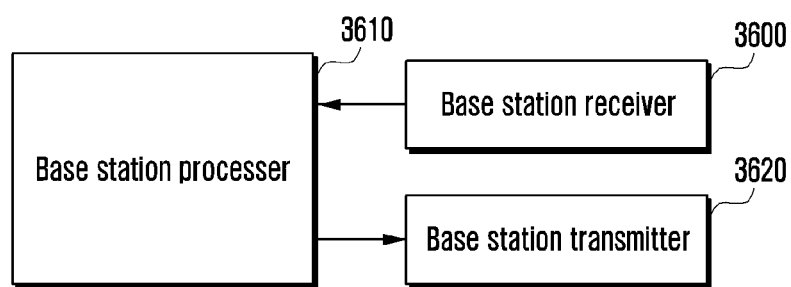
FIG. 36 illustrates a block diagram of an internal structure of a base station according to an embodiment of the disclosure.

FIG. 36 illustrates a block diagram of an internal structure of a base station according to an embodiment of the disclosure. As illustrated in FIG. 36, the base station of the disclosure may include a base station receiver 3600, a base station transmitter 3620, and a base station processor 3610. The base station may be a base station on the ground or part of a satellite. The base station receiver 3600 and the base station transmitter 3620 may be collectively referred to as a transceiver in the embodiment of the disclosure. The transceiver may transmit and receive a signal to and from the UE. The signal may include control information and data. To this end, the transceiver may include an RF transmitter for up-converting and amplifying a frequency of a transmitted signal, and an RF receiver for low-noise amplifying a received signal and down-converting a frequency thereof. Further, the transceiver may receive a signal through a wireless channel and output the signal to the base station processor 3610, and transmit the signal output from the base station processor 3610 through the wireless channel. The base station processor 3610 may control a series of processes so that the base station may operate according to the above-described embodiment of the disclosure.

As described above, using the disclosure, a terminal can access a base station through a satellite, the base station instructs the terminal offset to be applied when transmitting an uplink signal, and the terminal transmits an uplink signal using offset information. Therefore, it is possible to effectively transmit and receive signals between the base station and the terminal.

Embodiments of the disclosure disclosed in the present specification and drawings merely present specific examples in order to easily explain the technical contents of the disclosure and help the understanding of the disclosure, and are not intended to limit the scope of the disclosure. That is, it will be apparent to those of ordinary skill in the art to which the disclosure pertains that other modifications based on the technical spirit of the disclosure can be implemented. Further, each of the above embodiments may be operated in combination with each other as needed. Further, the above embodiments may be implemented in other modifications based on the technical idea of the embodiment, such as an LTE system and a 5G system.

What is claimed is:
1. A method performed by a terminal in a communication system, the method comprising:
  receiving, from a base station, a system information block including scheduling offset information, the scheduling offset information indicating a number of slots for a subcarrier spacing 15 kHz;
  receiving, from the base station, a downlink signal associated with an uplink signal, wherein the downlink signal is associated with a k value for an uplink transmission timing;
  identifying a transmission timing of the uplink signal based on the k value, the scheduling offset information, and subcarrier spacing applied to a bandwidth part (BWP); and
  transmitting, to the base station, the uplink signal based on the identified transmission timing.
2. The method of claim 1, wherein the downlink signal corresponds to a downlink data and the uplink signal corresponds to hybrid automatic repeat request acknowledgement (HARQ-ACK) information for the downlink data.

3. The method of claim 1, wherein the downlink signal corresponds to downlink control information scheduling an uplink data and the uplink signal corresponds to the uplink data.

4. The method of claim 1, wherein the scheduling offset information is cell-specific.

5. The method of claim 1, wherein a timing adjustment of the uplink transmission timing applies from beginning of an uplink slot determined based on the scheduling offset information.

6. The method of claim 1, wherein in case that two adjacent slots overlap due to the uplink transmission timing, a latter slot is reduced in duration relative to a former slot.

7. A method performed by a base station in a communication system, the method comprising:
- transmitting, to a terminal, a system information block including scheduling offset information, the scheduling offset information indicating a number of slots for a subcarrier spacing 15 kHz;
- transmitting, to the terminal, a downlink signal associated with an uplink signal, wherein the downlink signal is associated with a k value for an uplink transmission timing; and
- receiving, from the terminal, the uplink signal based on a transmission timing,
- wherein the transmission timing of the uplink signal depends on the k value, the scheduling offset information, and a subcarrier spacing applied to a bandwidth part (BWP).

8. The method of claim 7, wherein the downlink signal corresponds to a downlink data and the uplink signal corresponds to hybrid automatic repeat request acknowledgement (HARQ-ACK) information for the downlink data.

9. The method of claim 7, wherein the downlink signal corresponds to downlink control information scheduling an uplink data and the uplink signal corresponds to the uplink data.

10. The method of claim 7, wherein the scheduling offset information is cell-specific.

11. The method of claim 7, wherein a timing adjustment of the uplink transmission timing applies from beginning of an uplink slot determined based on the scheduling offset information.

12. The method of claim 7, wherein in case that two adjacent slots overlap due to the uplink transmission timing, a latter slot is reduced in duration relative to a former slot.

13. A terminal in a communication system, the terminal comprising:
- a transceiver; and
- a controller coupled with the transceiver and configured to:
  - receive, from a base station, a system information block including scheduling offset information, the scheduling offset information indicating a number of slots for a subcarrier spacing 15 kHz,
  - receive, from the base station, a downlink signal associated with an uplink signal, wherein the downlink signal is associated with a k value for an uplink transmission timing,
  - identify a transmission timing of the uplink signal based on the k value, the scheduling offset information, and a subcarrier spacing applied to a bandwidth part (BWP), and
  - transmit, to the base station, the uplink signal based on the identified transmission timing.

14. The terminal of claim 13, wherein the downlink signal corresponds to a downlink data and the uplink signal corresponds to hybrid automatic repeat request acknowledgement (HARQ-ACK) information for the downlink data.

15. The terminal of claim 13, wherein the downlink signal corresponds to downlink control information scheduling an uplink data and the uplink signal corresponds to the uplink data.

16. The terminal of claim 13, wherein the scheduling offset information is cell-specific.

17. The terminal of claim 13, wherein a timing adjustment of the uplink transmission timing applies from beginning of an uplink slot determined based on the scheduling offset information.

18. The terminal of claim 13, wherein in case that two adjacent slots overlap due to the uplink transmission timing, a latter slot is reduced in duration relative to a former slot.

19. A base station in a communication system, the base station comprising:
- a transceiver; and
- a controller coupled with the transceiver and configured to:
  - transmit, to a terminal, a system information block including scheduling offset information, the scheduling offset information indicating a number of slots for a subcarrier spacing 15 kHz,
  - transmit, to the terminal, a downlink signal associated with an uplink signal, wherein the downlink signal is associated with a k value for an uplink transmission timing, and
  - receive, from the terminal, the uplink signal based on a transmission timing,
  - wherein the transmission timing of the uplink signal depends on the k value, the scheduling offset information, and a subcarrier spacing applied to a bandwidth part (BWP).

20. The base station of claim 19, wherein the downlink signal corresponds to a downlink data and the uplink signal corresponds to hybrid automatic repeat request acknowledgement (HARQ-ACK) information for the downlink data.

21. The base station of claim 19, wherein the downlink signal corresponds to downlink control information scheduling an uplink data and the uplink signal corresponds to the uplink data.

22. The base station of claim 19, wherein the scheduling offset information is cell-specific.

23. The base station of claim 19, wherein a timing adjustment of the uplink transmission timing applies from beginning of an uplink slot determined based on the scheduling offset information.

24. The base station of claim 19, wherein in case that two adjacent slots overlap due to the uplink transmission timing, a latter slot is reduced in duration relative to a former slot.

* * * * *